(12) United States Patent
Taugerbeck et al.

(10) Patent No.: US 9,133,395 B2
(45) Date of Patent: Sep. 15, 2015

(54) POLYMERIZABLE COMPOUNDS AND THE USE THEREOF IN LIQUID-CRYSTAL DISPLAYS

(71) Applicant: Merck Patent GmbH, Darmstadt (DE)

(72) Inventors: Andreas Taugerbeck, Darmstadt (DE); Martin Engel, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 13/934,468

(22) Filed: Jul. 3, 2013

(65) Prior Publication Data

US 2014/0008570 A1    Jan. 9, 2014

(30) Foreign Application Priority Data

Jul. 5, 2012 (EP) .................................. 12004991

(51) Int. Cl.
| | | |
|---|---|---|
| *C09K 19/12* | (2006.01) | |
| *C09K 19/30* | (2006.01) | |
| *C09K 19/38* | (2006.01) | |
| *G02F 1/1334* | (2006.01) | |
| *C09K 19/04* | (2006.01) | |
| *C09K 19/54* | (2006.01) | |

(52) U.S. Cl.
CPC .............. *C09K 19/12* (2013.01); *C09K 19/3001* (2013.01); *C09K 19/3852* (2013.01); *G02F 1/1334* (2013.01); *C09K 2019/0448* (2013.01); *C09K 2019/0481* (2013.01); *C09K 2019/301* (2013.01); *C09K 2019/3009* (2013.01); *C09K 2019/3016* (2013.01); *C09K 2019/548* (2013.01)

(58) Field of Classification Search
CPC .............. C09K 19/12; C09K 19/3001; C09K 19/3852; C09K 2019/0448; C09K 2019/0481; C09K 2019/548; C09K 2019/3009; C09K 2019/301; C09K 2019/3016; G02F 1/1334
USPC ........... 252/299.61, 299.63, 299.66; 349/182, 349/183, 187; 428/1.1; 445/24; 526/247, 526/313, 321; 560/141
See application file for complete search history.

(56) References Cited

U.S. PATENT DOCUMENTS

| | | |
|---|---|---|
| 6,861,107 B2 | 3/2005 | Klasen-Memmer et al. |
| 8,057,701 B2 | 11/2011 | Shinano et al. |
| 2004/0011996 A1 | 1/2004 | Klasen-Memmer et al. |
| 2010/0048802 A1 | 2/2010 | Hunt et al. |
| 2011/0037025 A1 | 2/2011 | Shinano et al. |

FOREIGN PATENT DOCUMENTS

| | | | |
|---|---|---|---|
| EP | 1378557 A1 | 1/2004 | |
| EP | 2261201 A1 | 12/2010 | |
| WO | 2008/112452 A2 | 9/2008 | |
| WO | 2013/124040 A1 | 8/2013 | |
| WO | 2013/178333 A1 | 12/2013 | |
| WO | WO 2013/178333 | * 12/2013 | ..................... 428/1.1 |

OTHER PUBLICATIONS

European Search Report dated Jun. 17, 2014 issued in corresponding EP application 13002325 (pp. 1-3).

* cited by examiner

*Primary Examiner* — Geraldina Visconti
(74) *Attorney, Agent, or Firm* — Millen, White, Zelano & Branigan, P.C.

(57) ABSTRACT

The present invention relates to polymerizable compounds, to processes and intermediates for the preparation thereof, to liquid-crystal (LC) media comprising them, and to the use of the polymerizable compounds and LC media for optical, electro-optical and electronic purposes, in particular in LC displays, especially in LC displays of the PS ("polymer sustained") or PSA ("polymer sustained alignment") type.

21 Claims, No Drawings

POLYMERIZABLE COMPOUNDS AND THE USE THEREOF IN LIQUID-CRYSTAL DISPLAYS

The present invention relates to polymerizable compounds, to processes and intermediates for the preparation thereof, to liquid-crystal (LC) media comprising them, and to the use of the polymerizable compounds and LC media for optical, electro-optical and electronic purposes, in particular in LC displays, especially in LC displays of the PS ("polymer sustained") or PSA ("polymer sustained alignment") type.

BACKGROUND OF THE INVENTION

The liquid-crystal displays (LC displays) used at present are usually those of the TN ("twisted nematic") type. However, these have the disadvantage of a strong viewing-angle dependence of the contrast.

In addition, so-called VA ("vertically aligned") displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the two electrodes, a realignment of the LC molecules parallel to the electrode surfaces takes place.

Furthermore, OCB ("optically compensated bend") displays are known which are based on a birefringence effect and have an LC layer with a so-called "bend" alignment and usually positive (DC) anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

Also known are so-called IPS ("in-plane switching") displays, which contain an LC layer between two substrates, where the two electrodes are arranged on only one of the two substrates and preferably have intermeshed, comb-shaped structures. On application of a voltage to the electrodes, an electric field which has a significant component parallel to the LC layer is thereby generated between them. This causes realignment of the LC molecules in the layer plane.

Furthermore, so-called FFS ("fringe-field switching") displays have been proposed (see, inter alia, S. H. Jung et al., Jpn. J. Appl. Phys., Volume 43, No. 3, 2004, 1028), which likewise contain two electrodes on the same substrate, but, in contrast to IPS displays, only one of these is in the form of an electrode which is structured in a comb-shaped manner, and the other electrode is unstructured. A strong, so-called "fringe field" is thereby generated, i.e. a strong electric field close to the edge of the electrodes, and, throughout the cell, an electric field which has both a strong vertical component and also a strong horizontal component. Both IPS displays and also FFS displays have a low viewing-angle dependence of the contrast.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes.

In so-called MVA ("multidomain vertical alignment") displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In so-called PVA ("patterned VA") displays, protrusions are rendered completely superfluous in that both electrodes are structured by means of slits on the opposite sides, which results in increased contrast and improved transparency to light, but is technologically difficult and makes the display more sensitive to mechanical influences ("tapping", etc.). For many applications, such as, for example, monitors and especially TV screens, however, a shortening of the response times and an improvement in the contrast and luminance (transmission) of the display are demanded.

A further development are the so-called PS or PSA ("polymer sustained" or "polymer sustained alignment") displays, for which the term "polymer stabilized" is also occasionally used. In these, a small amount (for example 0.3% by weight, typically <1% by weight) of one or more polymerizable compound(s) is added to the LC medium and, after introduction into the LC cell, is polymerized or crosslinked in situ, usually by UV photophotopolymerization, between the electrodes with or without an applied electrical voltage. The polymerization is carried out at a temperature where the LC medium exhibits a liquid crystal phase, usually at room temperature. The addition of polymerizable mesogenic or liquid-crystalline compounds, also known as reactive mesogens or "RMs", to the LC mixture has proven particularly suitable.

Unless indicated otherwise, the term "PSA" is used below as representative of PS displays and PSA displays.

In the meantime, the PS(A) principle is being used in diverse classical LC displays. Thus, for example, PSA-VA, PSA-OCB, PSA-IPS, PSA-FFS and PSA-TN displays are known. The polymerization of the polymerizable compound(s) preferably takes place with an applied electrical voltage in the case of PSA-VA and PSA-OCB displays, and with or without, preferably without, an applied electrical voltage in the case of PSA-IPS displays. As can be demonstrated in test cells, the PS(A) method results in a pretilt in the cell. In the case of PSA-OCB displays, for example, it is possible for the bend structure to be stabilized so that an offset voltage is unnecessary or can be reduced. In the case of PSA-VA displays, the pretilt has a positive effect on response times. For PSA-VA displays, a standard MVA or PVA pixel and electrode layout can be used. In addition, however, it is also possible, for example, to manage with only one structured electrode side and no protrusions, which significantly simplifies production and at the same time results in very good contrast at the same time as very good transparency to light.

Furthermore, the so-called posi-VA displays ("positive VA") have proven to be a particularly suitable mode. Like in classical VA displays, the initial orientation of the LC molecules in posi-VA displays is homeotropic, i.e. substantially perpendicular to the substrates, in the initial state when no voltage is applied. However, in contrast to classical VA displays, in posi-VA displays LC media with positive dielectric anisotropy are used. Like in the usually used IPS displays, the two electrodes in posi-VA displays are arranged on only one of the two substrates, and preferably exhibit intermeshed and comb-shaped (interdigital) structures. By application of a voltage to the interdigital electrodes, which create an electrical field that is substantially parallel to the layer of the LC medium, the LC molecules are transferred into an orientation that is substantially parallel to the substrates. In posi-VA displays, too, it a polymer stabilization (PSA) has proven to be advantageous, i.e. the addition of RMs to the LC medium, which are polymerized in the cell, whereby a significant reduction of the switching times could be realised.

PSA-VA displays are described, for example, in JP 10-036847 A, EP 1 170 626 A2, U.S. Pat. No. 6,861,107, U.S. Pat. No. 7,169,449, US 2004/0191428 A1, US 2006/0066793 A1 and US 2006/0103804 A1. PSA-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PSA-IPS displays are described, for example, in U.S. Pat. No. 6,177,972 and Appl. Phys. Lett. 1999, 75(21), 3264. PSA-TN displays are described, for example, in Optics Express 2004, 12(7), 1221.

Like the conventional LC displays described above, PSA displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

In particular for monitor and especially TV applications, optimisation of the response times, but also of the contrast and luminance (thus also transmission) of the LC display continues to be demanded. The PSA method can provide crucial advantages here. In particular in the case of PSA-VA, PSA-IPS, PSA-FFS and PSA-posi-VA displays, a shortening of the response times, which correlate with a measurable pretilt in test cells, can be achieved without significant adverse effects on other parameters.

In the prior art, use is made, for example, of polymerizable compounds of the following formula:

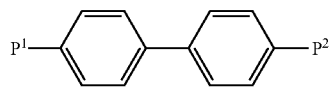

in which P denotes a polymerizable group, usually an acrylate or methacrylate group, as described, for example, in U.S. Pat. No. 7,169,449.

However, the problem arises that not all combinations consisting of LC mixture (also referred to as "LC host mixture" below)+polymerizable component (typically RMs) are suitable for PSA displays since, for example, an inadequate tilt or none at all becomes established or since, for example, the so-called "voltage holding ratio" (VHR or HR) is inadequate for TFT display applications. In addition, it has been found that, on use in PSA displays, the LC mixtures and RMs known from the prior art still have some disadvantages. Thus, not every known RM which is soluble in LC mixtures is suitable for use in PSA displays. In addition, it is often difficult to find a suitable selection criterion for the RM besides direct measurement of the pretilt in the PSA display. The choice of suitable RMs becomes even smaller if polymerization by means of UV light without the addition of photoinitiators is desired, which may be advantageous for certain applications.

In addition, the selected combination of LC host mixture/RM should have the lowest possible rotational viscosity and the best possible electrical properties. In particular, it should have the highest possible VHR. In PSA displays, a high VHR after irradiation with UV light is particularly necessary since UV exposure is a requisite part of the display production process, but also occurs as normal exposure during operation of the finished display.

In particular, it would be desirable to have available novel materials for PSA displays which produce a particularly small pretilt angle. Preferred materials here are those which produce a lower pretilt angle during polymerization for the same exposure time than the materials known to date, and/or through the use of which the (higher) pretilt angle that can be achieved with known materials can already be achieved after a shorter exposure time. The production time ("tact time") of the display could thus be shortened and the costs of the production process reduced.

A further problem in the production of PSA displays is the presence or removal of residual amounts of unpolymerized RMs, in particular after the polymerization step for production of the pretilt angle in the display. For example, unreacted RMs of this type may adversely affect the properties of the display by, for example, polymerising in an uncontrolled manner during operation after finishing of the display.

Thus, the PSA displays known from the prior art often exhibit the undesired effect of so-called "image sticking" or "image burn", i.e. the image produced in the LC display by temporary addressing of individual pixels still remains visible even after the electric field in these pixels has been switched off or after other pixels have been addressed.

This "image sticking" can occur on the one hand if LC host mixtures having a low VHR are used. The UV component of daylight or the backlighting can cause undesired decomposition reactions of the LC molecules therein and thus initiate the production of ionic or free-radical impurities. These may accumulate, in particular, at the electrodes or the alignment layers, where they may reduce the effective applied voltage. This effect can also be observed in conventional LC displays without a polymer component.

In addition, an additional "image sticking" effect caused by the presence of unpolymerized RMs is often observed in PSA displays. Uncontrolled polymerization of the residual RMs is initiated here by UV light from the environment or by the backlighting. In the switched display areas, this changes the tilt angle after a number of addressing cycles. As a result, a change in transmission in the switched areas may occur, while it remains unchanged in the unswitched areas.

It is therefore desirable for the polymerization of the RMs to proceed as completely as possible during production of the PSA display and for the presence of unpolymerized RMs in the display to be excluded as far as possible or reduced to a minimum. To this end, materials are required which enable highly effective and complete polymerization. In addition, controlled reaction of these residual amounts would be desirable. This would be simpler if the RM polymerized more rapidly and effectively than the materials known to date.

There is thus still a great demand for PSA displays, in particular of the VA and OCB type, and LC media and polymerizable compounds for use in such displays, which do not exhibit the disadvantages described above or only do so to a small extent and have improved properties. In particular, there is a great demand for PSA displays, and materials for use in PSA displays, which enable a high specific resistance at the same time as a large working-temperature range, short response times, even at low temperatures, and a low threshold voltage, a low pretilt angle, a multiplicity of grey shades, high contrast and a broad viewing angle, and have high values for the "voltage holding ratio" (VHR) after UV exposure.

The invention is based on the object of providing novel suitable materials, in particular RMs and LC media comprising same, for use in PSA displays, which do not have the disadvantages indicated above or do so to a reduced extent, polymerise as rapidly and completely as possible, enable a low pretilt angle to be established as quickly as possible, reduce or prevent the occurrence of "image sticking" in the display, and preferably at the same time enable very high specific resistance values, low threshold voltages and short response times.

A further object of the invention is the provision of novel RMs, in particular for optical, electro-optical and electronic applications, and of suitable processes and intermediates for the preparation thereof.

In particular, the invention is based on the object of providing polymerizable compounds which produce a greater maximum pretilt after photophotopolymerization, which results in the desired pretilt being achieved more quickly and thus in significantly shortened times for production of the LC display.

This object has been achieved in accordance with the invention by materials and processes as described in the present application. In particular, it has been found, surprisingly, that the use of multireactive polymerizable compounds according to the invention, which are based on a [1,1':3'1"] terphenyl core of the following structure, or derivatives thereof,

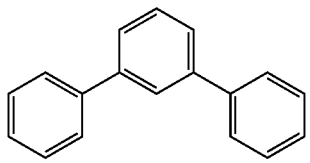 [SMILES: c1ccc(-c2cccc(-c3ccccc3)c2)cc1]

and which contain at least three polymerizable groups, in PSA displays facilitates particularly low pretilt angles and fast establishment of the desired tilt angles. This has been demonstrated in connection with an LC medium by means of pretilt measurements. In particular, a pretilt has been achieved without the addition of photoinitiator. In addition, the compounds according to the invention exhibit significantly faster generation of the pretilt angle compared with the materials known from the prior art, as has been demonstrated by exposure time-dependent measurements of the pretilt angle. In addition, the polymerizable compounds according to the invention exhibit a significantly higher polymerization rate, causing smaller unreacted residual amounts to remain in the cell. The electro-optical properties of the cell are thus improved, and in addition controlled reaction of these residual amounts becomes simpler. The compounds are therefore suitable for creating a high pretilt in PSA type displays. Compared to polymerizable compounds of prior art, they show a more rapid and complete photopolymerization reaction, and have higher solubility and enable higher VHR values in LC media.

WO 2008/112452 A1 discloses polymerizable compounds comprising a triphenyl or terphenyl core, and one or more (meth)acrylate groups attached thereto, for use in microstructured optical films, but does neither mention reactive mesogens as disclosed or claimed hereinafter, or their use in LC media for the active, switchable LC layer of LC displays.

SUMMARY OF THE INVENTION

The invention relates to the use of compounds of the formula I

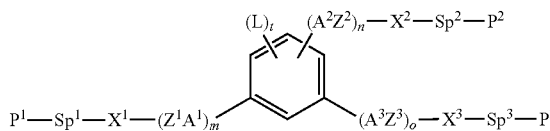

in which the individual radicals have the following meanings:

$A^1$, $A^3$ independently of each other denote 1,4-phenylene, naphthalene-1,4-diyl or naphthalene-2,6-diyl, wherein in all of these groups one or more CH groups are optionally replaced by N, $A^2$ denotes 1,4-phenylene, naphthalene-1,4-diyl or naphthalene-2,6-diyl, wherein in all of these groups one or more CH groups are optionally replaced by N, cyclohexane-1,4-diyl, wherein one or more non-adjacent $CH_2$-groups are optionally replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methano-indane-2,5-diyl, wherein all of these groups are unsubstituted or mono- or polysubstituted by L, L denotes P—, P-Sp-, OH, $CH_2OH$, F, Cl, Br, I, —CN, —$NO_2$, —NCO, —NCS, —OCN, —SCN, —C(=O)N$(R^x)_2$, —C(=O)$Y^1$, C(=O)$R^x$, —N$(R^x)_2$, optionally substituted silyl, optionally substituted aryl or heteroaryl having 5 to 20 ring atoms, or straight-chain or branched alkyl having 1 to 25, particularly preferably 1 to 10, C atoms, in which alkyl moieties, in addition, one or more non-adjacent $CH_2$ groups may each be replaced, independently of one another, by —C($R^{00}$)=C($R^{000}$)—, —C≡C—, —N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN, P— or P-Sp-, $R^{00}$ and $R^{000}$ each, independently of one another, denote H or alkyl having 1 to 12 C atoms, $P^1$, $P^2$, $P^3$ independently of each other denote a polymerizable group, $Sp^1$, $Sp^2$, $Sp^3$ independently of each other denote a spacer group or a single bond, $Y^1$ is halogen, $R^x$ denotes P—, P-Sp-, H, halogen, straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O— and/or S— atoms are not directly connected with each other, and wherein one or more H atoms are optionally replaced by F, Cl, P— or P-Sp-, or $R^x$ denotes optionally substituted aryl, aryloxy, heteroaryl or heteroaryloxy having 5 to 20 ring atoms, $X^1$, $X^2$, $X^3$ independently of each other denote O, S, —C(O)—, —OC(O)—, —C(O)O—, —CF$_2$O—, or a single bond, n is 0, 1 or 2, m and o are independently of each other 1 or 2, t is 0, 1, 2 or 3, in liquid-crystal (LC) media and LC displays, especially in LC media of the active or switchable layer of an LC display.

Preferably the compounds of formula I and the LC media containing them are used in LC displays of the PS (polymer stabilized) or PSA (polymer sustained alignment) type.

The invention further relates to novel compounds of formula I, comprising at least one group $X^1$, $X^2$ or $X^3$ that is different from O and S.

The invention further relates to novel methods for preparing compounds of formula I, and to novel intermediates used or obtained in these methods.

The invention furthermore relates to an LC medium comprising one or more polymerizable compounds of formula I and one or more additional compounds, which may also be mesogenic, liquid-crystalline and/or polymerizable.

The invention furthermore relates to an LC medium comprising
  a polymerizable component A) comprising one or more polymerizable compounds of formula I, and
  a liquid-crystalline component B), also referred to below as "LC host mixture", comprising one or more, preferably two or more, low-molecular-weight (monomeric and unpolymerizable) compounds as described above and below.

The invention furthermore relates to an LC medium comprising a polymer obtained by polymerization of one or more polymerizable compounds of formula I, or by polymerization of a polymerizable component A) as described above, and further comprising one or more additional compounds, which may also be mesogenic, liquid-crystalline and/or polymerizable, or a component B) as described above.

The invention furthermore relates to an LC medium as described above and below, wherein the polymerizable compounds of formula I or the polymerizable component A) are polymerized.

The invention furthermore relates to a process for preparing an LC medium as described above and below, comprising the steps of mixing one or more low-molecular-weight liquid-crystalline compounds, or an LC host mixture or a liquid-crystalline component B) as described above and below, with one or more polymerizable compounds of formula I, and optionally with further liquid-crystalline compounds and/or additives.

The invention furthermore relates to the use of polymerizable compounds of formula I and LC media according to the invention in PS and PSA displays, in particular the use in PS and PSA displays containing an LC medium, for the production of a tilt angle in the LC medium by in-situ polymerization of the compound(s) of the formula I in the PSA display, preferably in an electric or magnetic field.

The invention furthermore relates to an LC display comprising one or more polymerizable compounds of formula I or an LC medium according to the invention, in particular a PS or PSA display, particularly preferably a PSA-VA, PSA-OCB, PSA-IPS, PS-FFS, PSA-posi-VA or PSA-TN display.

The invention furthermore relates to an LC display comprising a polymer obtainable by polymerization of one or more polymerizable compounds of formula I or of a polymerizable component A) as described above, or comprising an LC medium according to the invention, in particular a PS or PSA display, particularly preferably a PSA-VA, PSA-OCB, PSA-IPS, PS-FFS, PSA-posi-VA or PSA-TN display.

The invention furthermore relates to an LC display of the PS or PSA type containing an LC cell having two substrates and two electrodes, where at least one substrate is transparent to light and at least one substrate has one or two electrodes, and a layer, located between the substrates, of an LC medium comprising a polymerized component and a low-molecular-weight component, where the polymerized component is obtainable by polymerization of one or more polymerizable compounds between the substrates of the LC cell in the LC medium, preferably while applying an electrical voltage to the electrodes, where at least one of the polymerizable compounds is selected from polymerizable compounds of formula I as described above and below, and/or wherein the LC medium is an LC medium as described above and below.

The invention furthermore relates to a process for manufacturing an LC display as described above and below, comprising the steps of filling an LC medium, which comprises one or more low-molecular-weight liquid-crystalline compounds or an LC host mixture or a liquid-crystalline component B), as described above and below, and one or more polymerizable compounds of formula I or a polymerizable component A) as described above and below, into an LC cell having two substrates and two electrodes as described above and below, and polymerising the polymerizable compounds, preferably while applying an electrical voltage to the electrodes.

The PS and PSA displays according to the invention have two electrodes, preferably in the form of transparent layers, which are applied to one or both of the substrates which form the LC cell. Either in each case one electrode is applied to each of the two substrates, as, for example, in PSA-VA, PSA-OCB or PSA-TN displays according to the invention, or both electrodes are applied to only one of the two substrates, while the other substrate has no electrode, as, for example, in PSA-posi-VA, PSA-IPS or PSA-FFS displays according to the invention.

DEFINITIONS OF TERMS

As used herein, the terms "tilt" and "tilt angle" mean a tilted alignment of the LC molecules of an LC medium relative to the surfaces of the cell in an LC display (here preferably a PS or PSA display). The tilt angle here denotes the average angle (<90°) between the longitudinal molecular axes of the LC molecules (LC director) and the surface of the plane-parallel outer plates which form the LC cell. A low value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerization. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", hereinafter also referred to as "Sp", is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. As used herein, the terms "spacer group" or "spacer" mean a flexible group, for example an alkylene group, which connects the mesogenic group and the polymerizable group(s) in a polymerizable mesogenic compound.

As used herein, the terms "reactive mesogen" and "RM" mean a compound containing one mesogenic group and one or more functional groups which are suitable for polymerization, the latter also being referred to as "polymerizable group" or "P".

As used herein, the terms "low-molecular-weight compound" and "unpolymerizable compound" mean compounds, usually monomeric, which contain no functional group that is suitable for polymerization under the usual conditions known to the person skilled in the art, in particular under the conditions used for the polymerization of RMs.

As used herein, the term "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

DETAILED DESCRIPTION OF THE INVENTION

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

"Conjugated radical" or "conjugated group" denotes a radical or group which contains principally $sp^2$-hybridised (or possibly also sp-hybridised) carbon atoms, which may also be replaced by corresponding heteroatoms.

In the simplest case, this means the alternating presence of double and single bonds. "Principally" in this connection means that naturally (non-randomly) occurring defects which result in conjugation interruptions do not devalue the term "conjugated". Furthermore, the term "conjugated" is likewise used in this application text if, for example, arylamine units or certain heterocycles (i.e. conjugation via N, O, P or S atoms) are located in the radical or group.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ alkyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ alkyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by fluorine, an optionally substituted aryl or aryloxy group having 6 to 40 C atoms, or an optionally substituted heteroaryl or heteroaryloxy group having 2 to 40 C atoms.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]-thiophene, thieno[3,2b]thiophene, dithienothiophene, isobenzothiophene, dibenzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent CH$_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" above and below, are, for example, F, Cl, Br,
I, —CN, —NO$_2$, —NCO, —NCS, —OCN, —SCN, —C(=O)N(R$^x$)$_2$, —C(=O)Y$^1$, —C(=O) R$^x$, —N(R$^x$)$_2$, in which R$^x$ has the meaning indicated above, and Y$^1$ denotes halogen, optionally substituted silyl or aryl having 6 to 40, preferably 6 to 20, C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, R$^0$, —OR$^0$, —CO—R$^0$, —CO—O—R$^0$, —O—CO—R$^0$ or —O—CO—O—R$^0$, in which R$^0$ has the meaning indicated above.

Particularly preferred substituents L are, for example, F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, furthermore phenyl.

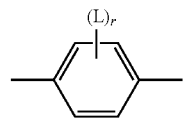

is preferably

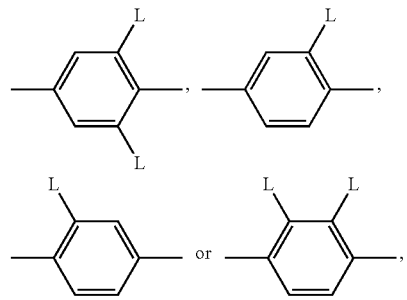

in which L has one of the meanings indicated above.

The polymerizable group P is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C=C double bond or —C≡C— triple bond, and groups which are suitable for polymerization with ring opening, such as, for example, oxetane or epoxide groups.

Preferred groups P are selected from the group consisting of $CH_2=CW^1-CO-O-$, $CH_2=CW^1-CO-$,

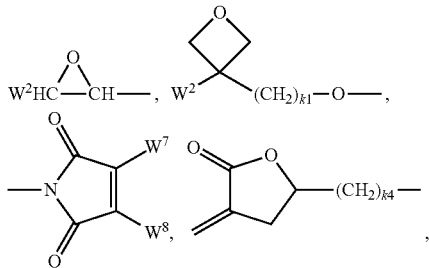

$CH_2=CW^2-(O)_{k3}-$, $CW^1=CH-CO-(O)_{k3}-$, $CW^1=CH-CO-NH-$, $CH_2=CW^1-CO-NH-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}-Phe-(O)_{k2}-$, $CH_2=CH-(CO)_{k1}-Phe-(O)_{k2}-$, $Phe-CH=CH-$, $HOOC-$, $OCN-$ and $W^4W^5W^6Si-$, in which $W^1$ denotes H, F, Cl, CN, $CF_3$, phenyl or alkyl having 1 to 5 C atoms, in particular H, F, $C_1$ or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Particularly preferred groups P are selected from the group consisting of $CH_2=CW^1-CO-O-$, $CH_2=CW^1-CO-$,

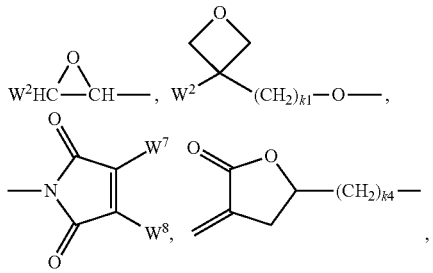

$CH_2=CW^2-O-$, $CH_2=CW^2-$, $CW^1=CH-CO-(O)_{k3}-$, $CW^1=CH-CO-NH-$, $CH_2=CW^1-CO-NH-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $CH_2=CW^1-CO-NH-$, $CH_2=CH-(COO)_{k1}-Phe-(O)_{k2}-$, $CH_2=CH-(CO)_{k1}-Phe-(O)_{k2}-$, $Phe-CH=CH-$ and $W^4W^5W^6Si-$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2=CW^1-CO-O-$, in particular $CH_2=CH-CO-O-$, $CH_2=C(CH_3)-CO-O-$ and $CH_2=CF-CO-O-$, furthermore $CH_2=CH-O-$, $(CH_2=CH)_2CH-O-CO-$, $(CH_2=CH)_2CH-O-$,

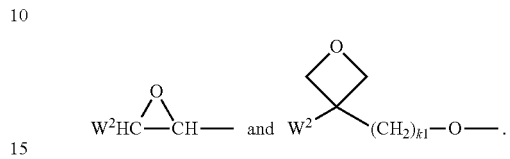

Further very particularly preferred groups P are selected from the group consisting of vinyl, vinyloxy, acrylate, methacrylate, fluoroacrylate, chloroacrylate, oxetane and epoxide groups, and particularly preferably denote an acrylate or methacrylate group.

Preferred spacer groups Sp other than a single bond are selected from the formula Sp''-X'', so that the radical P-Sp- conforms to the formula P-Sp''-X''—, where Sp'' denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N(R⁰)—, —Si(R⁰⁰R⁰⁰⁰)—, —CO—, —CO—O—, —O—CO—, —O—CO—O—, —S—CO—, —CO—S—, —N(R⁰⁰)—CO—O—, —O—CO—N(R⁰⁰)—, —N(R⁰⁰)—CO—N(R⁰⁰)—, —CH=CH— or —C≡C— in such a way that O and/or S atoms are not linked directly to one another, X'' denotes —O—, —S—, —CO—, —CO—O—, —O—CO—, —O—CO—O—, —CO—N(R⁰⁰), —N(R⁰⁰)—CO—, —N(R⁰⁰)—CO—N(R⁰⁰)—, —OCH_2—, —CH_2O—, —SCH_2—, —CH_2S—, —CF_2O—, —OCF_2—, —CF_2S—, —SCF_2—, —CF_2CH_2—, —CH_2CF_2—, —CF_2CF_2—, —CH=N—, —N=CH—, —N=N—, —CH=CR⁰—, —CY²=CY³—, —C≡C—, —CH=CH—CO—O—, —O—CO—CH=CH— or a single bond, $R^{00}$ and $R^{000}$ each, independently of one another, denote H or alkyl having 1 to 12 C atoms, and $Y^2$ and $Y^3$ each, independently of one another, denote H, F, Cl or CN.

X' is preferably —O—, —S—, —CO—, —COO—, —OCO—, —O—COO—, —CO—NR⁰—, —NR⁰—CO—, —NR⁰—CO—NR⁰— or a single bond.

Typical spacer groups Sp'' are, for example, —(CH_2)_{p1}—, —(CH_2CH_2O)_{q1}—CH_2CH_2—, —CH_2CH_2—S—CH_2CH_2—, —CH_2CH_2—NH—CH_2CH_2— or —(SiR⁰⁰R⁰⁰⁰—O)_{p1}—, in which p1 is an integer from 1 to 12, q1 is an integer from 1 to 3, and $R^{00}$ and $R^{000}$ have the meanings indicated above.

Particularly preferred groups -Sp''-X''— are —(CH_2)_{p1}—, —(CH_2)_{p1}—O—, —(CH_2)_{p1}—O—CO—, —(CH_2)_{p1}—O—CO—O—, in which p1 and q1 have the meanings indicated above.

Particularly preferred groups Sp'' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a further preferred embodiment of the invention, $R^a$ and/or $R^b$ in formula I denote a radical containing two or more polymerizable groups (multifunctional polymerizable radicals). Suitable radicals of this type and polymerizable compounds containing them and the preparation thereof are described, for example, in U.S. Pat. No. 7,060,200 B1 or US 2006/0172090 A1. Particular preference is given to multifunctional polymerizable radicals selected from the following formulae:

—X-alkyl-CHP$^1$—CH$_2$—CH$_2$P$^2$  I*a

—X-alkyl-C(CH$_2$P$^1$)(CH$_2$P$^2$)—CH$_2$P$^3$  I*b

—X-alkyl-CHP$^1$CHP$^2$—CH$_2$P$^3$  I*c

—X-alkyl-C(CH$_2$P$^1$)(CH$_2$P$^2$)—C$_{aa}$H$_{2aa+1}$  I*d

—X-alkyl-CHP$^1$—CH$_2$P$^2$  I*e

—X-alkyl-CHP$^1$P$^2$  I*f

—X-alkyl-CP$^1$P$^2$—C$_{aa}$H$_{2aa+1}$  I*g

—X-alkyl-C(CH$_2$P$^1$)(CH$_2$P$^2$)—CH$_2$H$_2$—C(CH$_2$P$^3$)(CH$_2$P$^4$)CH$_2$P$^5$  I*h —X-alkyl-CH((CH$_2$)$_{aa}$P$^1$)((CH$_2$)$_{bb}$P$^2$)  I*i —X-alkyl-CHP$^1$CHP$^2$—C$_{aa}$H$_{2aa+1}$  I*k —X'-alkyl-C(CH$_3$)(CH$_2$P$^1$)(CH$_2$P$^2$)  I*m in which
alkyl denotes a single bond or straight-chain or branched alkylene having 1 to 12 C atoms, in which one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another and in which, in addition, one or more H atoms may be replaced by F, Cl or CN, where R$^{00}$ and R$^{000}$ have the meanings indicated above,
aa and bb each, independently of one another, denote 0, 1, 2, 3, 4, 5 or 6,
X has one of the meanings indicated for X', and
P$^{1-5}$ each, independently of one another, have one of the meanings indicated for P.

Especially preferred are compounds of formula I selected from the following subformulae

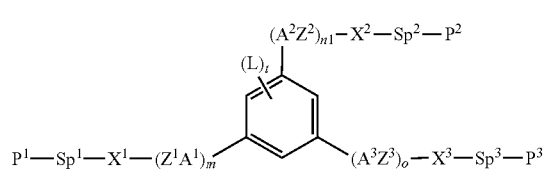

I1

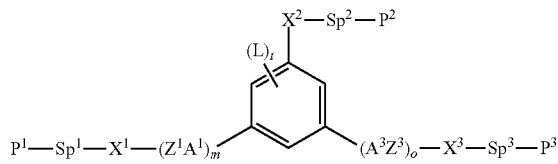

I2 wherein the individual radicals are as defined in formula I and n1 is 1 or 2.

Further preferred compounds of formula I, I1 and I2 are those wherein
n is 0,
n1 is 1,
m is 1,
o is 1,
n is 0, m is 1 and o is 1,
n is 1,
n is 1, m is 1 and o is 1,
t is 0,
t is 1,
P$^1$, P$^2$ and P$^3$ are selected from the group consisting of acrylate, methacrylate and oxetane,
one or more of the radicals Sp$^1$, Sp$^2$ and Sp$^3$ denote a single bond, one or more of the radicals Sp denotes —(CH$_2$)$_{p1}$—, —(CH$_2$)$_{p1}$—O—, —(CH$_2$)$_{p1}$—OCO— or —(CH$_2$)$_{p1}$—OCOO—, in which p1 denotes an integer from 1 to 12 and r1 denotes an integer from 1 to 8,
Sp$^2$ denotes a single bond, and Sp$^1$ and Sp$^3$ are different from a single bond,
Sp$^2$ is different from a single bond, and Sp$^1$ and Sp$^3$ denote a single bond,
Sp$^1$, Sp$^2$ and Sp$^3$ denote a single bond,
X$^1$, X$^2$ and X$^3$ denote independently of each other O, OC(O), C(O)O or a single bond,
at least one of X$^1$, X$^2$ and X$^3$ denotes OC(O), C(O)O or a single bond,
X$^1$, X$^2$ and X$^3$ denote independently of each other OC(O), C(O)O or a single bond,
A$^1$ and A$^3$ are selected from the group consisting of 1,4-phenylene, naphthalene-1,4-diyl and naphthalene-2,6-diyl, very preferably 1,4-phenylene, where these rings are optionally mono- or polysubstituted by L as described above and below,
Z$^1$, Z$^2$ and Z$^3$ are selected from the group consisting of —O—, —CO—O, —OCO—, —OCH$_2$—, —CH$_2$O—, —CF$_2$O—, —OCF$_2$—, —CH$_2$CH$_2$—, —CH=CH, —CF=CF—, —CH=CF—, —CF=CH—, —C≡C—, single bond,
Z$^1$, Z$^2$ and Z$^3$ denote a single bond,
L does not denote or contain a polymerizable group,
L is an unpolymerizable group, preferably selected from F, Cl, —CN and straight-chain or branched alkyl having 1 to 25, particularly preferably 1 to 10, C atoms, in which, in addition, one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O, —O—CO—, —O—CO—O— in such a way that O and/or S atoms are not linked directly to one another, and in which, in addition, one or more H atoms may be replaced by F, Cl, Br, I or CN,
L is selected from the group consisting of F, —CN, and straight chain or branched alkyl, alkoxy, alkylcarbonyl, alkoxycarbonyl, alkylcarbonlyoxy or alkoxycarbonyloxy having 1 to 10 C atoms, wherein one or more H atoms are optionally replaced by F.

Particularly preferred compounds of the formula I are selected from the following sub-formulae:

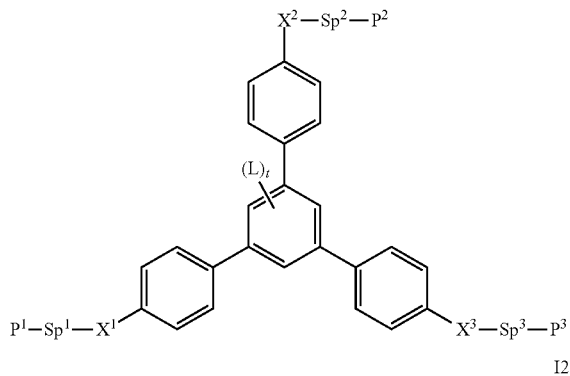

Ia

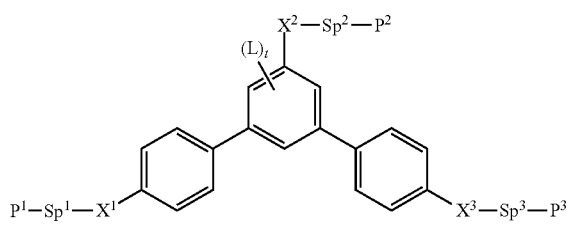

I2a wherein the individual radicals are as defined above and below.

The invention furthermore relates to novel compounds of the formula I, I1, I2 and their sub-formulae, which comprise at least one group $X^1$, $X^2$ and/or $X^3$ that is different from O and S, preferably wherein $X^1$, $X^2$ and $X^3$ denote independently of each other OC(O), C(O)O or a single bond.

The invention furthermore relates to novel intermediates for the preparation of compounds of the formula I, selected from the following formula

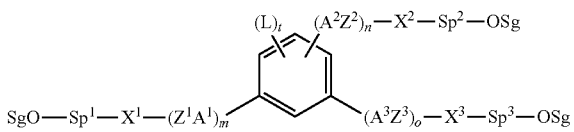

II in which $Sp^{1,2,3}$, $A^{1,2,3}$, $Z^{1,2,3}$, $X^{1,2,3}$, L, m, n, o and t have the meaning indicated in formula I or above and below, and Sg denotes H, or a protecting group, and wherein preferably at least one group $X^1$, $X^2$ and/or $X^3$ is different from O and S, and preferably $X^1$, $X^2$ and $X^3$ denote independently of each other OC(O), C(O)O or a single bond.

Suitable protecting groups Sg are known to the person skilled in the art. Preferred protecting groups are alkyl, acyl, alkylsilyl and arylsilyl groups, especially 2-tetrahydropyranyl or methoxymethyl.

Especially preferred compounds of formula II are selected from the following subformulae

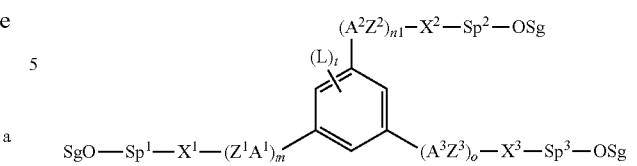

II1

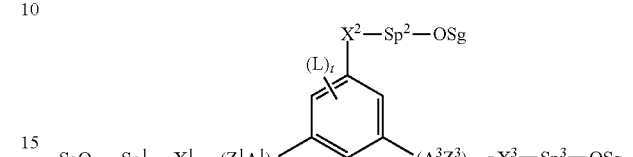

II2 wherein the individual radicals are as defined in formula II and n1 is 1 or 2.

Particularly preferred compounds of the formula II are selected from the group consisting of the following sub-formulae:

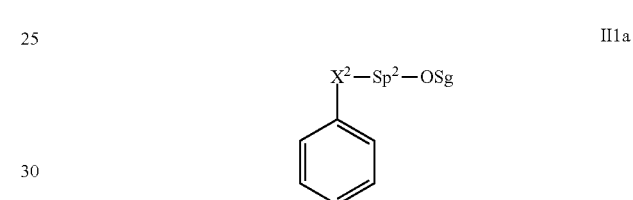

II1a

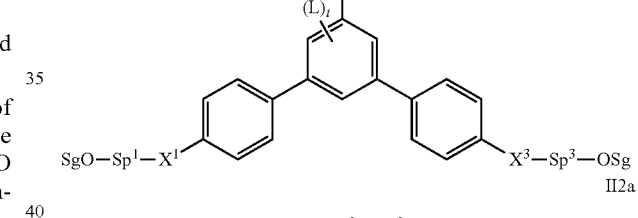

II2a

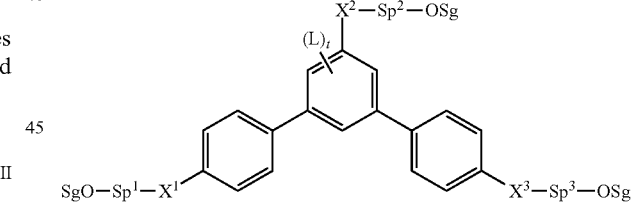

wherein the individual radicals are as defined in formula II.

Especially preferred compounds of formula II, II1 and II2 and their subformulae are those wherein Sg denotes H.

If Sg in formula II, II1 and II2 and their subformulae denotes H, and $Sp^1$, $Sp^2$ or $Sp^3$, respectively, is a single bond, then the adjacent group $X^1$, $X^2$ or $X^3$, respectively, is different from O and S and *—C(O)O—, wherein "*" denotes the linkage to the benzene ring of $A^{1-3}$.

The compounds and intermediates of the formulae I and II and sub-formulae thereof can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

Particularly suitable and preferred processes for the preparation of compounds and intermediates of the formulae I and II are depicted by way of example in the following schemes and preferably comprise one or more of the steps described below.

For example, compounds of formula I can be synthesised by esterification or etherification of the intermediates of formula II using corresponding acids, acid derivatives, or halogenated compounds containing a polymerizable group P.

As exemplarily shown in Scheme 1, acrylic or methacrylic esters (3) (where R is H or $CH_3$) can be prepared by esterification of the corresponding alcohols (2) with acid derivatives like, for example, (meth)acryloyl chloride or (meth)acrylic anhydride in the presence of a base like pyridine or triethyl amine, and 4-(N,N-dimethylamino)pyridine (DMAP). Alternatively the esters (3) can be prepared by esterification of the alcohols (2) with (meth)acrylic acid in the presence of a dehydrating reagent, for example according to Steglich with dicyclohexylcarbodiimide (DCC) or 1-ethyl-3-(3-dimethylaminopropyl)carbodiimide (EDC) and DMAP.

Scheme 1

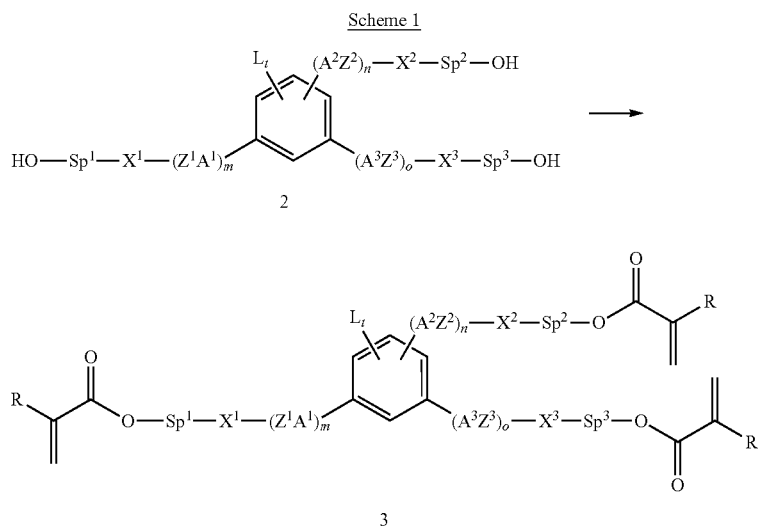

Suitable commercially available starting materials for the synthesis of the intermediates 2 are for example 3,5-dibromo phenol or 3,5-dibromo anisole, which can be reacted in a coupling reaction, like for example Suzuki, Kumada oder Negishi coupling, in the presence of a transition metal catalyst, into terphenyl derivatives, as shown in Scheme 2. This allows controlled modification of the phenol group for example into ethers, esters or, after reaction to the triflate, into further alkyl or aryl compounds by another cross coupling reaction.

From the 1,3,5-trihalogen benzenes those with mixed halogen substitution are preferred due to their higher selectivity, like for example 1-Bromo-3,5-Dichloro benzene or 1-Iodo-3,5-dibromo benzene.

Scheme 2

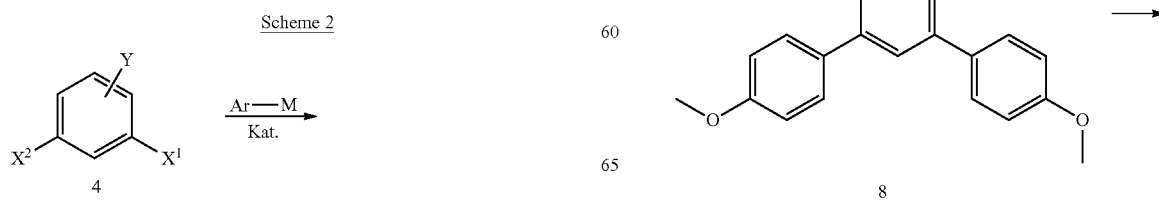

X = Cl, Br, I, OTf
Y = X, OH, OR
M = MgX, Li, ZnX, B(OH)$_2$, B(OR)$_2$

For example L. H. Heitman et al., J. Med. Chem. 2009, 52(7), 2036-2042, describes 4,4"-Dimethoxy-[1,1':3',1"]-terphenyl]-5'-ol (8), which can be reacted, after ether cleavage, with HBr in glacial acetic acid or with boron tribromide to the triacrylate, as exemplarily shown in Scheme 3.

Scheme 3

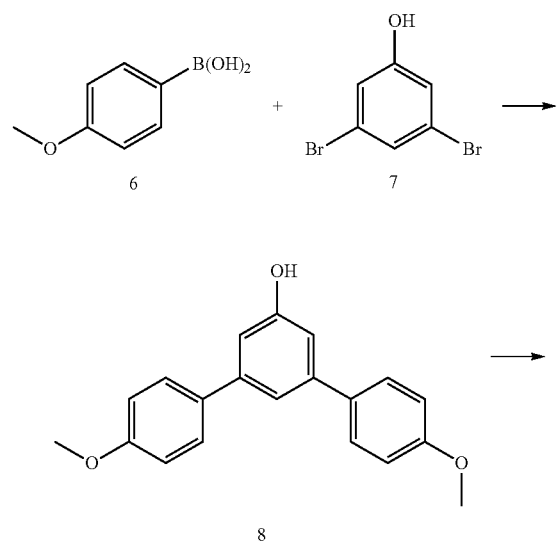

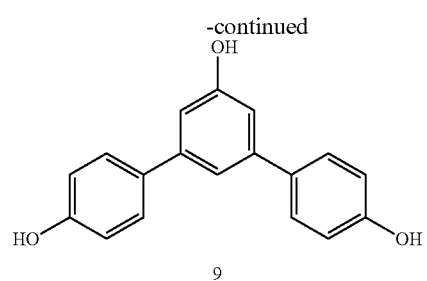

9

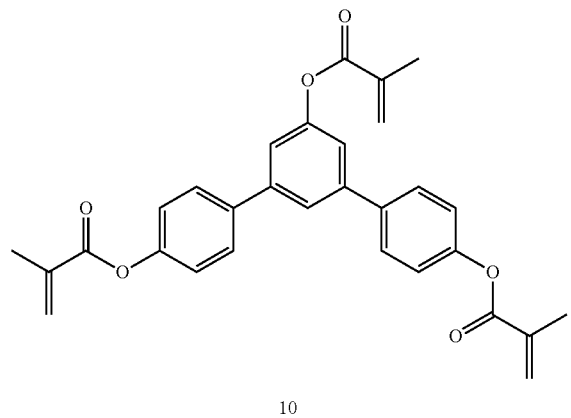

10

In analogy thereto the use of corresponding substituted boronic acids or boronic acid esters enables access to compounds with spacer groups, as shown in Scheme 4.

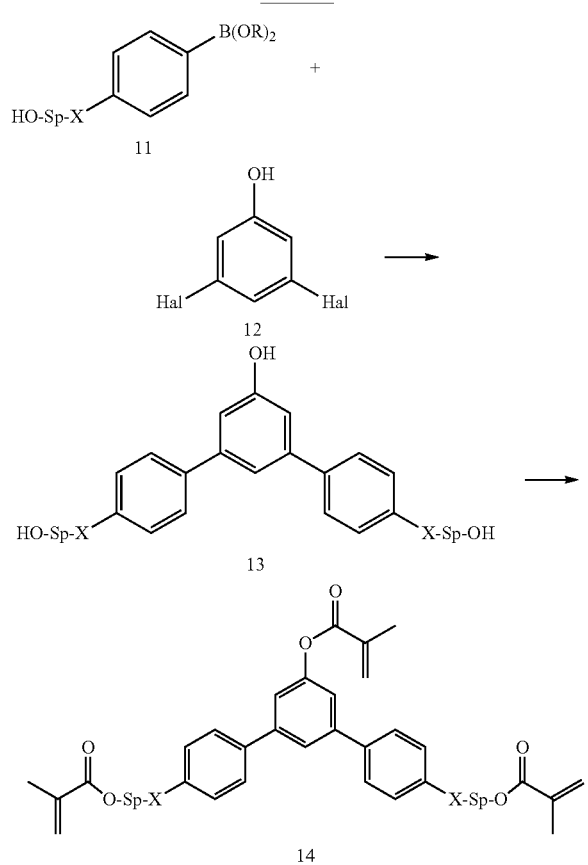

Examples of suitable and preferred boronic acids and boronic acid esters, which are known from the literature, are listed in Table 1.

TABLE 1

| Boronic acid (ester) | CAS-Reg.-No. |
|---|---|
| | 221006-65-1 |
| | 1206641-20-4 |
| | 1366598-18-6 |
| | 741699-28-5 |
| | 1245014-68-9 |
| | 1331945-14-2 |
| | 651030-55-6 |
| | 850568-48-8 |

Access to substituted 3,5-diaryl phenols is described for example in Alan R. Katritzky et al., *J. Org. Chem.* 1997, 62, 8215-8217, see Scheme 5. A similar reaction was disclosed in K. Eichinger, Synthesis 1987, 1061-1064.

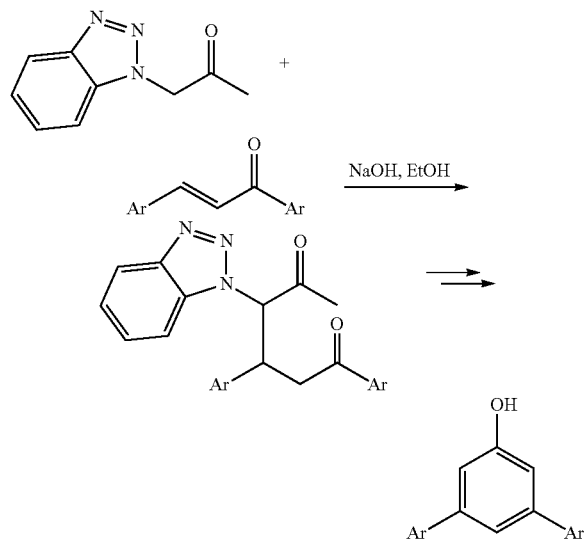

Scheme 5

For the production of PSA displays, the polymerizable compounds are polymerized or crosslinked (if one compound contains two or more polymerizable groups) by in-situ polymerization in the LC medium between the substrates of the LC display with application of a voltage. The polymerization can be carried out in one step. It is also possible firstly to carry out the polymerization with application of a voltage in a first step in order to produce a pretilt angle, and subsequently, in a second polymerization step without an applied voltage, to polymerise or crosslink the compounds which have not reacted in the first step ("end curing").

Suitable and preferred polymerization methods are, for example, thermal or photopolymerization, preferably photo-photopolymerization, in particular UV photophotopolymerization. One or more initiators can optionally also be added here. Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1173® (Ciba AG). If an initiator is employed, its proportion is preferably 0.001 to 5% by weight, particularly preferably 0.001 to 1% by weight.

The polymerizable compounds according to the invention are also suitable for polymerization without an initiator, which is accompanied by considerable advantages, such, for example, lower material costs and in particular less contamination of the LC medium by possible residual amounts of the initiator or degradation products thereof. The polymerization can thus also be carried out without the addition of an initiator. In a preferred embodiment, the LC medium thus comprises no polymerization initiator.

The polymerizable component A) or the LC medium may also comprise one or more stabilisers in order to prevent undesired spontaneous polymerization of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerizable component A), is preferably 10-500,000 ppm, particularly preferably 50-50,000 ppm.

The LC media according to the invention for use in PSA displays preferably comprise from >0 to <5% by weight, particularly preferably from >0 to <1% by weight, very particularly preferably from 0.01 to 0.5% by weight, of polymerizable compounds, in particular polymerizable compounds of the formulae indicated above.

Particular preference is given to LC media comprising one, two or three polymerizable compounds according to the invention.

Preference is furthermore given to LC media in which the polymerizable component (component A) comprises exclusively polymerizable compounds according to the invention.

Preference is furthermore given to LC media in which component B) is an LC compound or an LC mixture which has a nematic liquid-crystal phase.

Preference is furthermore given to achiral polymerizable compounds according to the invention and LC media in which the compounds of component A) and/or B) are selected exclusively from the group consisting of achiral compounds.

Preference is furthermore given to LC media in which the polymerizable component or component A) comprises one or more polymerizable compounds according to the invention containing one polymerizable group (monoreactive) and one or more polymerizable compounds according to the invention containing two or more, preferably two, polymerizable groups (di- or multireactive).

Preference is furthermore given to PSA displays and LC media in which the polymerizable component or component A) comprises exclusively polymerizable compounds according to the invention containing two polymerizable groups (direactive).

The proportion of the polymerizable component or component A) in the LC media according to the invention is preferably from >0 to <5%, particularly preferably from >0 to <1%, very particularly preferably from 0.01 to 0.5%.

The proportion of the liquid-crystalline component or component B) in the LC media according to the invention is preferably from 95 to <100%, particularly preferably from 99 to <100%.

The polymerizable compounds according to the invention can be polymerized individually, but it is also possible to polymerise mixtures which comprise two or more polymerizable compounds according to the invention, or mixtures comprising one or more polymerizable compounds according to the invention and one or more further polymerizable compounds (comonomers), which are preferably mesogenic or liquid-crystalline. In the case of polymerization of such mixtures, copolymers form. The invention furthermore relates to the polymerizable mixtures mentioned above and below. The polymerizable compounds and comonomers are mesogenic or non-mesogenic, preferably mesogenic or liquid-crystalline.

Suitable and preferred mesogenic comonomers, particularly for use in PSA displays, are selected, for example, from the following formulae:

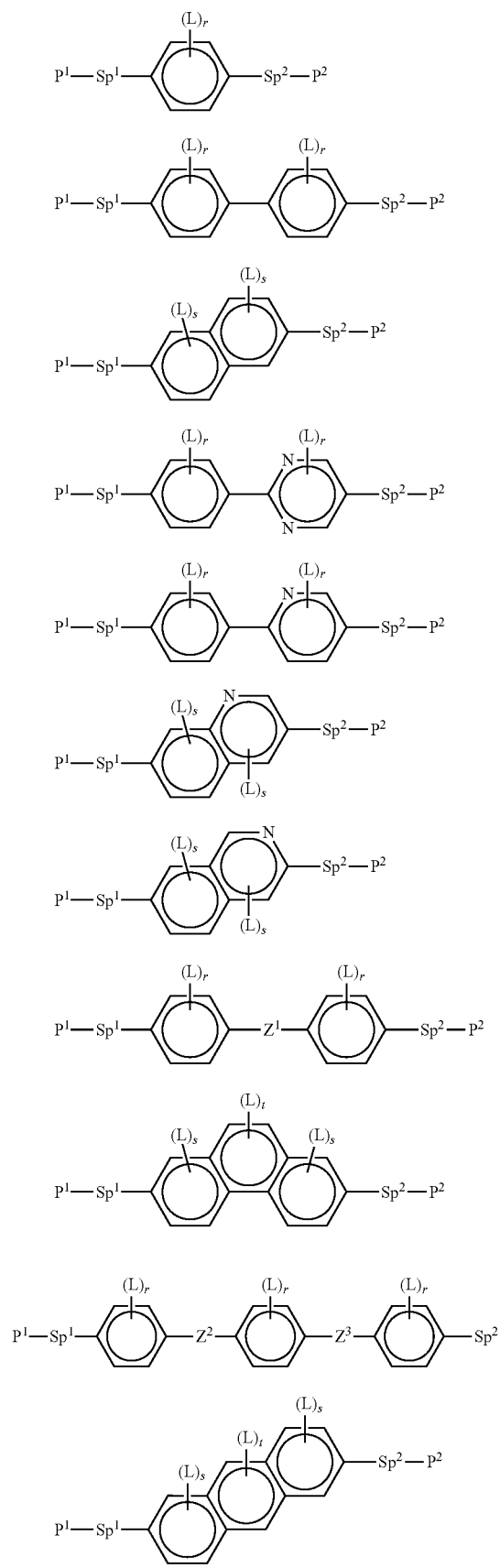

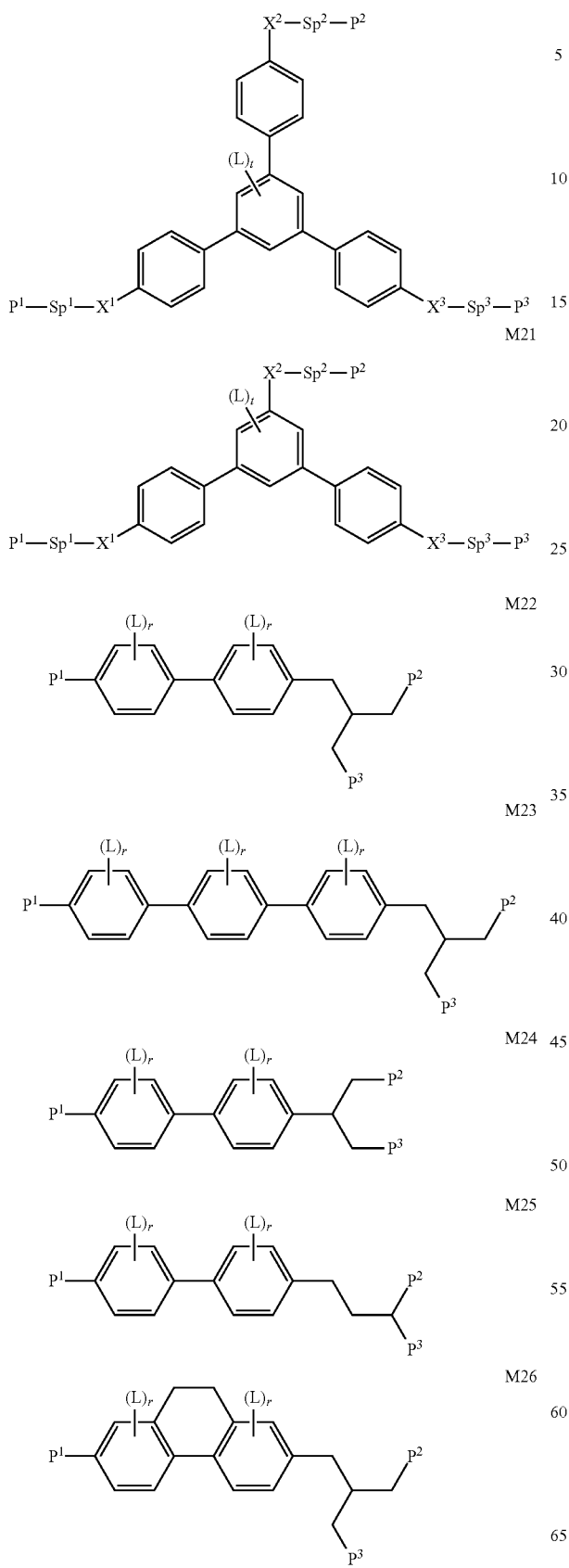
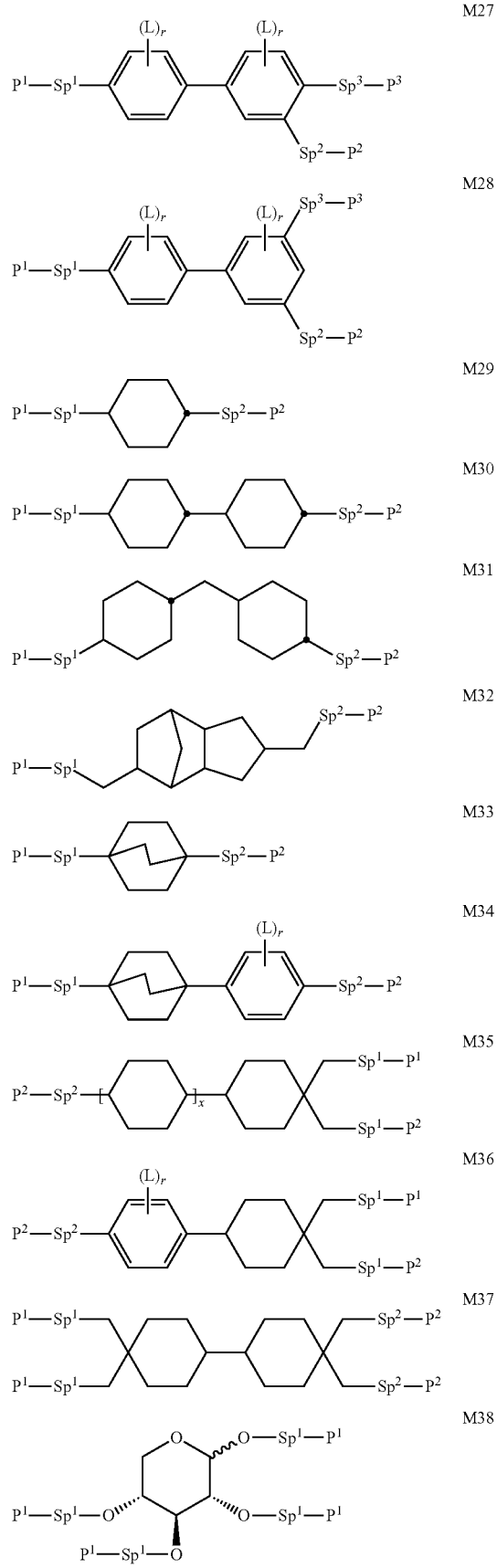

-continued

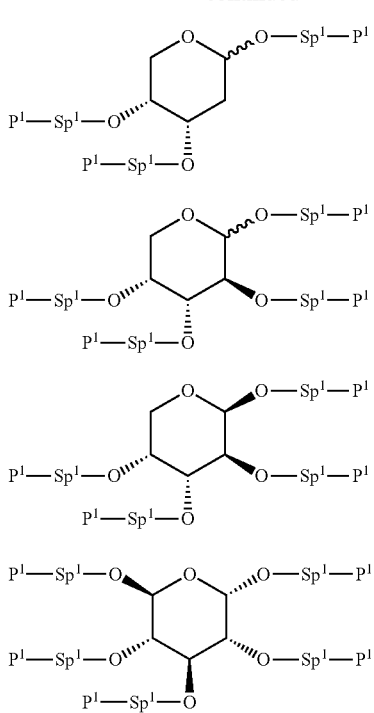

M39

M40

M41

M42 in which the individual radicals have the following meanings:
$P^1$, $P^2$ and $P^3$ each, independently of one another, denote a polymerizable group, preferably having one of the meanings indicated above and below for P, particularly preferably an acrylate, methacrylate, fluoroacrylate, oxetane, vinyl, vinyloxy or epoxide group,
$Sp^1$, $Sp^2$ and $Sp^3$ each, independently of one another, denote a single bond or a spacer group, preferably having one of the meanings indicated above and below for Sp, and particularly preferably denote —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where the linking to the adjacent ring in the last-mentioned groups takes place via the O atom,
where, in addition, one or more of the radicals $P^1$-$Sp^1$-, $P^1$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present does not denote $R^{aa}$,
$R^{aa}$ denotes H, F, Cl, CN or straight-chain or branched alkyl having 1 to 25 C atoms, in which, in addition, one or more non-adjacent $CH_2$ groups may each be replaced, independently of one another, by
$C(R^0)$=$C(R^{00})$—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms),
$R^0$, $R^{00}$ each, independently of one another and identically or differently on each occurrence, denote H or alkyl having 1 to 12 C atoms,
$R^y$ and $R^z$ each, independently of one another, denote H, F, $CH_3$ or $CF_3$,
$X^1$, $X^2$ and $X^3$ each, independently of one another, denote —CO—O—, —O—CO— or a single bond,
$Z^1$ denotes —O—, —CO—, —C($R^yR^z$)— or —$CF_2CF_2$—,
$Z^2$ and $Z^3$ each, independently of one another, denote —CO—O—, —O—CO—, —$CH_2$O—, —O$CH_2$—, —$CF_2$O—, —O$CF_2$— or —$(CH_2)_n$—, where n is 2, 3 or 4,
L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F,
L' and L" each, independently of one another, denote H, F or Cl,
r denotes 0, 1, 2, 3 or 4,
s denotes 0, 1, 2 or 3,
t denotes 0, 1 or 2,
x denotes 0 or 1.
Especially preferred are compounds of formulae M1 to M28.
In the compounds of formulae M1 to M42

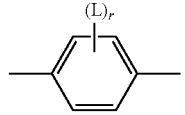

is preferably

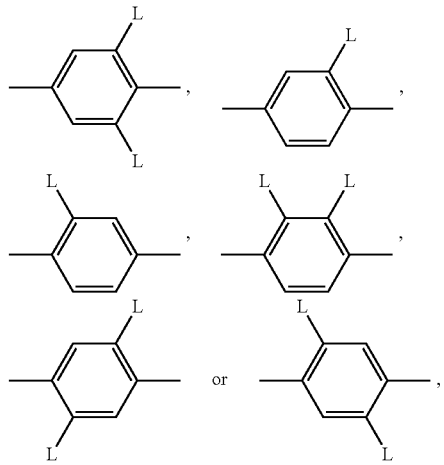

wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ oder $OCF_3$, especially F or $CH_3$.

Besides the polymerizable compounds described above, the LC media for use in the LC displays according to the invention comprise an LC mixture ("host mixture") comprising one or more, preferably two or more, low-molecular-weight (i.e. monomeric or unpolymerized) compounds. The latter are stable or unreactive to a polymerization reaction under the conditions used for polymerization of the polymerizable compounds. In principle, any LC mixture which is suitable for use in conventional VA and OCB displays is suitable as host mixture. Suitable LC mixtures are known to the person skilled in the art and are described in the literature, for example mixtures in VA displays in EP 1 378 557 A1 and mixtures for OCB displays in EP 1 306 418 A1 and DE 102 24 046 A1.

The polymerizable compounds of formula I are especially suitable for use in an LC host mixture that comprises one or more compounds having a terminal alkenyl group, where they show improved properties, like solubility, reactivity or capability of generating a tilt angle, compared to reactive mesogens known from prior art.

In a first preferred embodiment the LC medium contains an LC host mixture based on compounds with negative dielectric anisotropy. Such LC media are especially suitable for use in PSA-VA displays. Particularly preferred embodiments of such an LC medium are those of sections a)-x) below:

a) LC medium which comprises one or more compounds of the formulae CY and/or PY:

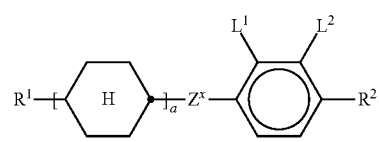

CY

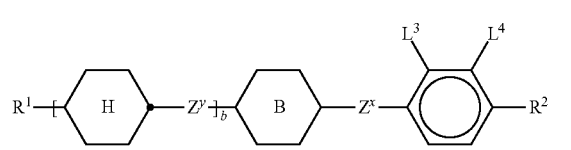

PY wherein
a denotes 1 or 2,
b denotes 0 or 1,

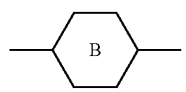

denotes

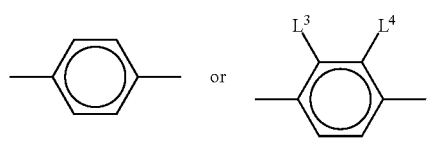

$R^1$ and $R^2$ each, independently of one another, denote alkyl having 1 to 12 C atoms, where, in addition, one or two non-adjacent $CH_2$ groups may be replaced
  by —O—, —CH=CH—, —CO—, —OCO— or —COO— in such a way that O atoms are not linked directly to one another, preferably alkyl or alkoxy having 1 to 6 C atoms, $Z^x$ and $Z^y$ each, independently of one another,
  denote —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond, $L^{1-4}$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl.

The compounds of the formula CY are preferably selected from the group consisting of the following sub-formulae:

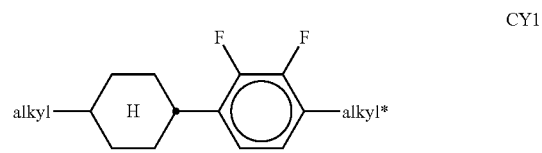

CY1

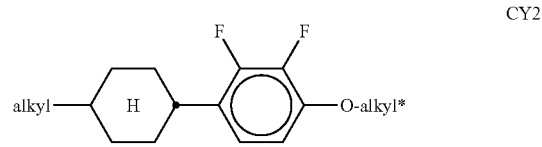

CY2

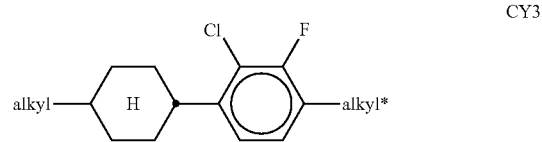

CY3

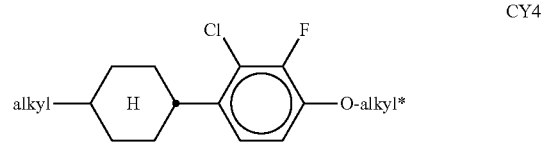

CY4

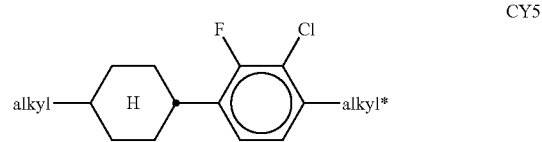

CY5

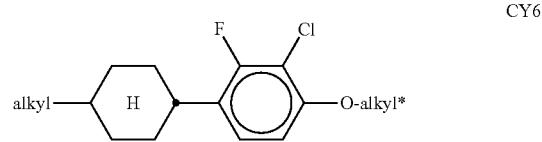

CY6

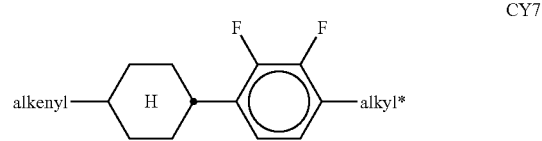

CY7

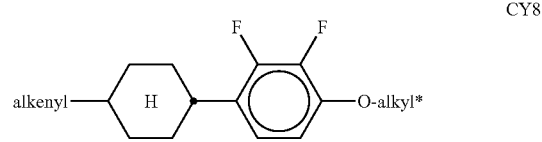

CY8

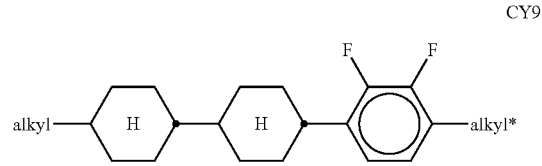

CY9

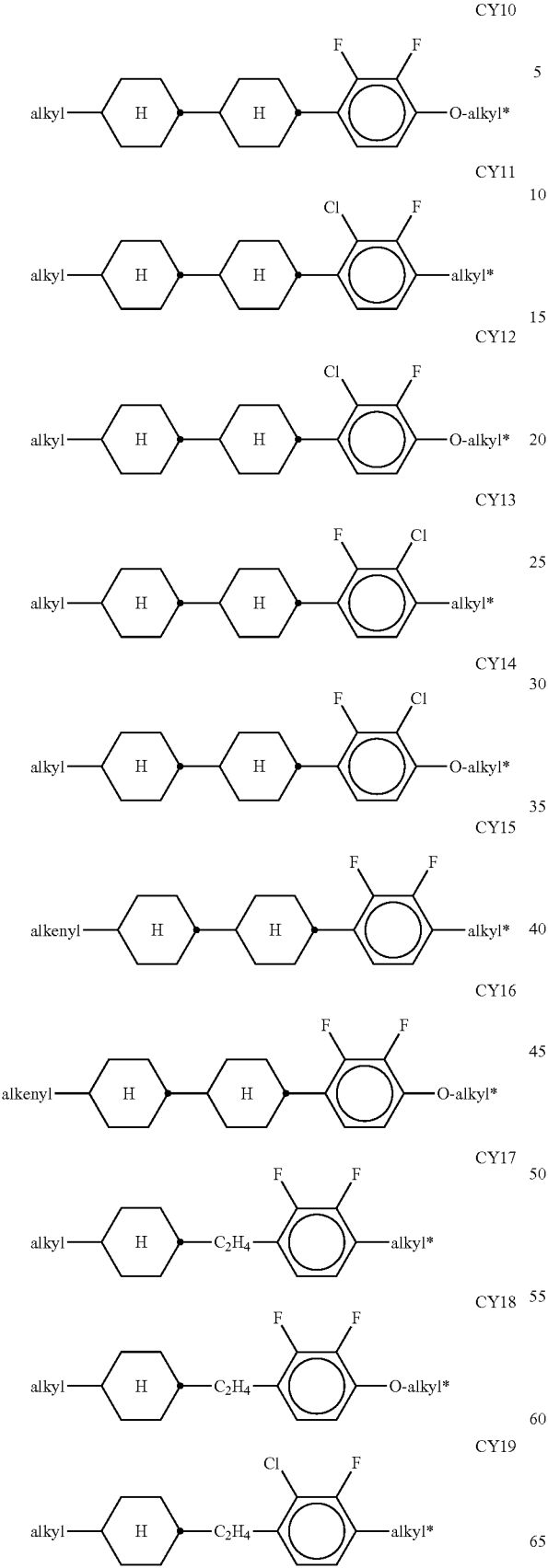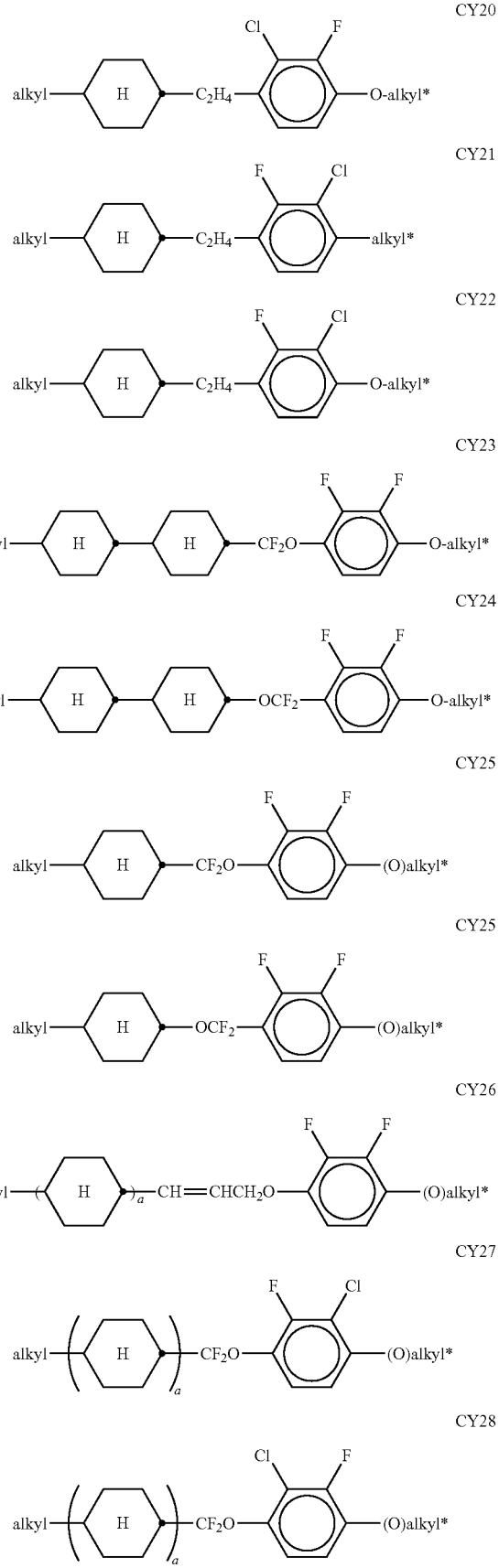

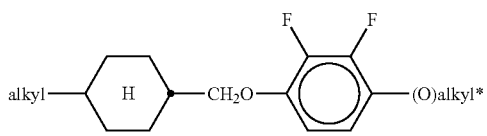
CY29

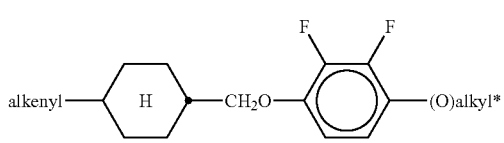
CY30

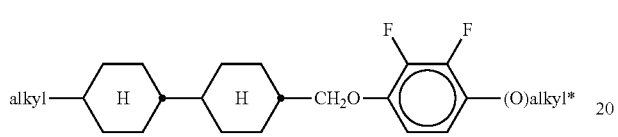
CY31

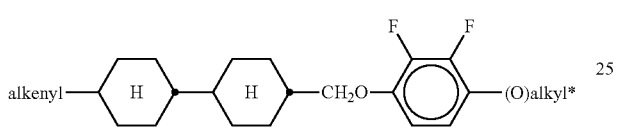
CY32 in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2\!=\!CH\!-\!$, $CH_2\!=\!CHCH_2CH_2\!-\!$, $CH_3\!-\!CH\!=\!CH\!-\!$, $CH_3\!-\!CH_2\!-\!CH\!=\!CH\!-\!$, $CH_3\!-\!(CH_2)_2\!-\!CH\!=\!CH\!-\!$, $CH_3\!-\!(CH_2)_3\!-\!CH\!=\!CH\!-\!$ or $CH_3\!-\!CH\!=\!CH\!-\!(CH_2)_2\!-\!$.

The compounds of the formula PY are preferably selected from the group consisting of the following sub-formulae:

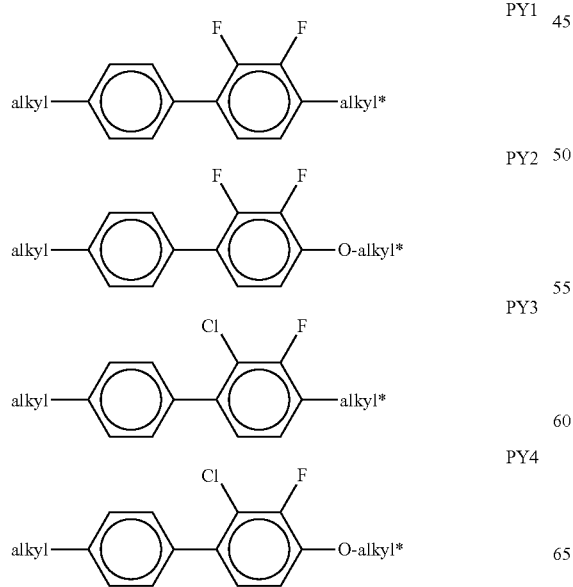

PY1, PY2, PY3, PY4

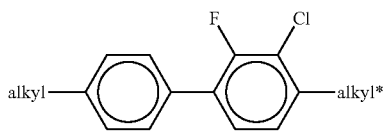
PY5

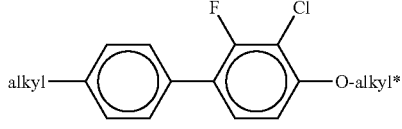
PY6

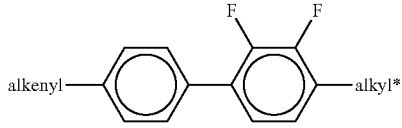
PY7

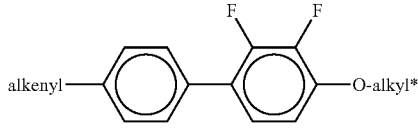
PY8

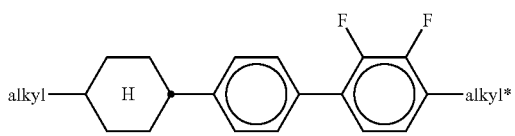
PY9

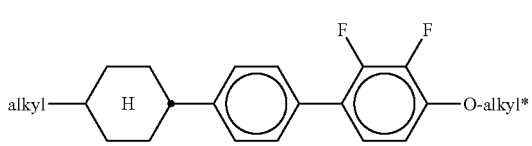
PY10

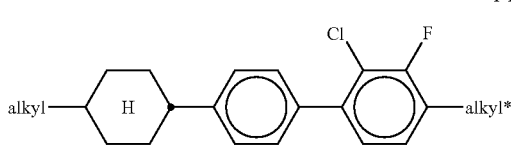
PY11

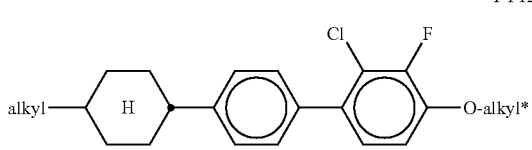
PY12

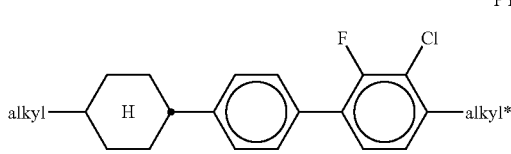
PY13

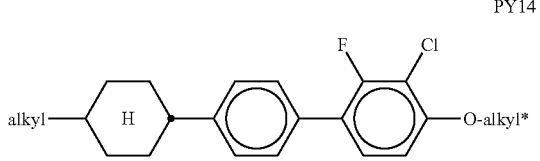
PY14

-continued

PY15 alkenyl—[H]—[benzene]—[2,3-F benzene]—alkyl*

PY16 alkenyl—[H]—[benzene]—[2,3-F benzene]—O-alkyl*

PY17 alkyl—[H]—CH=CH—[benzene]—[2,3-F benzene]—(O)alkyl*

PY18 alkyl—[H]—C$_2$H$_4$—[benzene]—[2,3-F benzene]—(O)alkyl*

PY19 alkyl—[H]—[benzene]—OCF$_2$—[2,3-F benzene]—(O)alkyl*

PY20 alkyl—[H]—[benzene]—CF$_2$O—[2,3-F benzene]—(O)alkyl* in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

b) LC medium which additionally comprises one or more compounds of the following formula:

ZK

R$^3$—[C]—Z$^y$—[D]—R$^4$ in which the individual radicals have the following meanings:

[C] denotes

[cyclohexane]

denotes

[H], [tetrahydropyran-O], [O-tetrahydropyran], [cyclohexene] or [cyclohexene], [D], denotes

[H] or [benzene],

R$^3$ and R$^4$ each, independently of one another, denote alkyl having 1 to 12 C atoms, in which, in addition, one or two non-adjacent CH$_2$ groups may be replaced by —O—, —CH=CH—, —CO—, —O—CO— or —CO—O— in such a way that O atoms are not linked directly to one another, Z$^y$ denotes —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond.

The compounds of the formula ZK are preferably selected from the group consisting of the following sub-formulae:

ZK1 alkyl—[H]—[H]—alkyl*

ZK2 alkyl—[H]—[H]—O-alkyl*

ZK3 alkenyl—[H]—[H]—alkyl

ZK4 alkenyl—[H]—[H]—alkenyl*

ZK5 alkyl—[H]—[benzene]—alkyl*

-continued

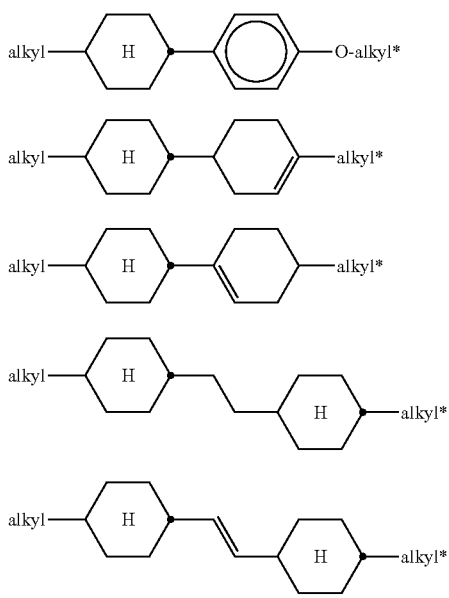

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

c) LC medium which additionally comprises one or more compounds of the following formula:

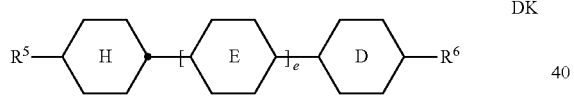

DK in which the individual radicals on each occurrence, identically or differently, have the following meanings:

$R^5$ and $R^6$ each, independently of one another, have one of the meanings indicated above $R^1$,

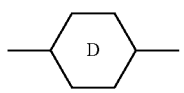

denotes

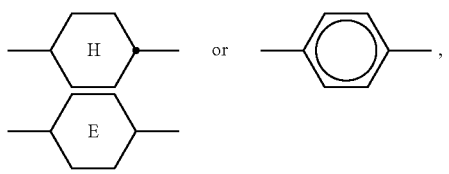

denotes

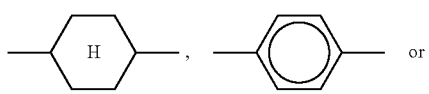

-continued

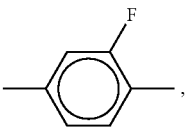

and e denotes 1 or 2.

The compounds of the formula DK are preferably selected from the group consisting of the following sub-formulae:

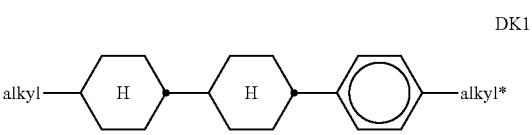

DK1

DK2

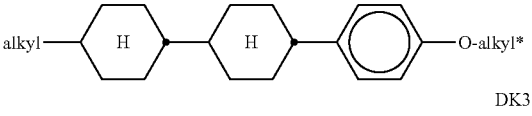

DK3

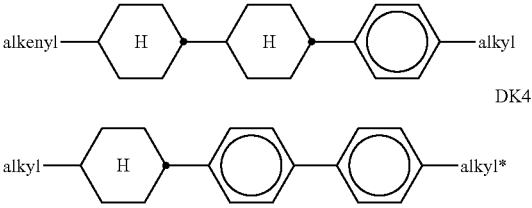

DK4

DK5

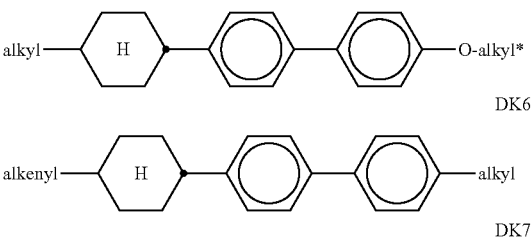

DK6

DK7

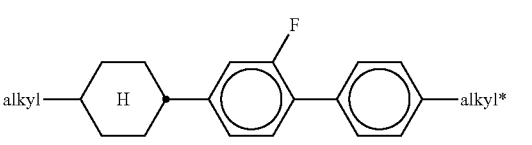

DK8

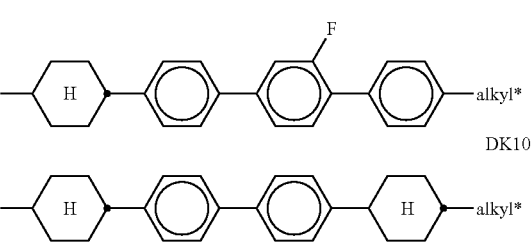

DK9

DK10

-continued

DK11

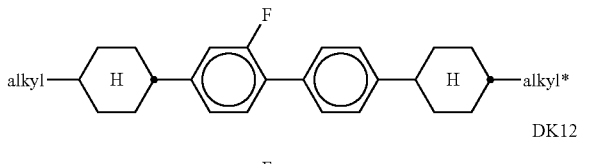

DK12

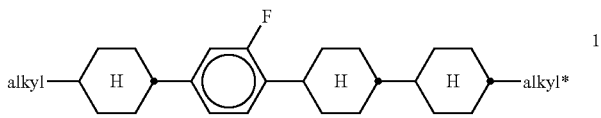

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

d) LC medium which additionally comprises one or more compounds of the following formula:

LY

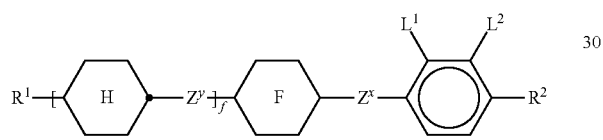

in which the individual radicals have the following meanings:

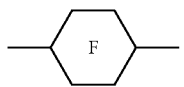

denotes

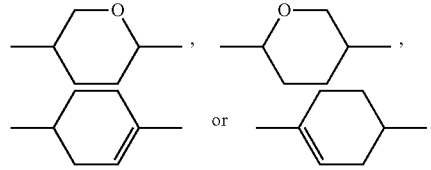

f denotes 0 or 1, $R^1$ and $R^2$ each, independently of one another, denote alkyl having 1 to 12 C atoms, where, in addition, one or two non-adjacent $CH_2$ groups may be replaced by $-O-$, $-CH=CH-$, $-CO-$, $-OCO-$ or $-COO-$ in such a way that O atoms are not linked directly to one another, $Z^x$ and $Z^y$ each, independently of one another, denote $-CH_2CH_2-$, $-CH=CH-$, $-CF_2O-$, $-OCF_2-$, $-CH_2O-$, $-OCH_2-$, $-CO-O-$, $-O-CO-$, $-C_2F_4-$, $-CF=CF-$, $-CH=CH-CH_2O-$ or a single bond, preferably a single bond, $L^1$ and $L^2$ each, independently of one another, denote F, Cl, $OCF_3$, $CF_3$, $CH_3$, $CH_2F$, $CHF_2$.

Preferably, both radicals $L^1$ and $L^2$ denote F or one of the radicals $L^1$ and $L^2$ denotes F and the other denotes Cl.

The compounds of the formula LY are preferably selected from the group consisting of the following sub-formulae:

LY1
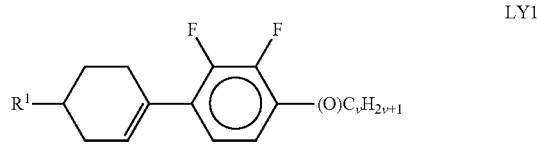

LY2
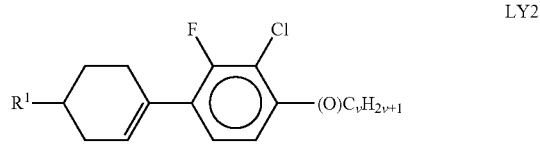

LY3
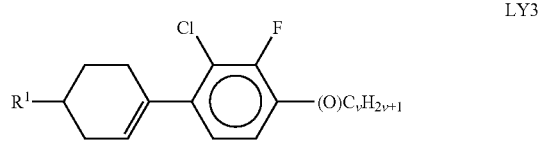

LY4
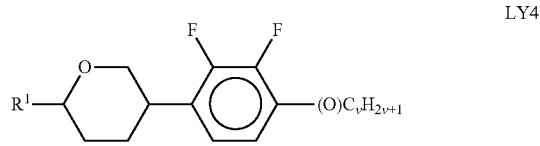

LY5
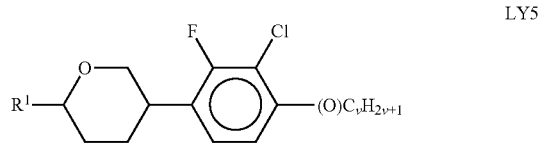

LY6
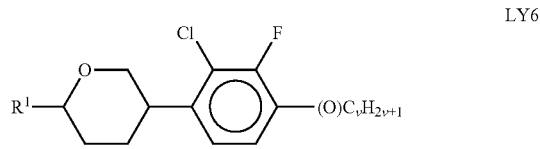

LY7
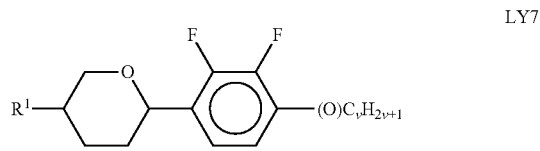

LY8
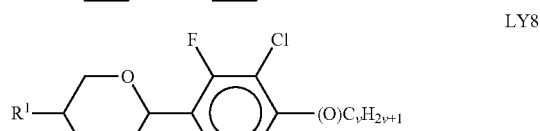

LY9
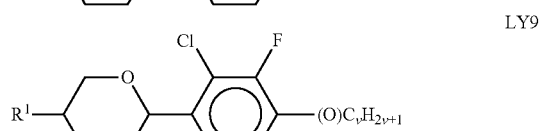

LY10
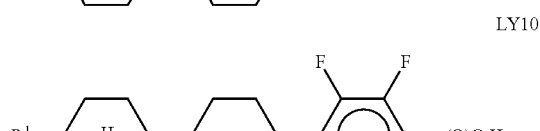

LY11
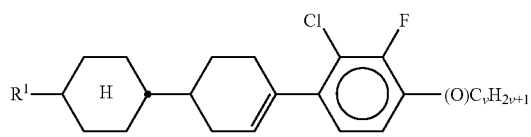

LY12
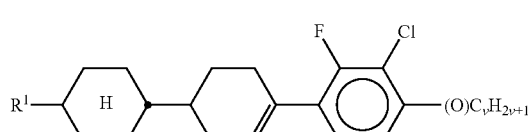

LY13
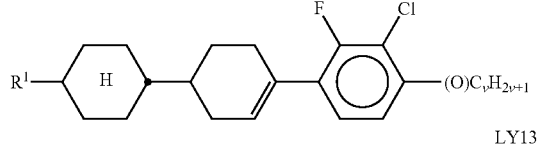

LY14
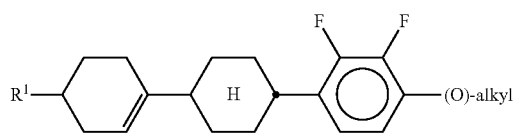

LY15
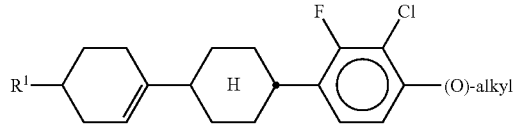

LY16
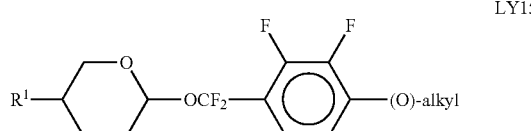

LY17
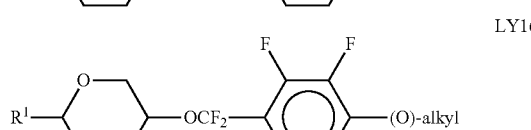

LY18
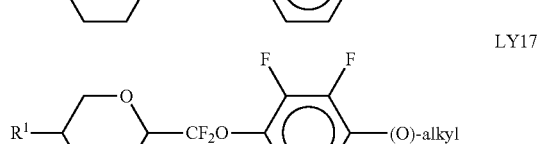

LY19
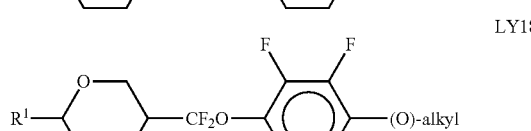

LY20
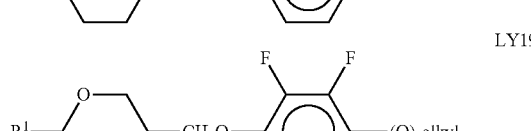

LY21
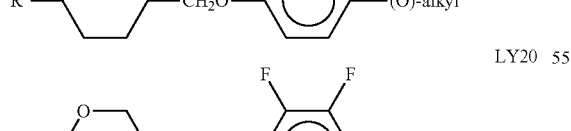

LY22
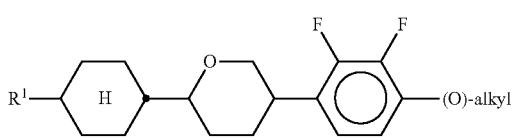

LY23
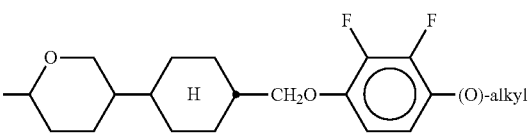

LY24
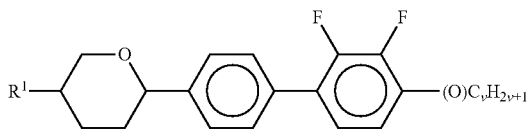

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

e) LC medium which additionally comprises one or more compounds selected from the group consisting of the following formulae:

G1
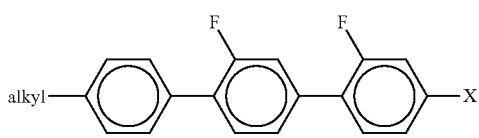

G2
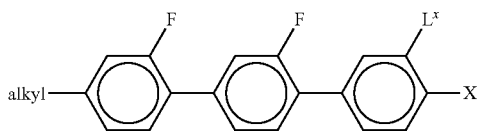

G3
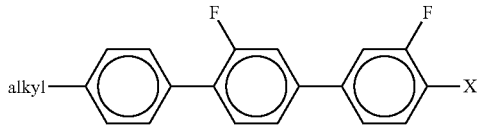

G4
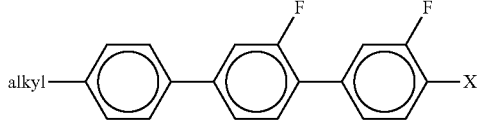

in which alkyl denotes $C_{1-6}$-alkyl, $L^x$ denotes H or F, and X denotes F, Cl, $OCF_3$, $OCHF_2$ or OCH=$CF_2$. Particular preference is given to compounds of the formula G1 in which X denotes F.

f) LC medium which additionally comprises one or more compounds selected from the group consisting of the following formulae:

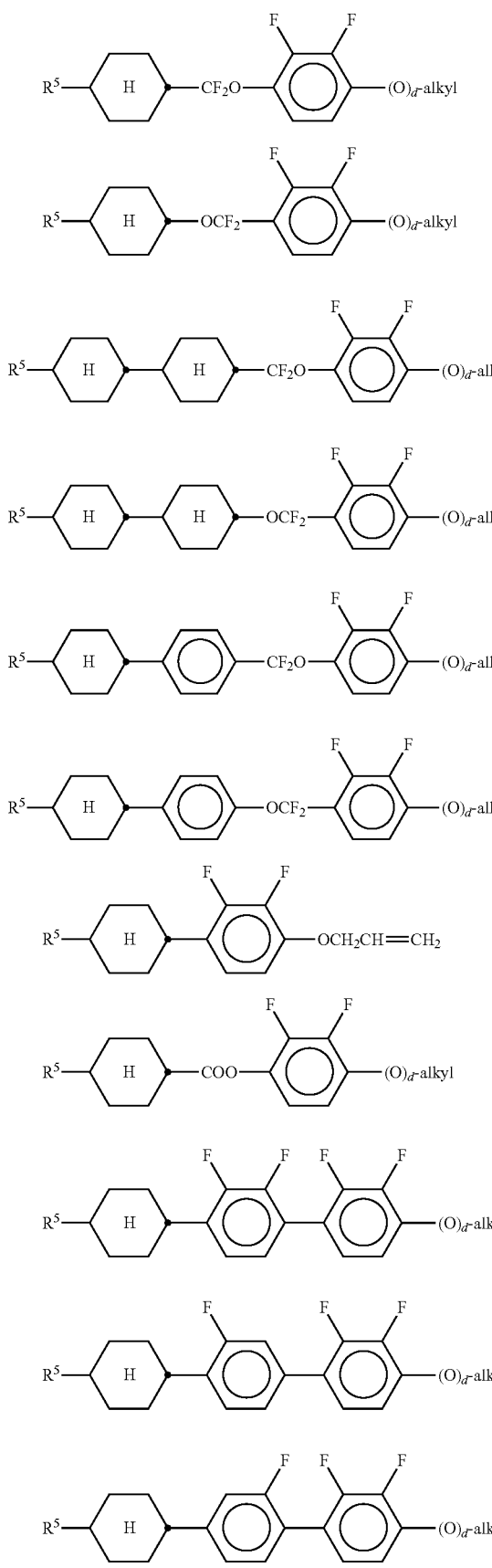

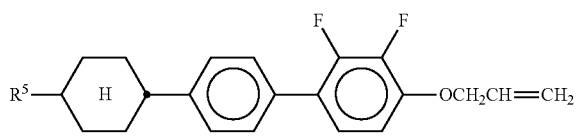

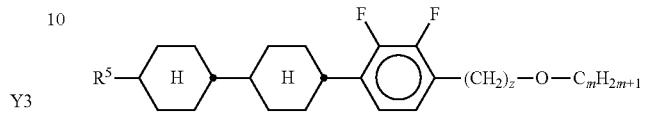

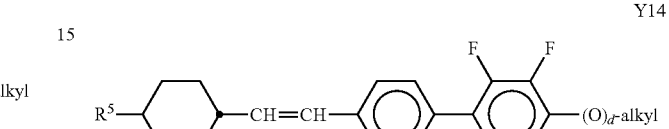

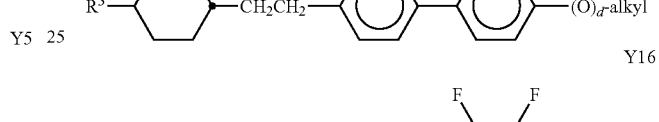

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

g) LC medium which additionally comprises one or more biphenyl compounds selected from the group consisting of the following formulae:

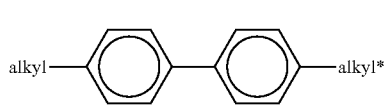

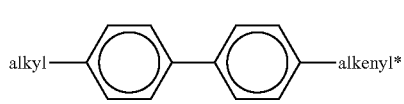

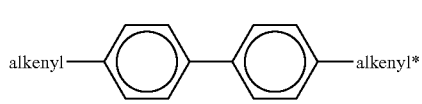

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

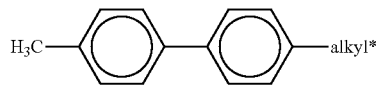

B1a

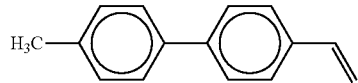

B2a

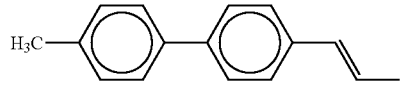

B2b

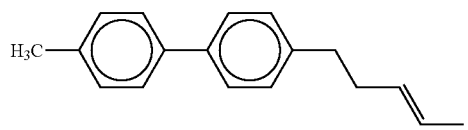

B2c in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

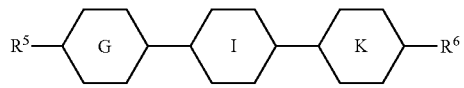

T in which $R^5$ and $R^6$ each, independently of one another, have one of the meanings indicated above for $R^1$, and

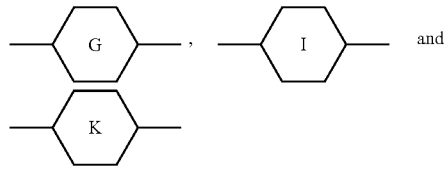

each, independently of one another, denote

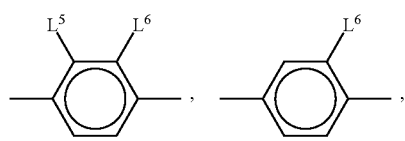

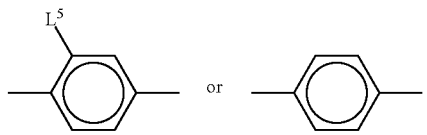

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

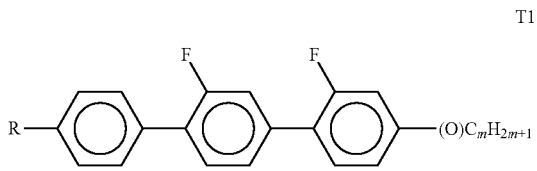

T1

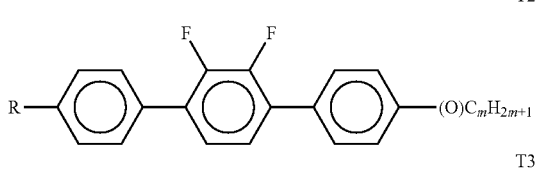

T2

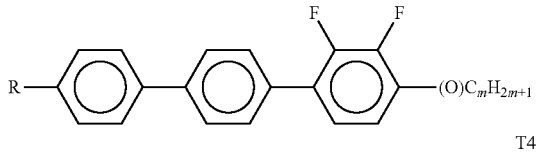

T3

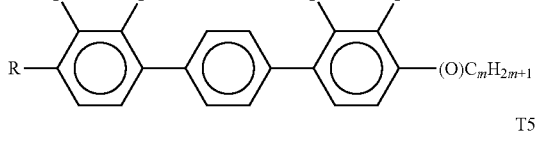

T4

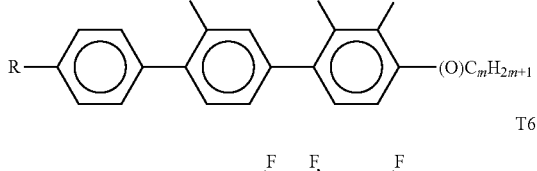

T5

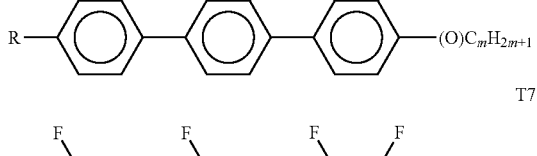

T6

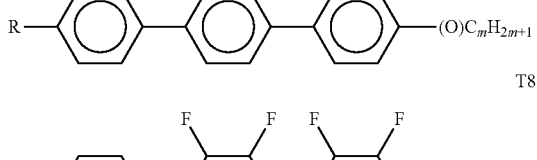

T7

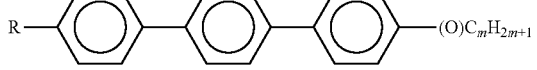

T8

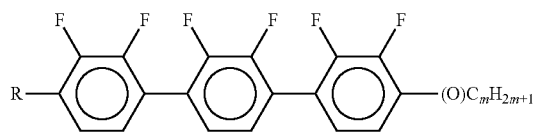
T9

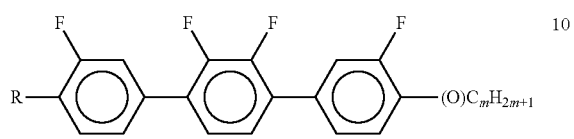
T10

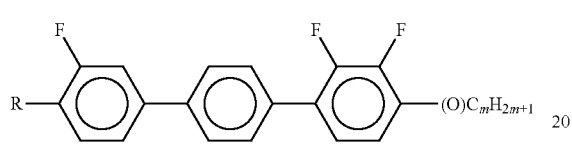
T11

T12

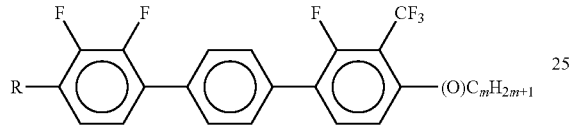
T13

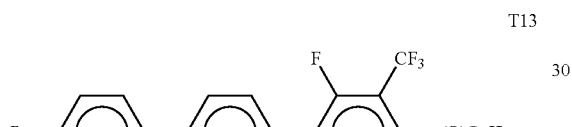
T14

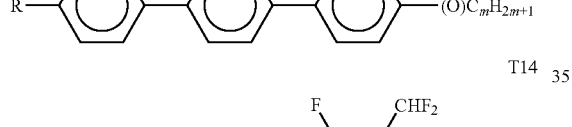
T15

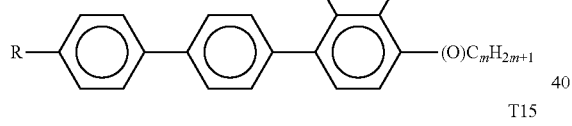
T16

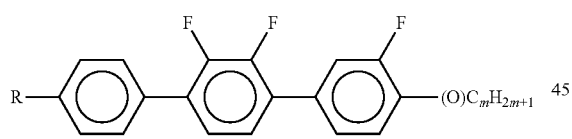
T17

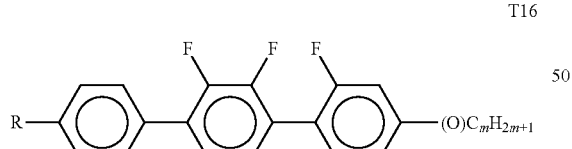
T18

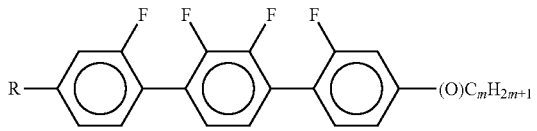
T19

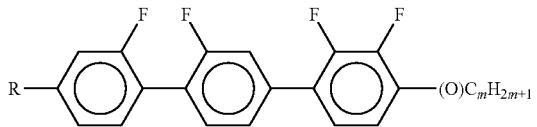
T20

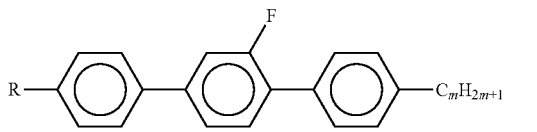
T21

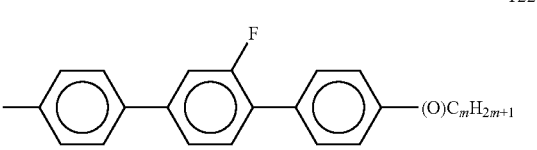
T22

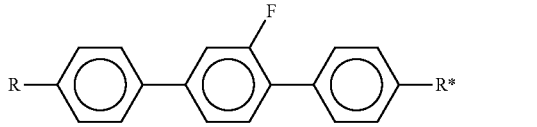
T23

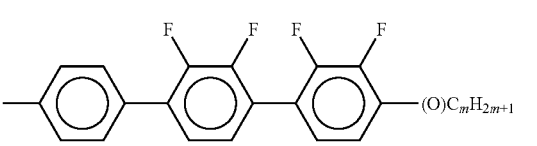
T24 in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be ≥0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

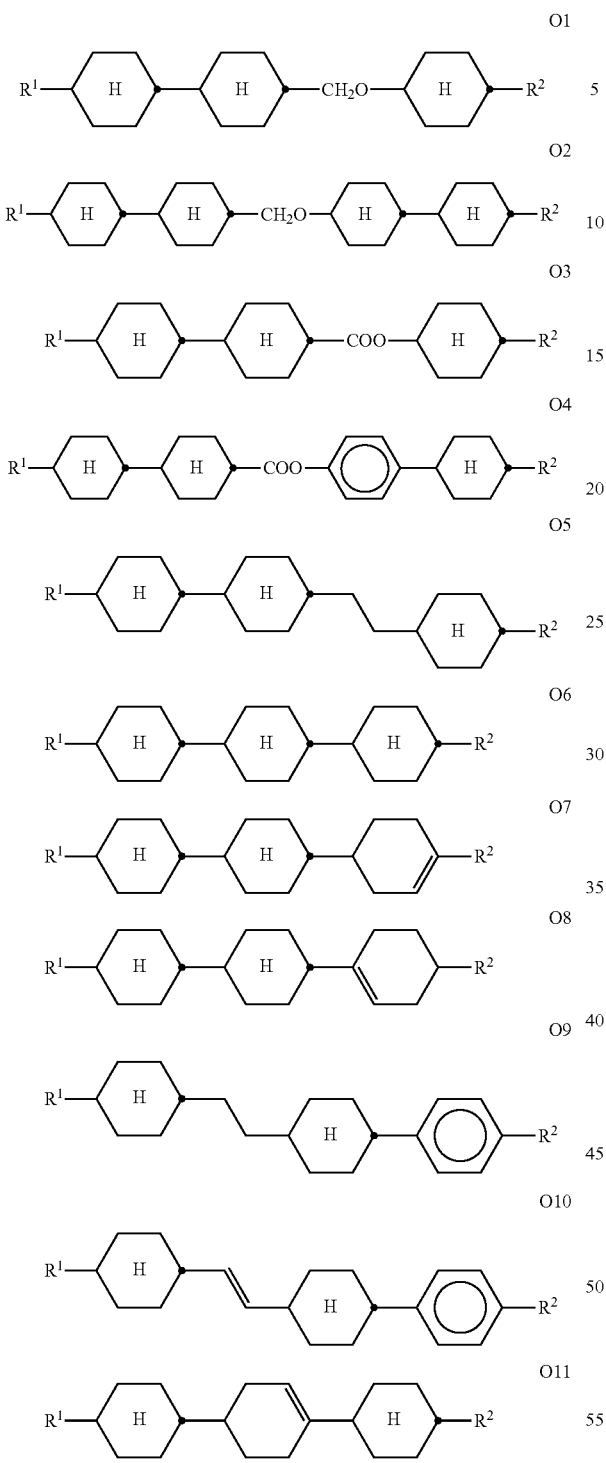

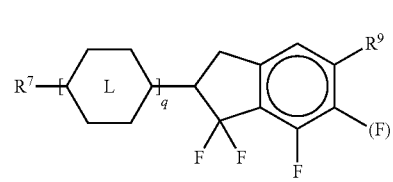

in which

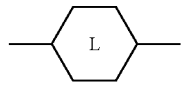

denotes

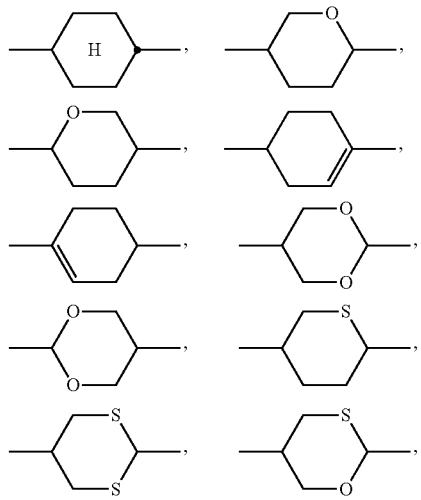

$R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

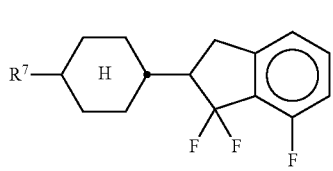

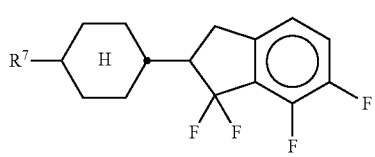

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

k) LC medium which additionally comprises one or more compounds of the following formula:

[Structures FI3, FI4, FI5, FI6, FI7, FI8 shown with R⁷, R⁹, F substituents on cyclohexane-cyclohexane-indane frameworks]

in which $R^7$ preferably denotes straight-chain alkyl, and $R^9$ denotes $CH_3$, $C_2H_5$ or $n\text{-}C_3H_7$. Particular preference is given to the compounds of the formulae FI1, FI2 and FI3.

m) LC medium which additionally comprises one or more compounds selected from the group consisting of the following formulae:

[Structures VK1, VK2, VK3, VK4 shown]

in which $R^8$ has the meaning indicated for $R^1$, and alkyl denotes a straight-chain alkyl radical having 1-6 C atoms.

n) LC medium which additionally comprises one or more compounds which contain a tetrahydronaphthyl or naphthyl unit, such as, for example, the compounds selected from the group consisting of the following formulae:

[Structures N1, N2, N3, N4, N5, N6 shown with $R^{10}$, $R^{11}$, $Z^1$, $Z^2$ substituents on cyclohexane-naphthalene/tetrahydronaphthalene frameworks]

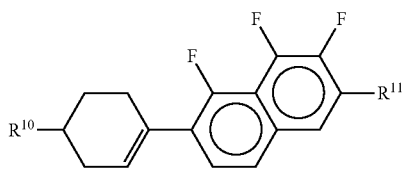
N7

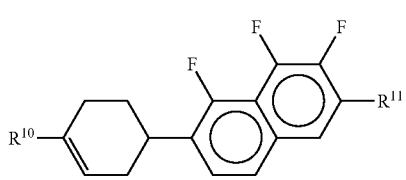
N8

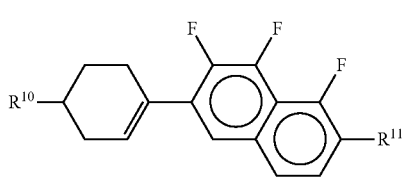
N9

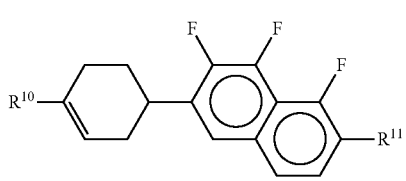
N10 in which $R^{10}$ and $R^{11}$ each, independently of one another, have one of the meanings indicated for $R^1$, preferably denote straight-chain alkyl or alkoxy having 1 to 6 C atoms or straight-chain alkenyl having 2 to 6 C atoms, and $Z^1$ and $Z^2$ each, independently of one another, denote —C₂H₄—, —CH═CH—, —(CH₂)₄—, —(CH₂)₃—, —O(CH₂)₃—, —CH═CH—CH₂CH₂—, —CH₂CH₂CH═CH—, —CH₂O—, —OCH₂—, —CO—O—, —O—CO—, —C₂F₄—, —CF═CF—, —CF═CH—, —CH═CF—, —CH₂— or a single bond.

o) LC medium which additionally comprises one or more difluoro-dibenzochromans and/or chromans of the following formulae:

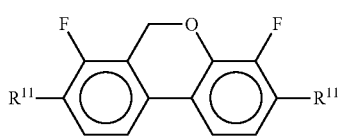
BC

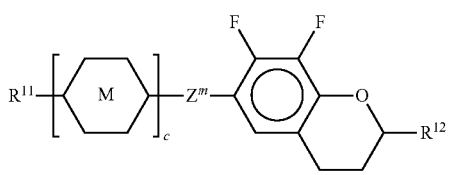
CR

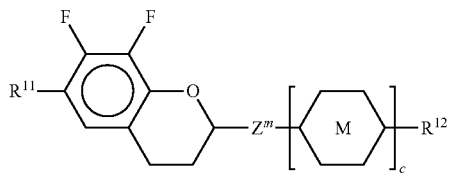
RC in which $R^{11}$ and $R^{12}$ each, independently of one another, have the meanings indicated above, ring M is trans-1,4-cyclohexylene or 1,4-phenylene, $Z^m$ —C₂H₄—, —CH₂O—, —OCH₂—, —CO—O— or —O—CO—, c is 0 or 1, preferably in amounts of 3 to 20% by weight, in particular in amounts of 3 to 15% by weight.

Particularly preferred compounds of the formulae BC, CR and RC are selected from the group consisting of the following sub-formulae:

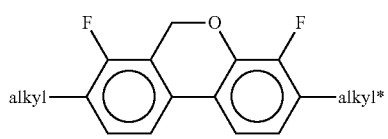
BC1

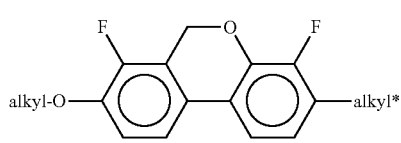
BC2

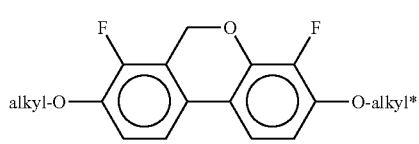
BC3

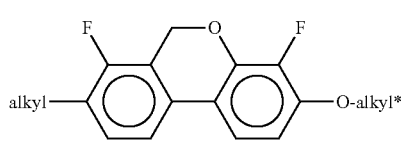
BC4

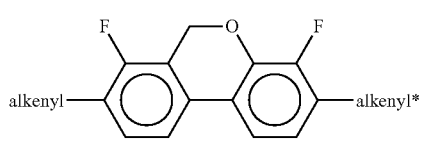
BC5

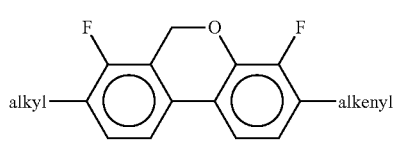
BC6

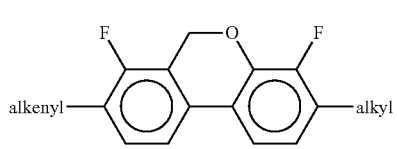
BC7

CR1 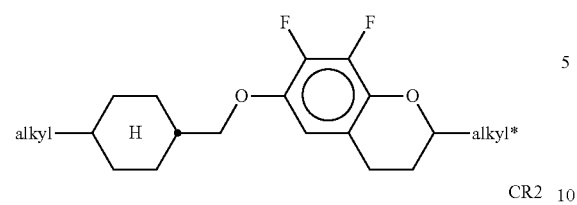
CR2 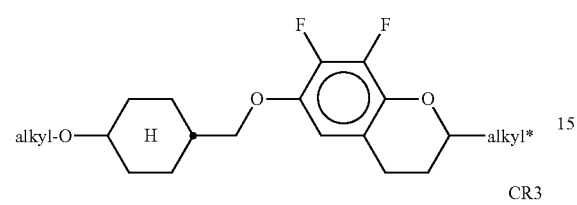
CR3 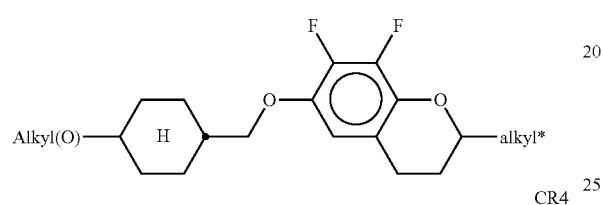
CR4 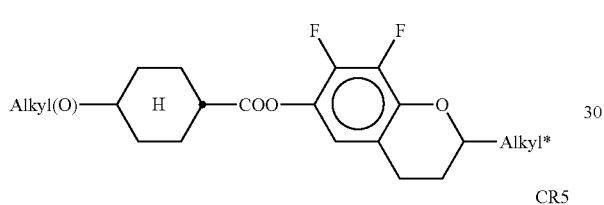
CR5 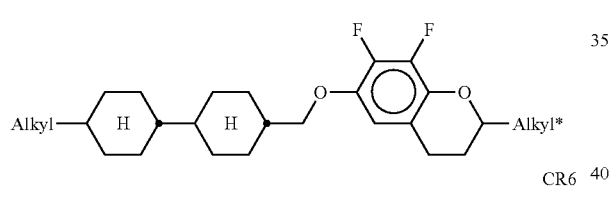
CR6 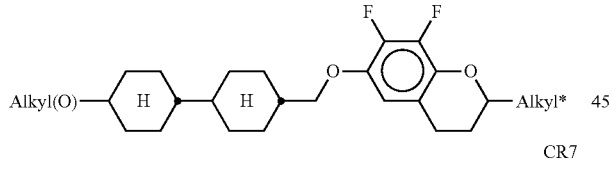
CR7 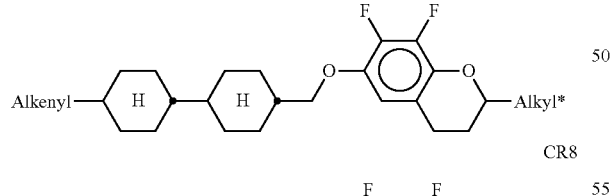
CR8 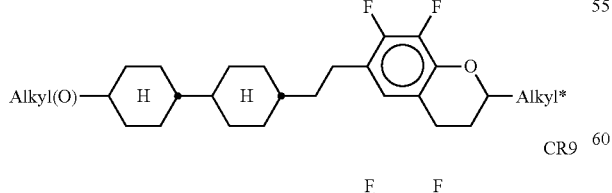
CR9 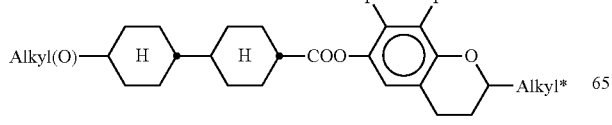

RC1 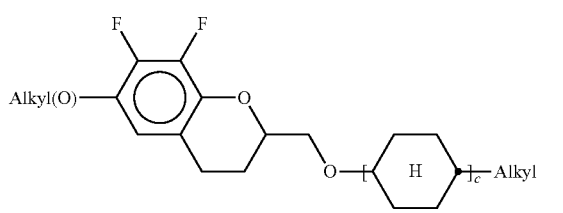
RC2 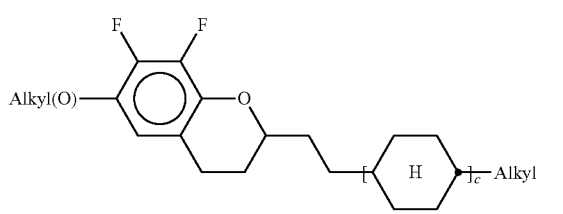
RC3 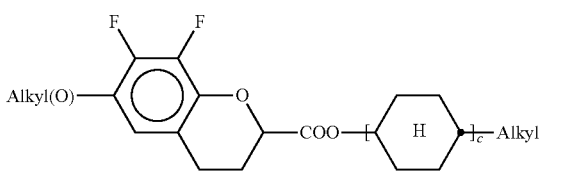

in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particular preference is given to mixtures comprising one, two or three compounds of the formula BC-2.

p) LC medium which additionally comprises one or more fluorinated phenanthrenes and/or dibenzofurans of the following formulae:

PH 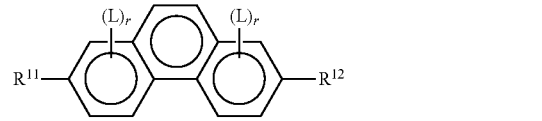

BF 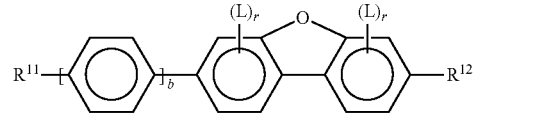

in which $R^{11}$ and $R^{12}$ each, independently of one another, have the meanings indicated above, b denotes 0 or 1, L denotes F, and r denotes 1, 2 or 3.

Particularly preferred compounds of the formulae PH and BF are selected from the group consisting of the following sub-formulae:

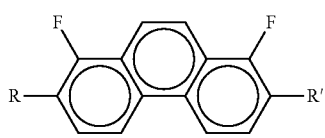 PH1

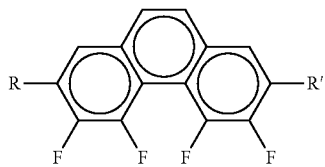 PH2

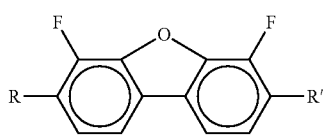 BF1

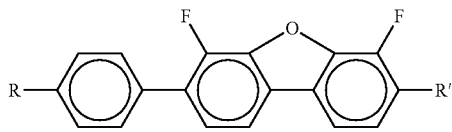 BF2 in which R and R' each, independently of one another, denote a straight-chain alkyl or alkoxy radical having 1-7 C atoms.

q) LC medium which additionally comprises one or more monocyclic compounds of the following formula

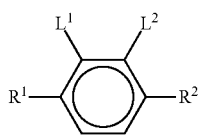 Y wherein $R^1$ and $R^2$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, The compounds of the formula Y are preferably selected from the group consisting of the following sub-formulae:

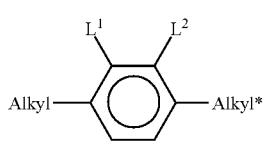 Y1

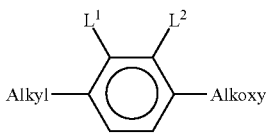 Y2

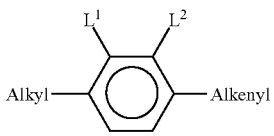 Y3

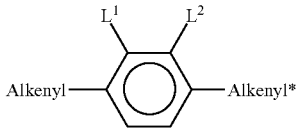 Y4

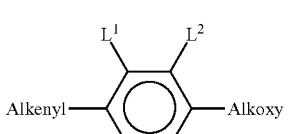 Y5

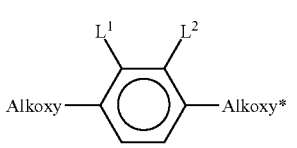 Y6

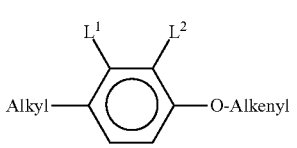 Y7

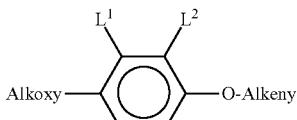 Y8

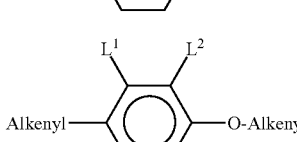 Y9

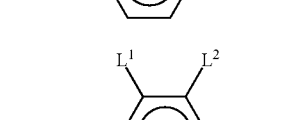 Y10 in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Particularly preferred compounds of the formula Y are selected from the group consisting of the following sub-formulae:

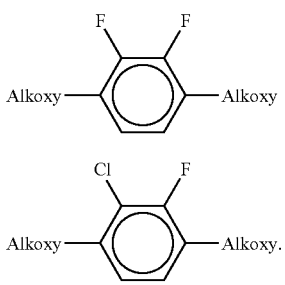

wherein Alkoxy preferably denotes straight-chain alkoxy with 3, 4, or 5 C atoms.

r) LC medium which, apart from the polymerizable compounds according to the invention, in particular of the formula I or sub-formulae thereof and the comonomers, comprises no compounds which contain a terminal vinyloxy group (—O—CH=CH$_2$).

s) LC medium which comprises 1 to 5, preferably 1, 2 or 3, polymerizable compounds, preferably selected from polymerizable compounds according to the invention, in particular of the formula I or sub-formulae thereof.

t) LC medium in which the proportion of polymerizable compounds, in particular of the formula I or sub-formulae thereof, in the mixture as a whole is 0.05 to 5%, preferably 0.1 to 1%.

u) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

v) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

w) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

x) LC medium in which the proportion of compounds of the formulae CY, PY and ZK in the mixture as a whole is greater than 70%, preferably greater than 80%.

y) LC medium in which the LC host mixture contains one or more compounds containing an alkenyl group, preferably selected from the group consisting of formula CY, PY and LY, wherein one or both of R$^1$ and R$^2$ denote straight-chain alkenyl having 2-6 C atoms, formula ZK and DK, wherein one or both of, R$^3$ and R$^4$ denote straight-chain alkenyl having 2-6 C atoms, and formula B2 and B3, very preferably selected from formulae CY15, CY16, CY34, CY32, PY15, PY16, ZK3, ZK4, DK3, DK6, B2 and B3, most preferably selected from formulae ZK3, ZK4, B2 and B3. The concentration of these compounds in the LC host mixture is preferably from 2 to 70%, very preferably from 3 to 55%.

z) PSA-VA display in which the pretilt angle is preferably ≤850, particularly preferably ≤80°.

In a second preferred embodiment the LC medium contains an LC host mixture based on compounds with positive dielectric anisotropy. Such LC media are especially suitable for use in PSA-OCB-, PSA-TN-, PSA-Posi-VA-, PSA-IPS- oder PSA-FFS-displays.

Particularly preferred is an LC medium of this second preferred embodiment, which contains one or more compounds selected from the group consisting of compounds of formula AA and BB

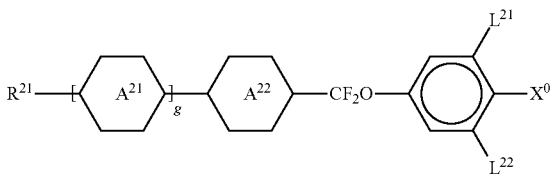

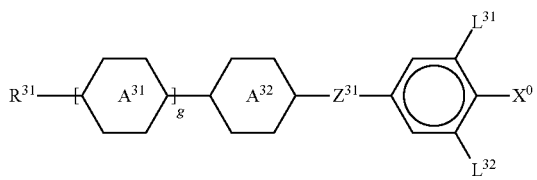

and optionally contains, in addition to the compounds of formula AA and/or BB, one or more compounds of formula CC

in which the individual radicals have the following meanings:

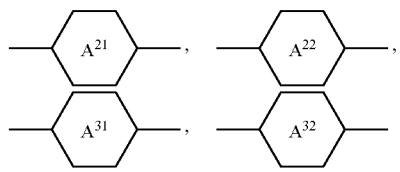

each, independently of one another, and on each occurrence, identically or differently

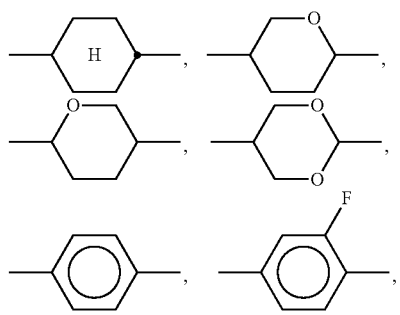

-continued

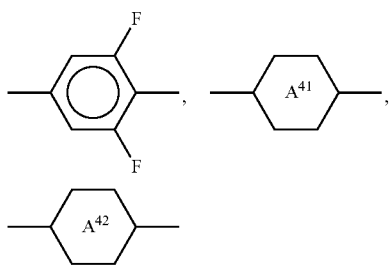

each, independently of one another, and on each occurrence, identically or differently

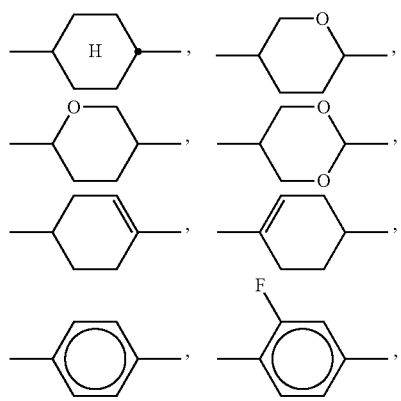

$R^{21}$, $R^{31}$, $R^{41}$, $R^{42}$ each, independently of one another, alkyl, alkoxy, oxaalkyl or fluoroalkyl having 1 to 9 C atoms or alkenyl having 2 to 9 C atoms, $X^0$ F, Cl, halogenated alkyl or alkoxy having 1 to 6 C atoms or halogenated alkenyl or alkenyloxy having 2 to 6 C atoms, $Z^{31}$ —CH$_2$CH$_2$—, —CF$_2$CF$_2$—, —COO—, trans-CH=CH—, trans-CF=CF—, —CH$_2$O— or a single bond, preferably —CH$_2$CH$_2$—, —COO—, trans-CH=CH— or a single bond, particularly preferably —COO—, trans-CH=CH— or a single bond, $Z^{41}$, $Z^{42}$ —CH$_2$CH$_2$—, —COO—, trans-CH=CH—, trans-CF=CF—, —CH$_2$O—, —CF$_2$O—, —C≡C— or a single bond, preferably a single bond, $L^{21}$, $L^{22}$, $L^{31}$, $L^{32}$ H or F, g 1, 2 or 3, h 0, 1, 2 or 3.

$X^0$ is preferably F, Cl, CF$_3$, CHF$_2$, OCF$_3$, OCHF$_2$, OCFHCF$_3$, OCFHCHF$_2$, OCFHCHF$_2$, OCF$_2$CH$_3$, OCF$_2$CHF$_2$, OCF$_2$CHF$_2$, OCF$_2$CF$_2$CHF$_2$, OCF$_2$CF$_2$CHF$_2$, OCFHCF$_2$CF$_3$, OCFHCF$_2$CHF$_2$, OCF$_2$CF$_2$CF$_3$, OCF$_2$CF$_2$CClF$_2$, OCClFCF$_2$CF$_3$ or CH=CF$_2$, very preferably F or OCF$_3$ The compounds of formula AA are preferably selected from the group consisting of the following formulae:

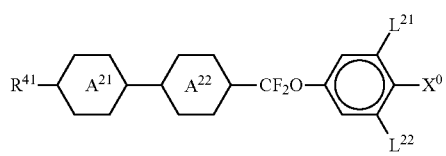 AA1

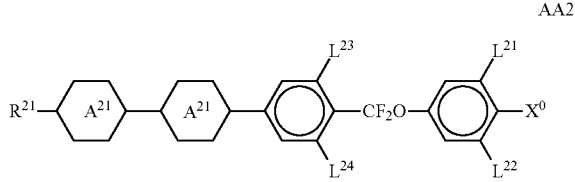 AA2

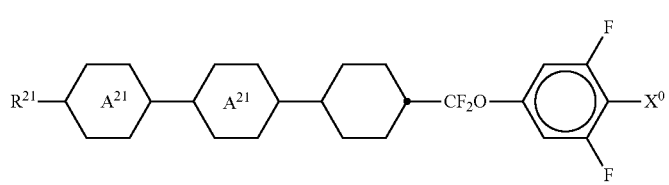 AA3

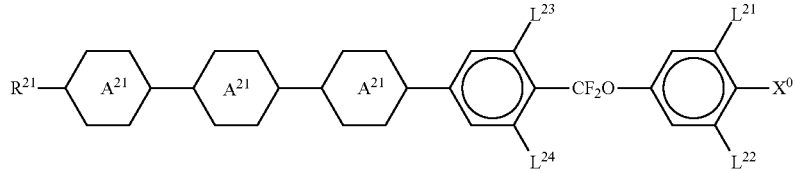 AA4 in which $A^{21}$, $R^{21}$, $X^0$, $L^{21}$ and $L^{22}$ have the meanings given in formula AA, $L^{23}$ and $L^{24}$ each, independently of one another, are H or F, and $X^0$ is preferably F. Particularly preferred are compounds of formulae AA1 and AA2.

Particularly preferred compounds of formula AA1 are selected from the group consisting of the following subformulae:

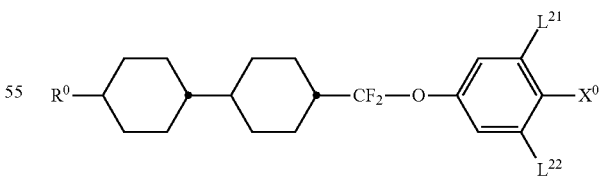 AA1a

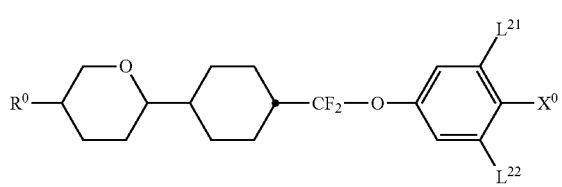 AA1b

-continued

AA1c
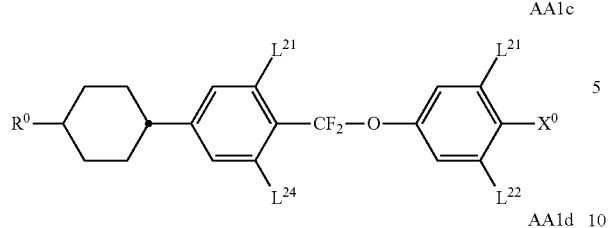

AA1d
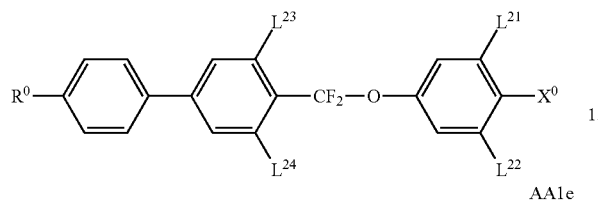

AA1e
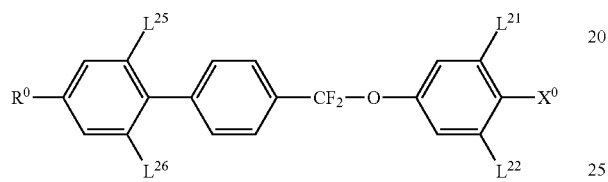

in which $R^0$ has one of the meanings given for $R^{21}$ in formula AA1, $X^0$, $L^{21}$ and $L^{22}$ have the meaning given in formula AA1, $L^{23}$, $L^{24}$, $L^{25}$ and $L^{26}$ are each, independently of one another, H or F, and $X^0$ is preferably F.

Very particularly preferred compounds of formula AA1 are selected from the group consisting of the following subformulae:

AA1a1
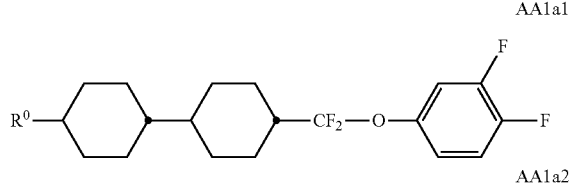

AA1a2
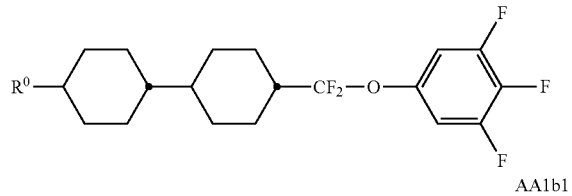

AA1b1
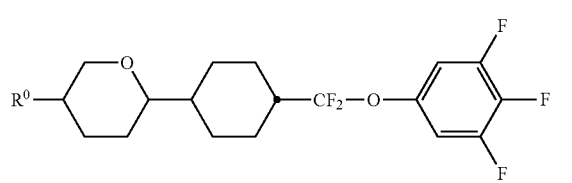

AA1c1
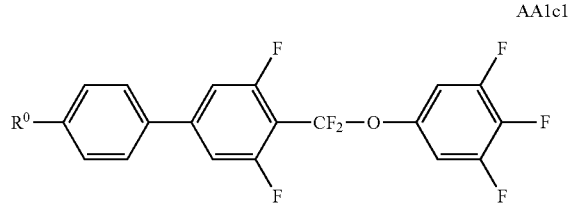

-continued

AA1e2
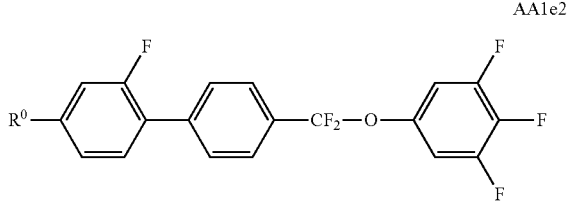

In which $R^0$ has the meaning given for $R^{21}$ in formula AA1.

Very preferred compounds of formula AA2 are selected from the group consisting of the following subformulae:

AA2a
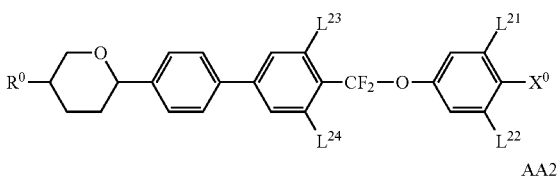

AA2b
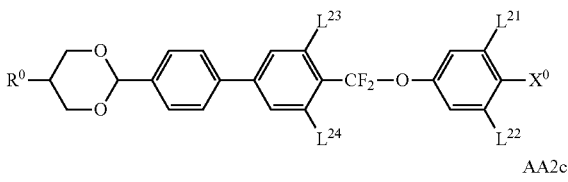

AA2c
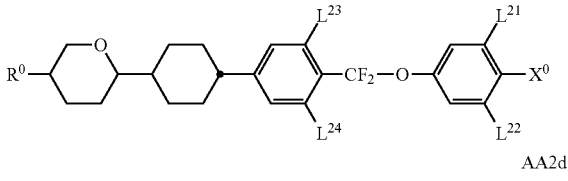

AA2d
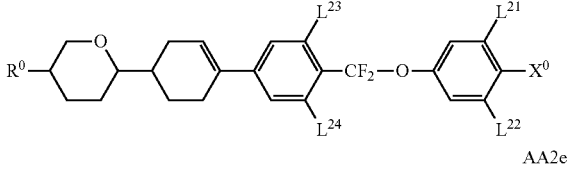

AA2e
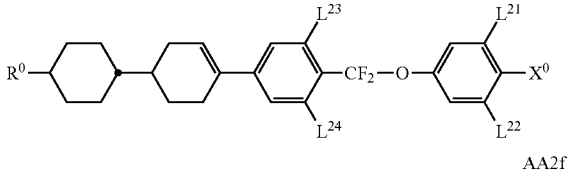

AA2f
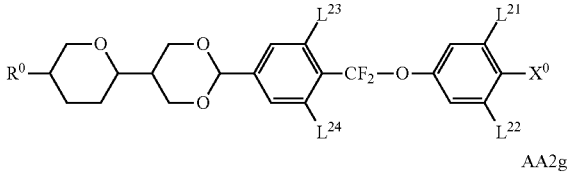

AA2g
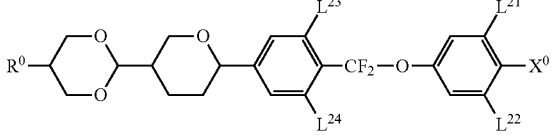

AA2h

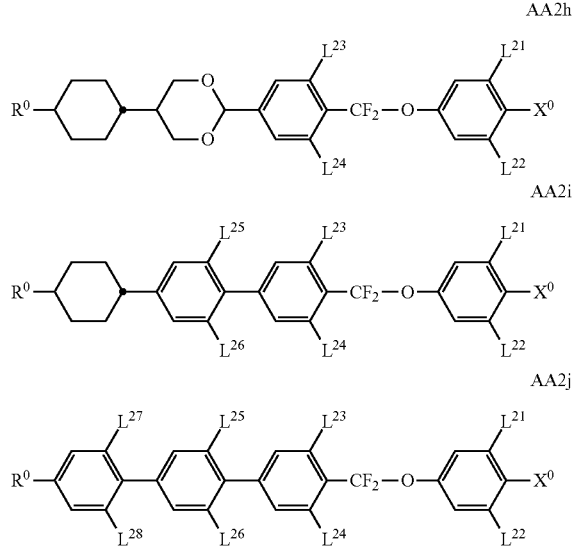

AA2i

AA2j in which R⁰ has the meaning given for $R^{21}$ in formula AA1, $X^0$, $L^{21}$ and $L^{22}$ have the meaning given in formula AA, $L^{23}$, $L^{24}$, $L^{25}$ and $L^{26}$ each, independently of one another, are H or F, and $X^0$ is preferably F.

Very particularly preferred compounds of formula AA2 are selected from the group consisting of the following subformulae:

AA2a1

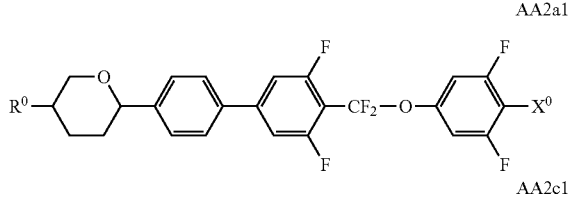

AA2c1

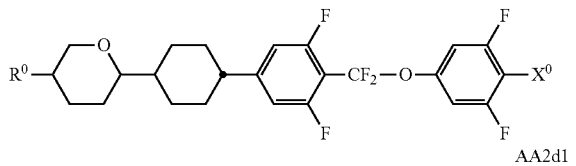

AA2d1

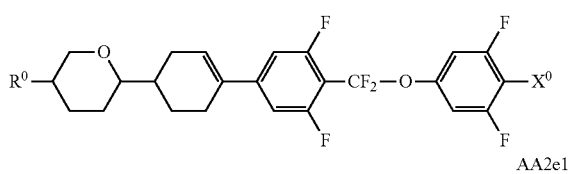

AA2e1

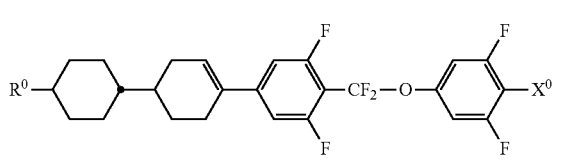

AA2f1

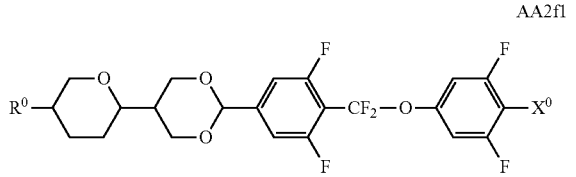

AA2h1

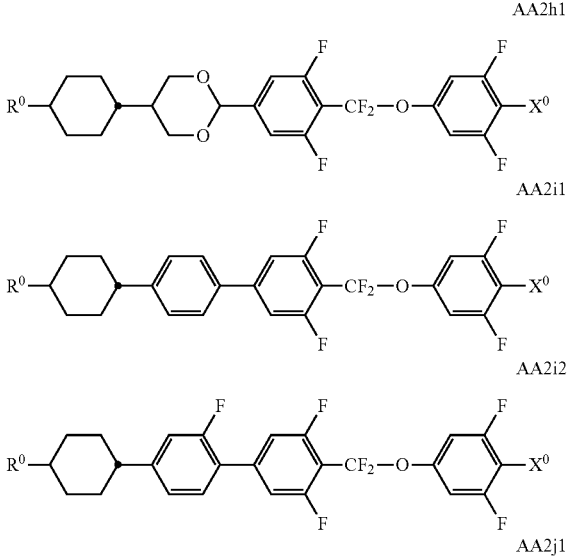

AA2i1

AA2i2

AA2j1

AA2j2 in which R⁰ has the meaning given for $R^{21}$ in formula AA1.

Particularly preferred compounds of formula AA3 are selected from the group consisting of the following subformulae:

AA3a

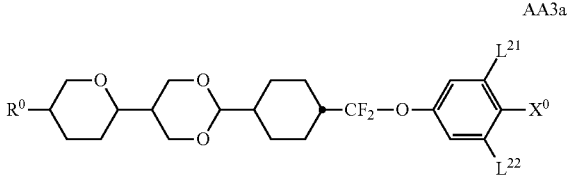

AA3b

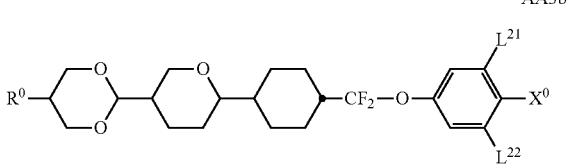

AA3c

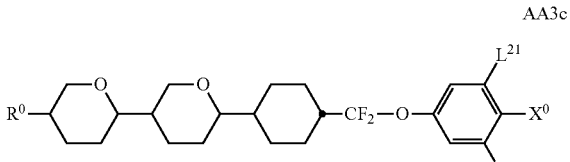

in which R⁰ has the meaning given for $R^{21}$ in formula AA1, $X^0$, $L^{21}$ and $L^{22}$ have the meaning given in formula AA3, and $X^0$ is preferably F.

Particularly preferred compounds of formula AA4 are selected from the group consisting of the following subformulae:

AA4a

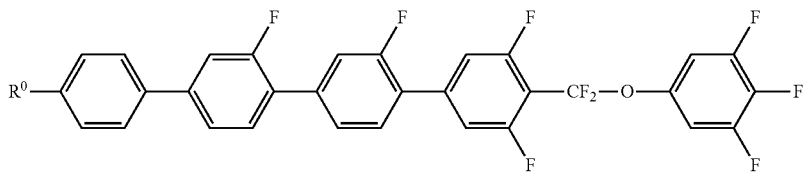

in which R⁰ has the meaning given for $R^{21}$ in formula AA1.

The compounds of formula BB are preferably selected from the group consisting of the following formulae:

BB1

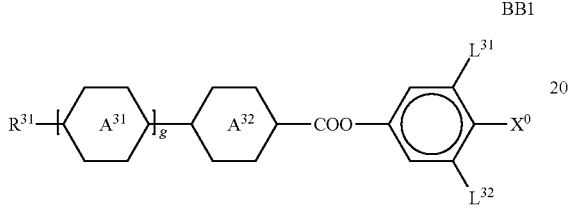

BB2

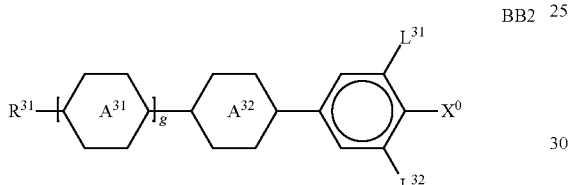

BB3

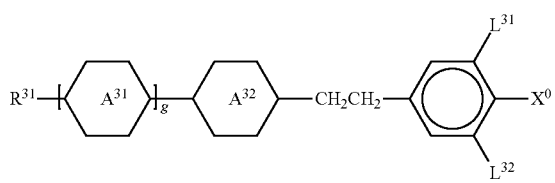

in which $A^{31}$, $A^{32}$, $R^{31}$, $X^0$, $L^{31}$ and $L^{32}$ have the meanings given in formula BB, and $X^0$ is preferably F. Particularly preferred are compounds of formulae BB1 and BB2.

Particularly preferred compounds of formula BB1 are selected from the group consisting of the following subformulae:

BB1a

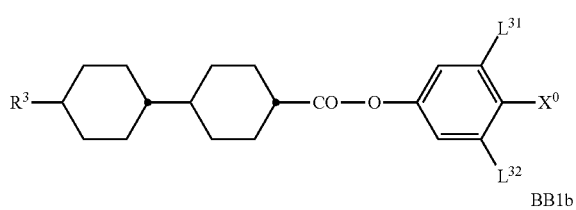

BB1b

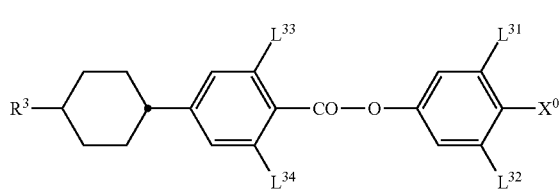

in which $R^3$ has the meaning given for $R^{31}$ in formula BB1, $X^0$, $L^{31}$ and $L^{32}$ have the meaning given in formula BB1, and $X^0$ is preferably F.

Very particularly preferred compounds of formula BB1a are selected from the group consisting of the following subformulae:

BB1a1

BB1a2

BB1a3

BB1a4

BB1a5

BB1a6 in which $R^3$ has the meaning given for $R^{31}$ in formula BB1.

Very particularly preferred compounds of formula BB1b are selected from the group consisting of the following subformulae:

BB1b1

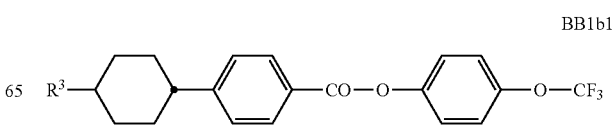

-continued

BB1b2
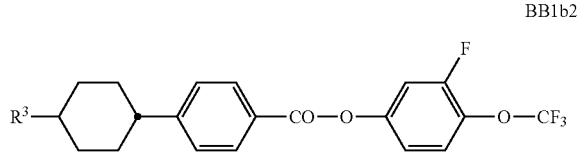

BB1b3
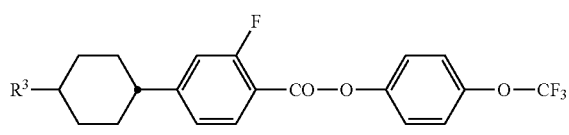

BB1b4
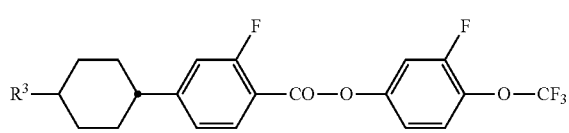

in which R³ has the meaning given for R³¹ in formula BB1.

Particularly preferred compounds of formula BB2 are selected from the group consisting of the following subformulae:

BB2a
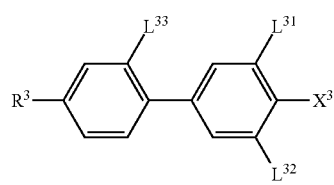

BB2b

BB2c

BB2d
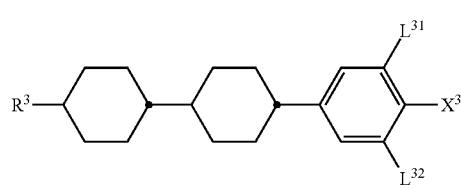

BB2e
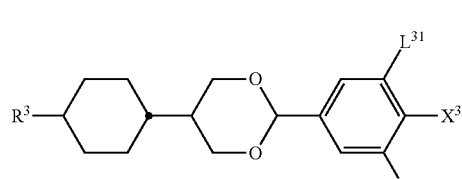

-continued

BB2f
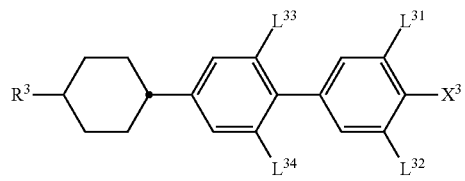

BB2g
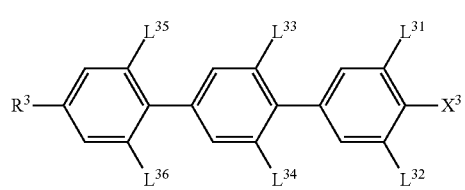

BB2h
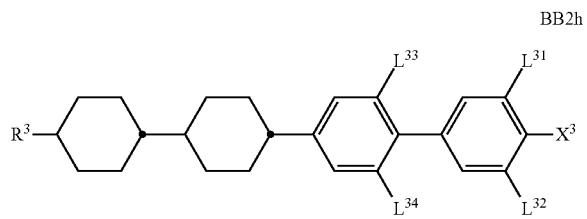

BB2i
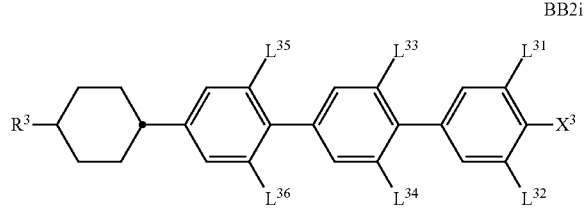

BB2k in which R⁰ has one of the meanings given for R²¹ in formula BB2, X⁰, L³¹ and L³² have the meaning given in formula BB2, L³³, L³⁴, L³⁵ and L³⁶ are each, independently of one another, H or F, and X⁰ is preferably F.

Very particularly preferred compounds of formula BB2 are selected from the group consisting of the following subformulae:

BB2a1

BB2a2

BB2a3
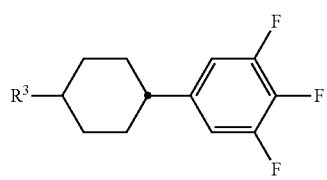

BB2a4
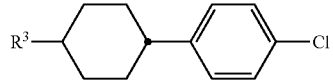

BB2a5
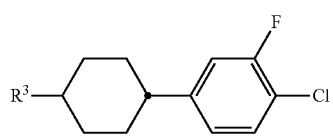

in which R³ has the meaning given for R³¹ in formula BB2.

Very particularly preferred compounds of formula BB2b are selected from the group consisting of the following subformulae BB2b1
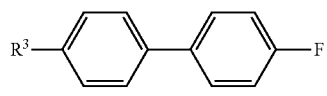

BB2b2

BB2b3
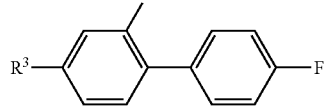

BB2b4
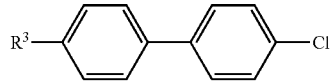

in which R³ has the meaning given for R³¹ in formula BB2.

Very particularly preferred compounds of formula BB2c are selected from the group consisting of the following subformulae:

BB2c1
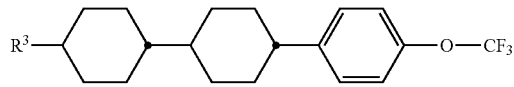

BB2c1

BB2c3
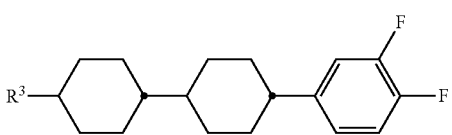

BB2c4
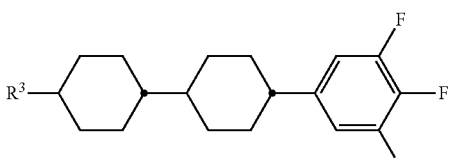

BB2c4
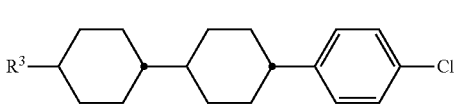

in which R³ has the meaning given for R³¹ in formula BB2.

Very particularly preferred compounds of formula BB2d and BB2e are selected from the group consisting of the following subformulae:

BB2d1
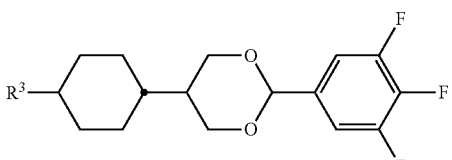

BB2e1
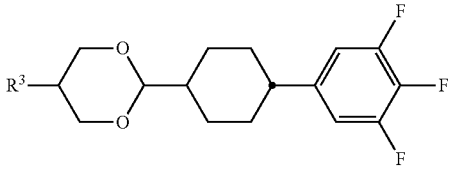

in which R³ has the meaning given for R³¹ in formula BB2.

Very particularly preferred compounds of formula BB2f are selected from the group consisting of the following subformulae:

BB2f1
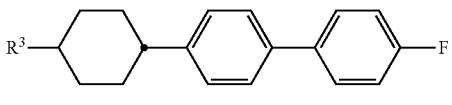

BB2f2
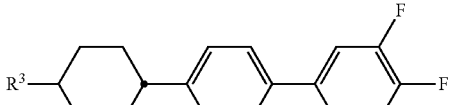

BB2f3
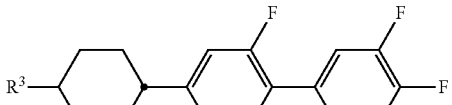

-continued

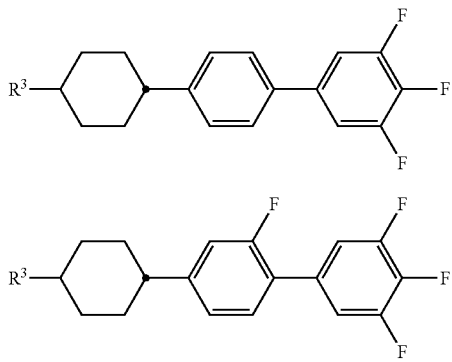

in which R³ has the meaning given for R³¹ in formula BB2.

Very particularly preferred compounds of formula BB2g are selected from the group consisting of the following sub-formulae:

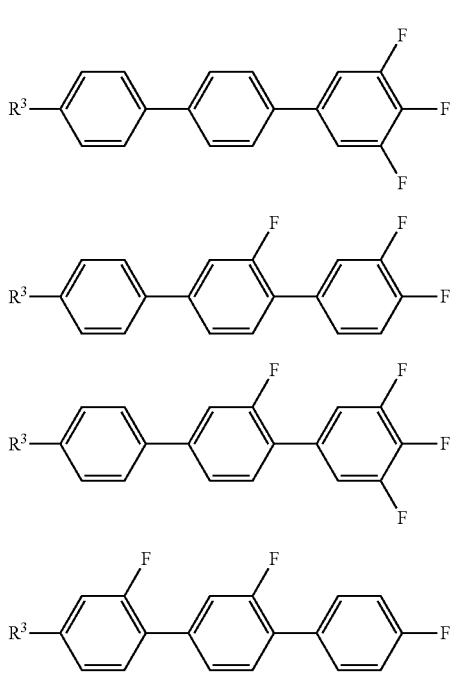

in which R³ has the meaning given for R³¹ in formula BB2.

Very particularly preferred compounds of formula BB2h are selected from the group consisting of the following sub-formulae:

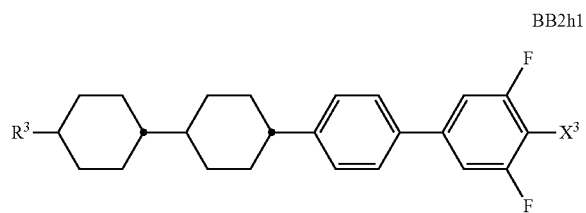

-continued

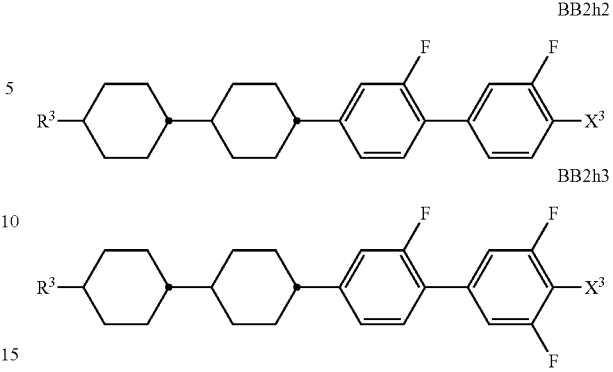

in which R³ has the meaning given for R³¹ in formula BB2.

Very particularly preferred compounds of formula BB2l are selected from the group consisting of the following sub-formulae:

in which R³ has the meaning given for R³¹ in formula BB2.

Very particularly preferred compounds of formula BB2k are selected from the group consisting of the following sub-formulae:

in which R³ has the meaning given for R³¹ in formula BB2.

Alternatively to, or in addition to, the compounds of formula BB1 and/or BB2 the LC media may also comprise one or more compounds of formula BB3 as defined above.

Particularly preferred compounds of formula BB3 are selected from the group consisting of the following subformulae:

BB3a

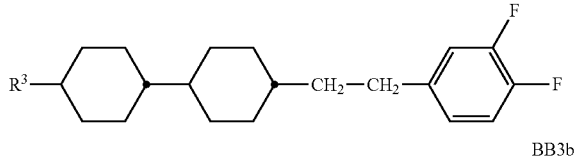

BB3b

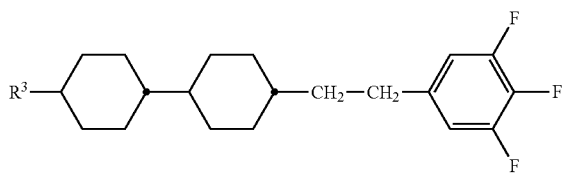

in which R³ has the meaning given for R³¹ in formula BB3.

Preferably the LC media according to this second preferred embodiment comprise, in addition to the compounds of formula AA and/or BB, one or more dielectrically neutral compounds having a dielectric anisotropy in the range from −1.5 to +3, preferably selected from the group of compounds of formula CC as defined above.

Particularly preferred compounds of formula CC are selected from the group consisting of the following subformulae:

CC1

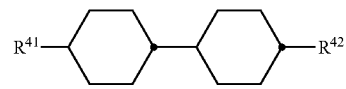

CC2

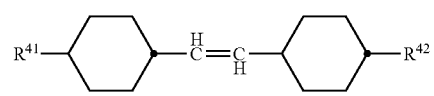

CC3

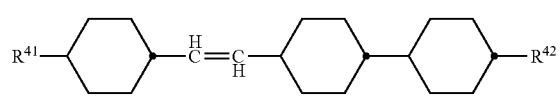

CC4

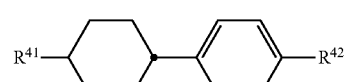

CC5

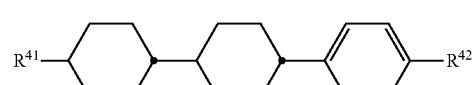

CC6

CC7

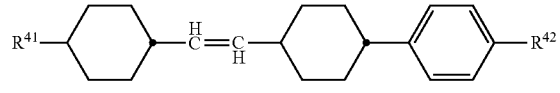

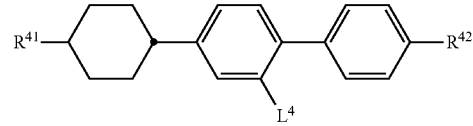

CC8

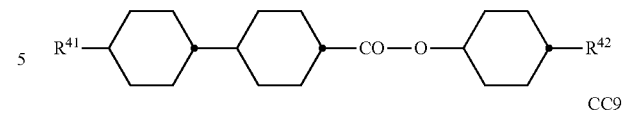

CC9

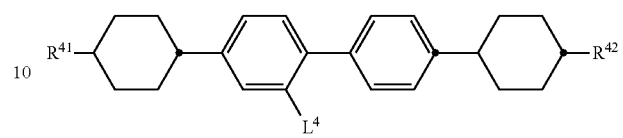

CC10

CC11

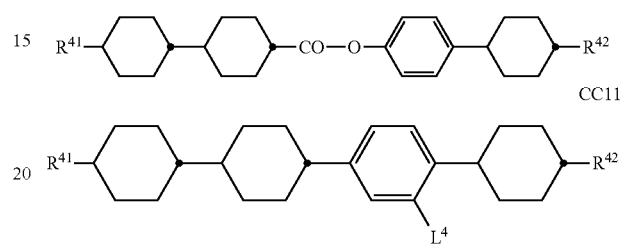

CC12

CC13

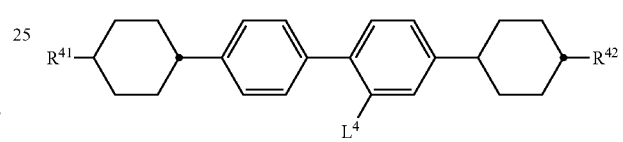

CC14

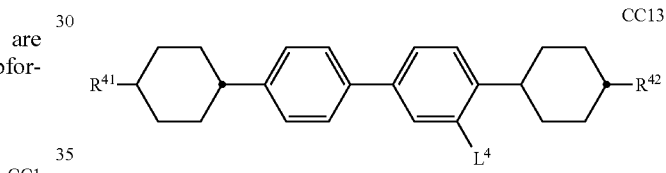

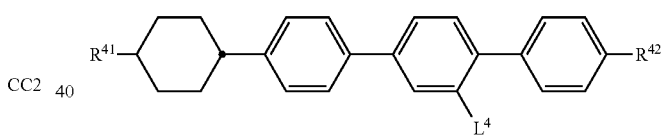

In which $R^{41}$ and $R^{42}$ have the meanings given in formula CC, and preferably denote each, independently of one another, alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms, and $L^4$ is H or F.

Preferably the LC media according to this second preferred embodiment comprise, in addition or alternatively to the dielectrically neutral compounds of formula CC, one or more dielectrically neutral compounds having a dielectric anisotropy in the range from −1.5 to +3, selected from the group of compounds of formula DD.

DD

In which $A^{41}$, $A^{42}$, $Z^{41}$, $Z^{42}$, $R^{41}$, $R^{42}$ and h have the meanings given in formula CC.

Particularly preferred compounds of formula DD are selected from the group consisting of the following subformulae:

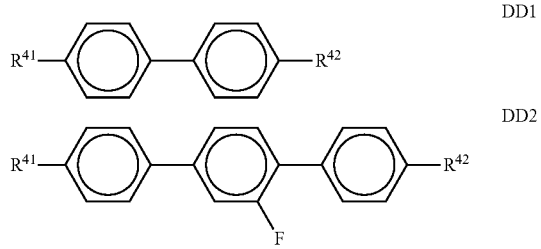

in which $R^{41}$ and $R^{42}$ have the meanings given in formula DD and $R^{41}$ preferably denotes alkyl bedeutet, and in formula DD1 $R^{42}$ preferably denotes alkenyl, particularly preferably vorzugsweise —$(CH_2)_2$—CH=CH—$CH_3$, and in formula DD2 $R^{42}$ preferably denotes alkyl, —$(CH_2)_2$—CH=$CH_2$ or —$(CH_2)_2$—CH=CH—$CH_3$.

The compounds of formula AA and BB are preferably used in the LC medium according to the invention in a concentration from 2% to 60%, more preferably from 3% to 35%, and very particularly preferably from 4% to 30% in the mixture as a whole.

The compounds of formula CC and DD are preferably used in the LC medium according to the invention in a concentration from 2% to 70%, more preferably from 5% to 65%, even more preferably from 10% to 60%, and very particularly preferably from 10%, preferably 15%, to 55% in the mixture as a whole.

The combination of compounds of the preferred embodiments mentioned above with the polymerized compounds described above causes low threshold voltages, low rotational viscosities and very good low-temperature stabilities in the LC media according to the invention at the same time as constantly high clearing points and high HR values, and allows the rapid establishment of a particularly low pretilt angle in PSA displays. In particular, the LC media exhibit significantly shortened response times, in particular also the grey-shade response times, in PSA displays compared with the media from the prior art.

The liquid-crystal mixture preferably has a nematic phase range of at least 80 K, particularly preferably at least 100 K, and a rotational viscosity of not greater than 250 mPa·s, preferably not greater than 200 mPas, at 20° C.

In the VA-type displays according to the invention, the molecules in the layer of the LC medium in the switched-off state are aligned perpendicular to the electrode surfaces (homeotropically) or have a a tilted homeotropic alignment. On application of an electrical voltage to the electrodes, a realignment of the LC molecules takes place with the longitudinal molecular axes parallel to the electrode surfaces.

LC media according to the invention based on compounds with negative dielectric anisotropy according to the first preferred embodiment, in particular for use in displays of the PSA-VA type, have a negative dielectric anisotropy $\Delta\varepsilon$, preferably from −0.5 to −10, in particular from −2.5 to −7.5, at 20° C. and 1 kHz.

The birefringence $\Delta n$ in LC media according to the invention for use in displays of the PSA-VA type is preferably below 0.16, particularly preferably from 0.06 to 0.14, very particularly preferably from 0.07 to 0.12.

In the OCB-type displays according to the invention, the molecules in the layer of the LC medium have a "bend" alignment. On application of an electrical voltage, a realignment of the LC molecules takes place with the longitudinal molecular axes perpendicular to the electrode surfaces.

LC media according to the invention for use in displays of the PSA-OCB type are preferably those based on compounds with positive dielectric anisotropy according to the second preferred embodiment, and preferably have a positive dielectric anisotropy $\Delta\varepsilon$ from +4 to +17 at 20° C. and 1 kHz.

The birefringence $\Delta n$ in LC media according to the invention for use in displays of the PSA-OCB type is preferably from 0.14 to 0.22, particularly preferably from 0.16 to 0.22.

LC media according to the invention, based on compounds with positive dielectric anisotropy according to the second preferred embodiment, for use in displays of the PSA-TN-, PSA-posi-VA-, PSA-IPS-oder PSA-FFS-type, preferably have a positive dielectric anisotropy $\Delta\varepsilon$ from +2 to +30, particularly preferably from +3 to +20, at 20° C. and 1 kHz.

The birefringence $\Delta n$ in LC media according to the invention for use in displays of the PSA-TN-, PSA-posi-VA-, PSA-IPS-oder PSA-FFS-type is preferably from 0.07 to 0.15, particularly preferably from 0.08 to 0.13.

The LC media according to the invention may also comprise further additives which are known to the person skilled in the art and are described in the literature, such as, for example, polymerization initiators, inhibitors, stabilisers, surface-active substances or chiral dopants. These may be polymerizable or non-polymerizable. Polymerizable additives are accordingly ascribed to the polymerizable component or component A). Non-polymerizable additives are accordingly ascribed to the non-polymerizable component or component B).

In a preferred embodiment the LC media contain one or more chiral dopants, preferably in a concentration from 0.01 to 1%, very preferably from 0.05 to 0.5%. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-z) of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerizable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes.

The structure of the LC displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PSA-VA displays are described, for example, in US 2006/0066793 A1.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

The following abbreviations are used:

(n, m, z: in each case, independently of one another, 1, 2, 3, 4, 5 or 6)

TABLE A

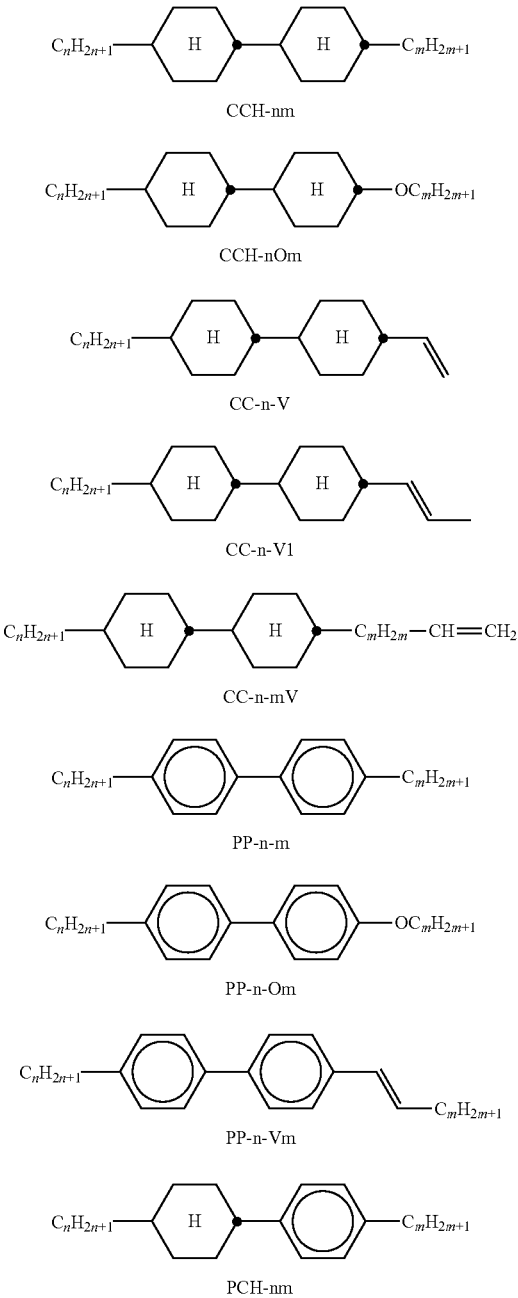

TABLE A-continued
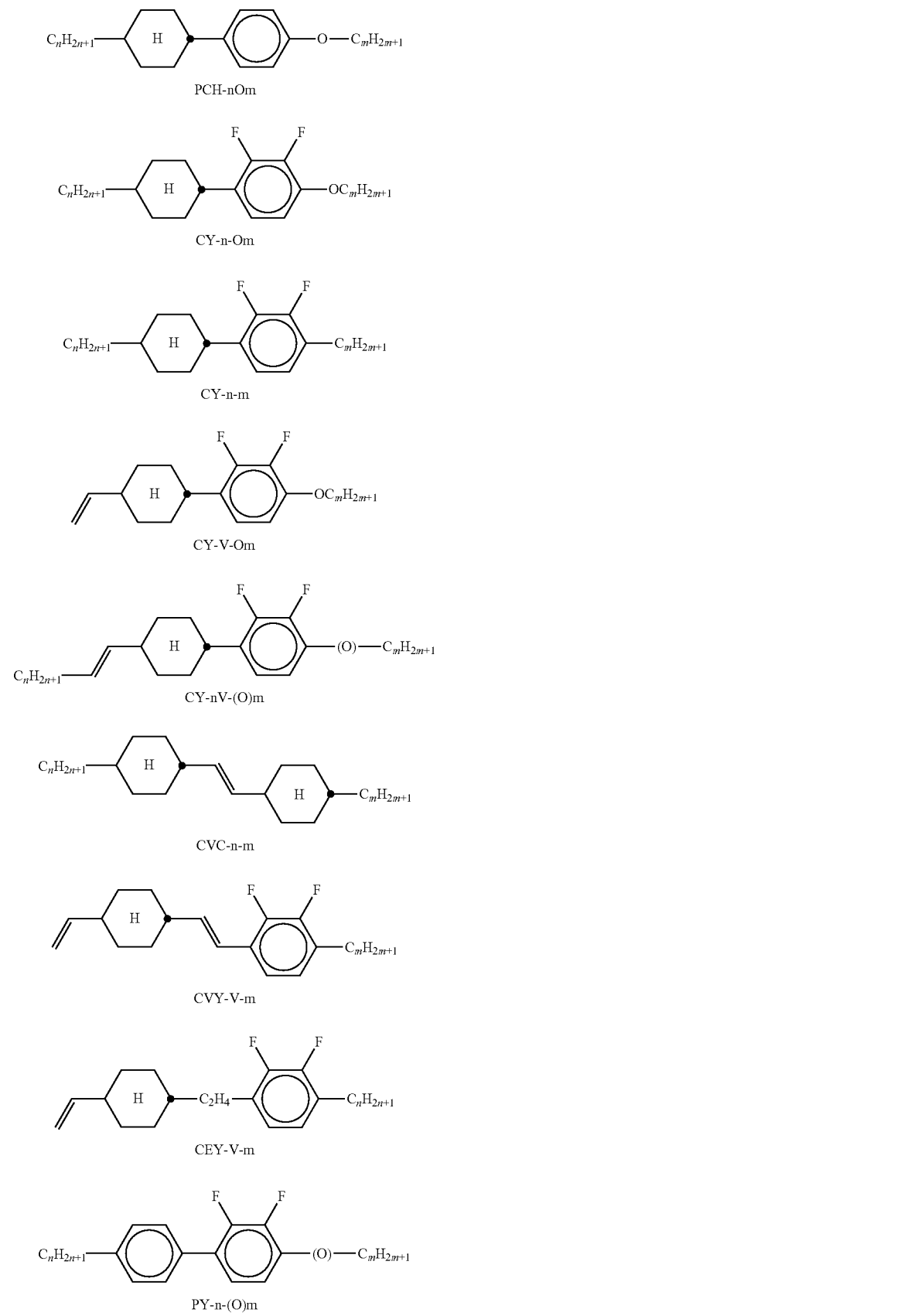

TABLE A-continued
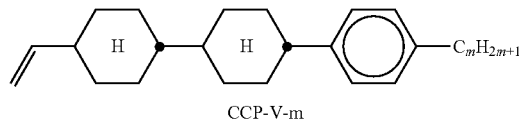
CCP-V-m
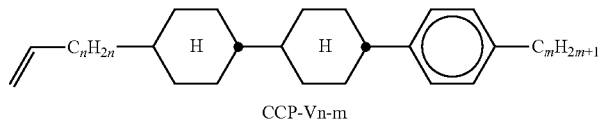
CCP-Vn-m
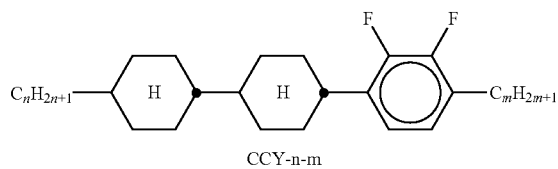
CCY-n-m
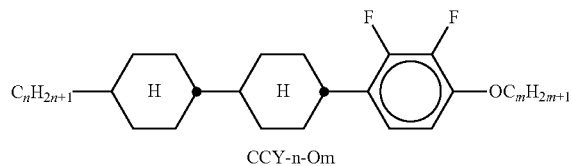
CCY-n-Om
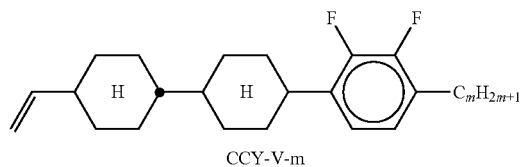
CCY-V-m
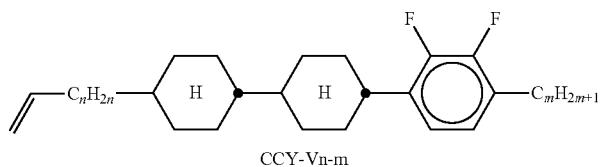
CCY-Vn-m
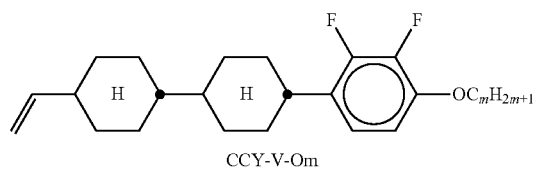
CCY-V-Om
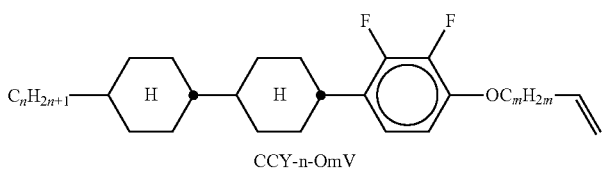
CCY-n-OmV
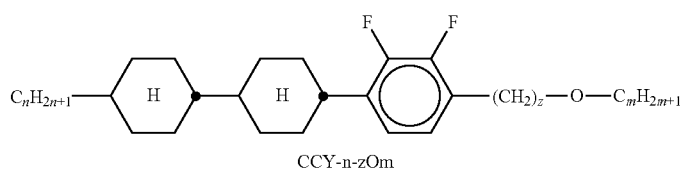
CCY-n-zOm TABLE A-continued
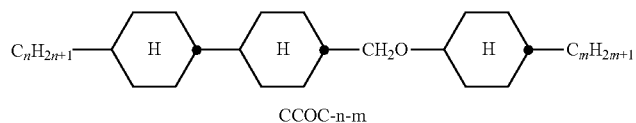
CCOC-n-m
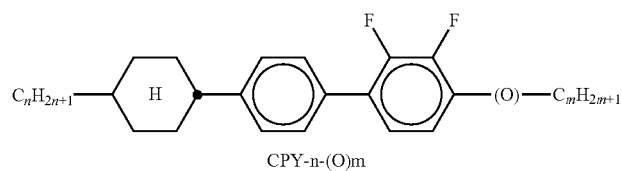
CPY-n-(O)m
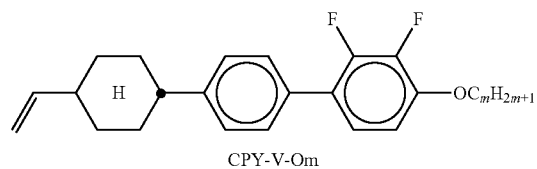
CPY-V-Om
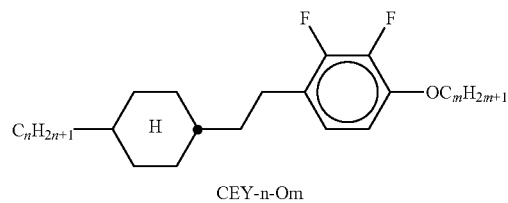
CEY-n-Om
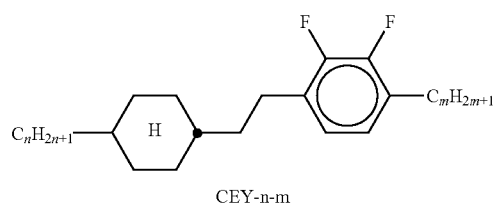
CEY-n-m
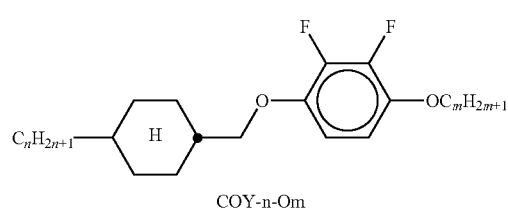
COY-n-Om
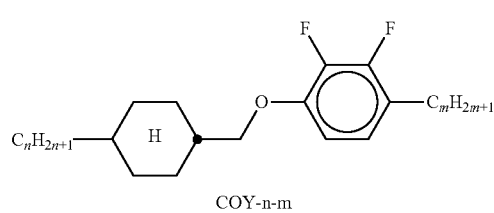
COY-n-m
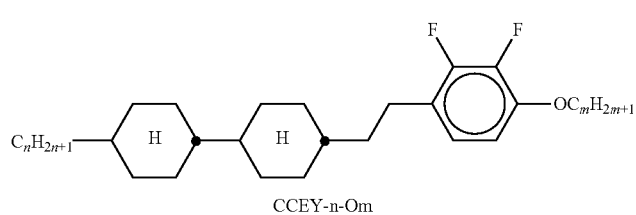
CCEY-n-Om TABLE A-continued
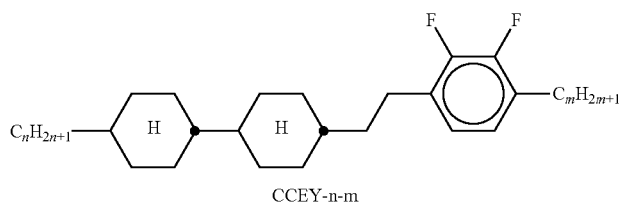
CCEY-n-m
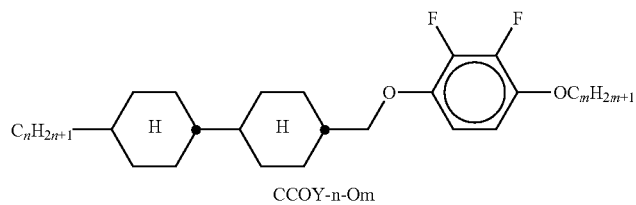
CCOY-n-Om
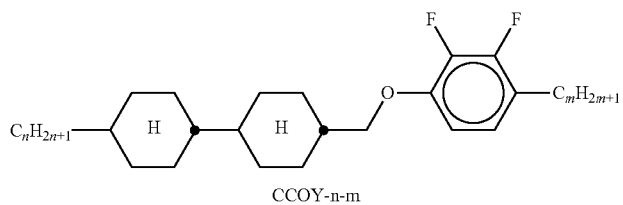
CCOY-n-m
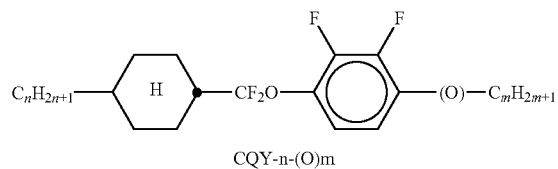
CQY-n-(O)m
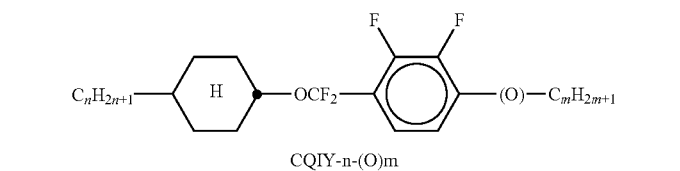
CQIY-n-(O)m
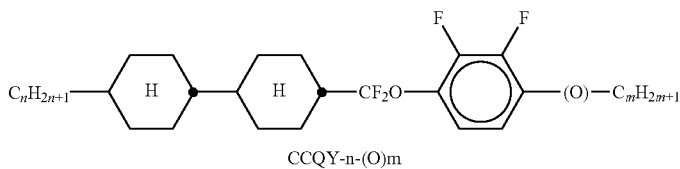
CCQY-n-(O)m
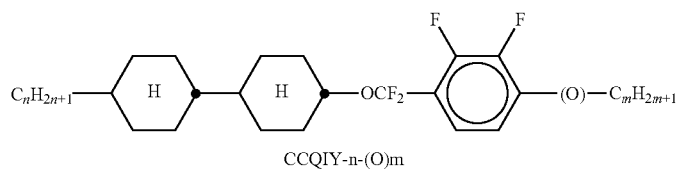
CCQIY-n-(O)m
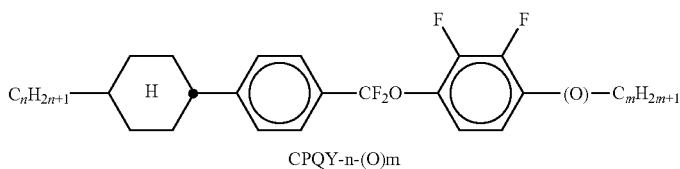
CPQY-n-(O)m TABLE A-continued
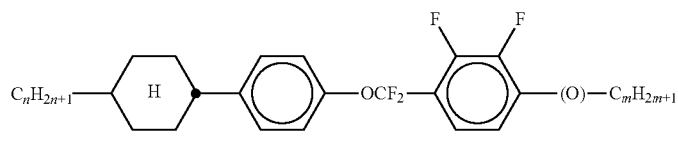
CPQIY-n-(O)m
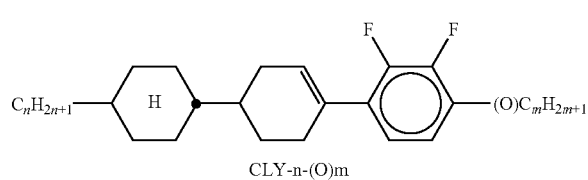
CLY-n-(O)m
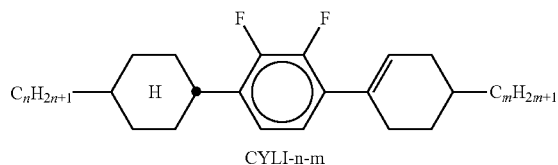
CYLI-n-m
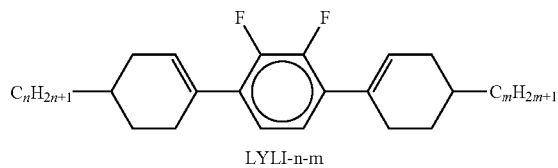
LYLI-n-m
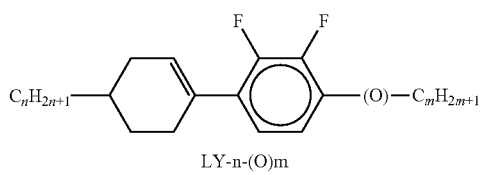
LY-n-(O)m
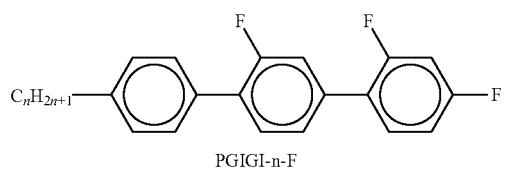
PGIGI-n-F
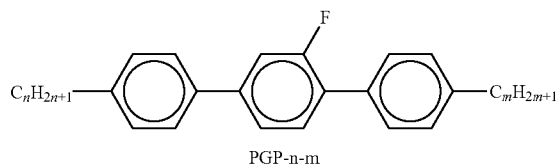
PGP-n-m
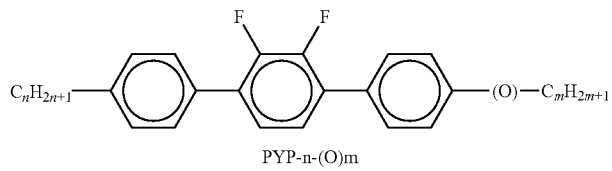
PYP-n-(O)m
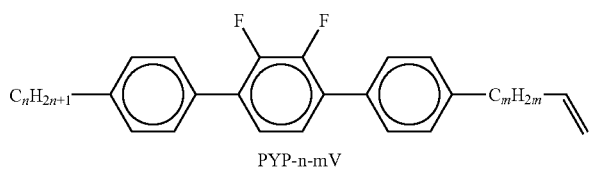
PYP-n-mV TABLE A-continued
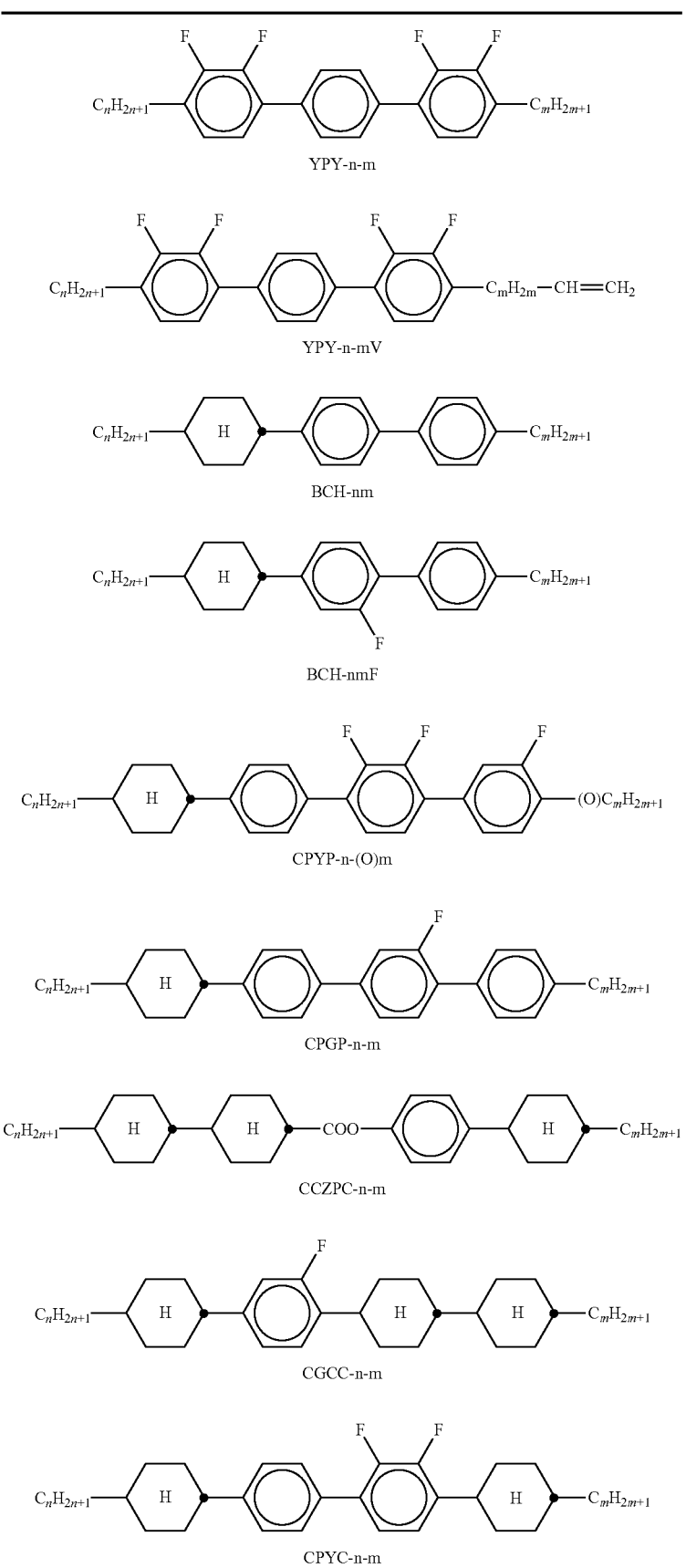

TABLE A-continued
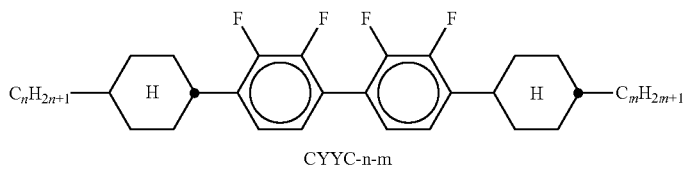
CYYC-n-m
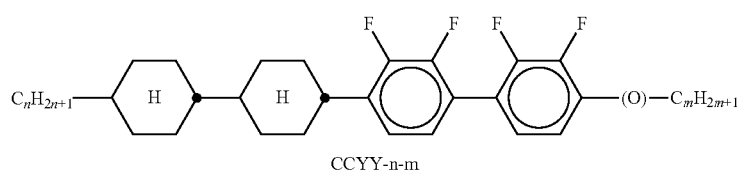
CCYY-n-m
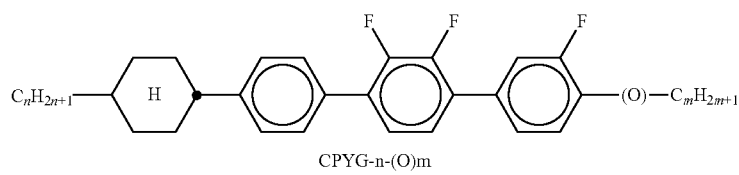
CPYG-n-(O)m
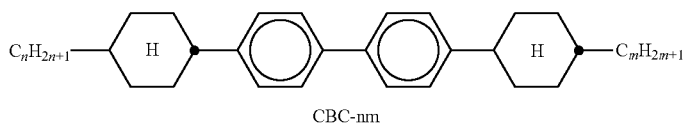
CBC-nm
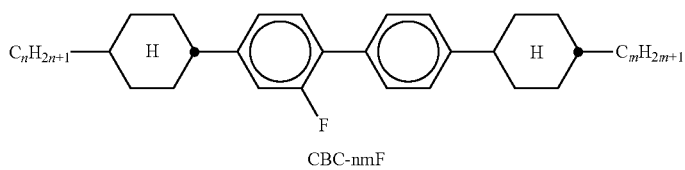
CBC-nmF
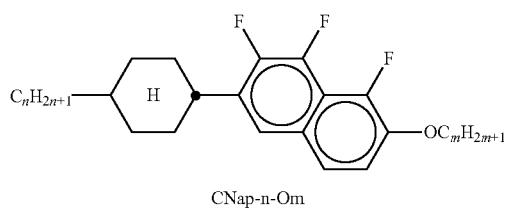
CNap-n-Om
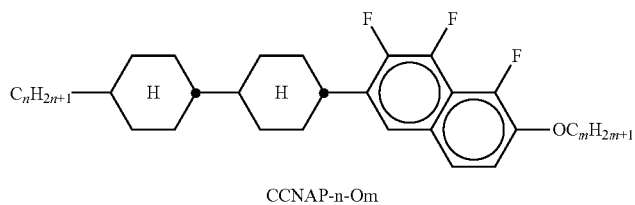
CCNAP-n-Om
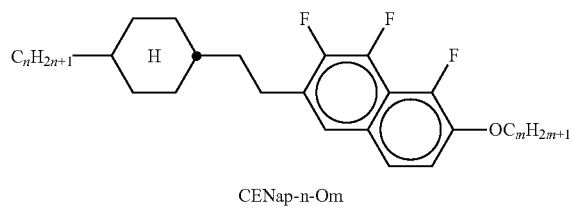
CENap-n-Om TABLE A-continued

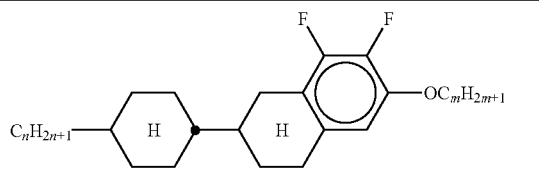
CTNap-n-Om

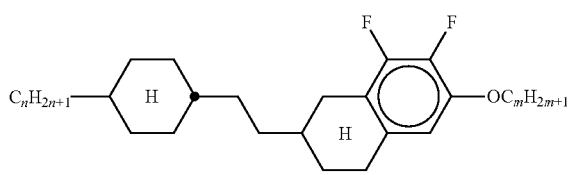
CETNap-n-Om

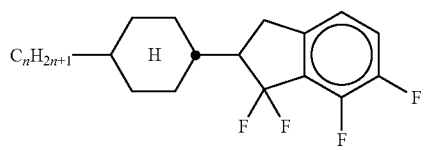
CK-n-F

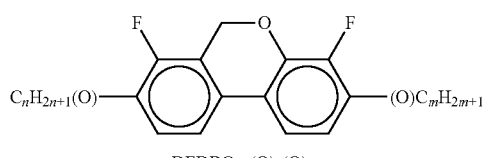
DFDBC-n(O)-(O)m

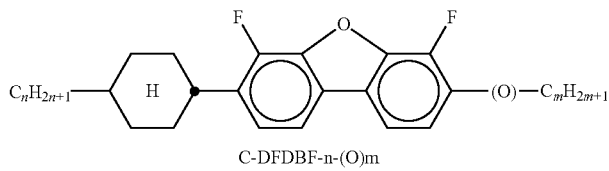
C-DFDBF-n-(O)m

In a preferred embodiment of the present invention, the LC media according to the invention comprise one or more compounds selected from the group consisting of compounds from Table A.

TABLE B

Table B shows possible chiral dopants which can be added to the LC media according to the invention.

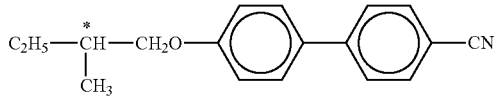
C 15

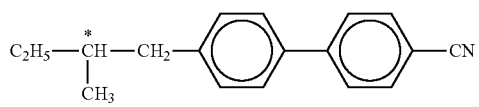
CB 15

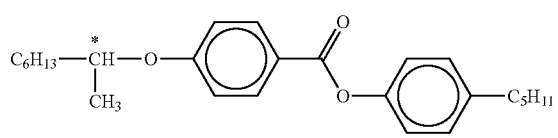
CM 21

TABLE B-continued
Table B shows possible chiral dopants which can be added to the LC media according to the invention.
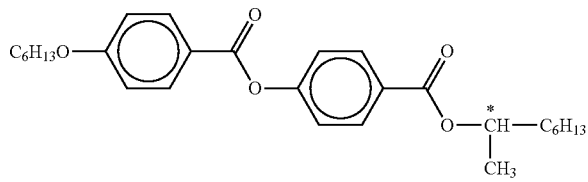
R/S-811
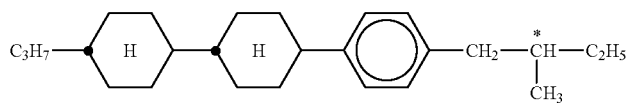
CM 44
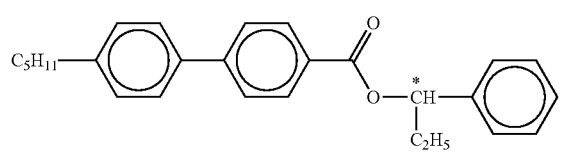
CM 45
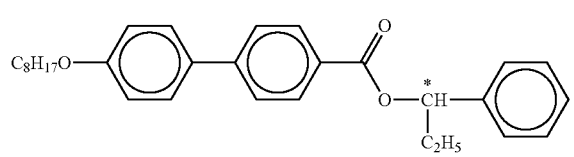
CM 47
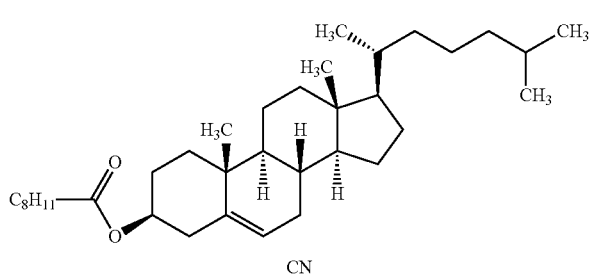
CN
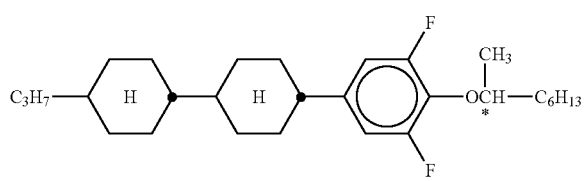
R/S-2011
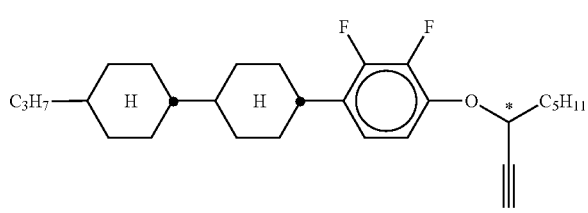
R/S-3011

TABLE B-continued

Table B shows possible chiral dopants which can be added to the LC media according to the invention.

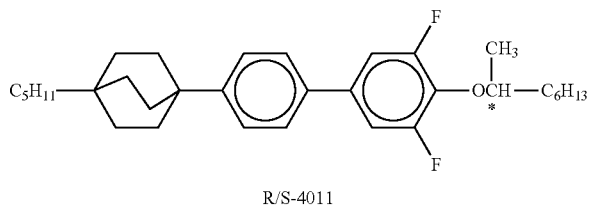

R/S-4011

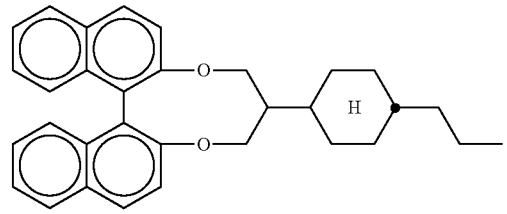

R/S-5011

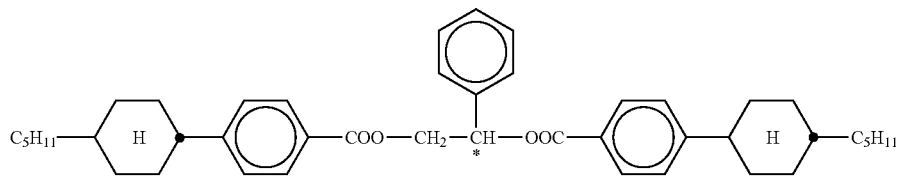

R/S-1011

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C

Table C shows possible stabilisers which can be added to the LC media according to the invention.
(n here denotes an integer from 1 to 12, preferably 1, 2, 3, 4, 5, 6, 7 or 8, terminal methyl groups are not shown).

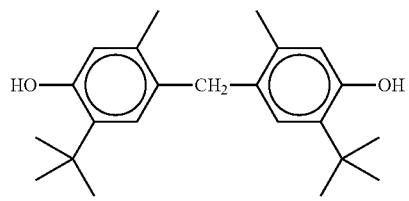

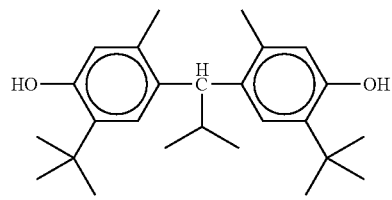

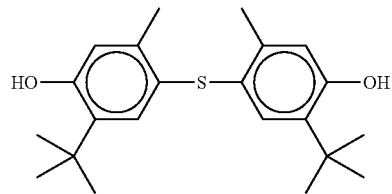

TABLE C-continued
Table C shows possible stabilisers which can be added to the LC media according to the invention.
(n here denotes an integer from 1 to 12, preferably 1, 2, 3, 4, 5, 6, 7 or 8, terminal methyl groups are not shown).
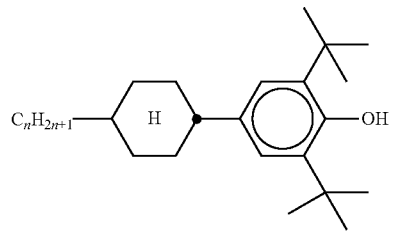
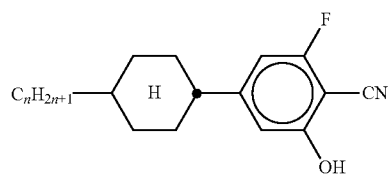
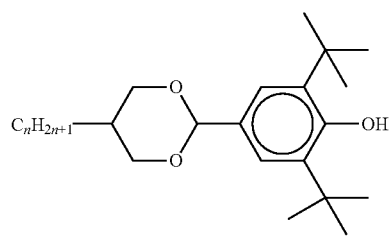
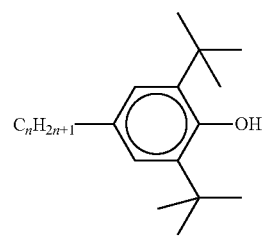
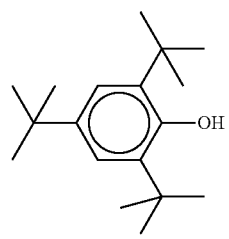
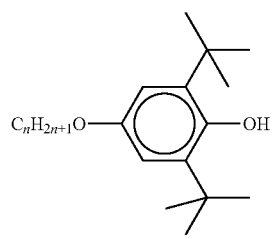

TABLE C-continued
Table C shows possible stabilisers which can be added to the LC media according to the invention.
(n here denotes an integer from 1 to 12, preferably 1, 2, 3, 4, 5, 6, 7 or 8, terminal methyl groups are not shown).
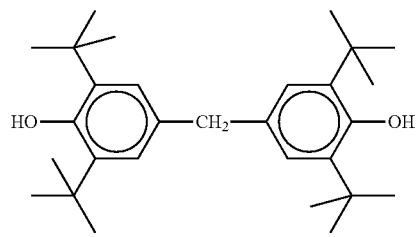
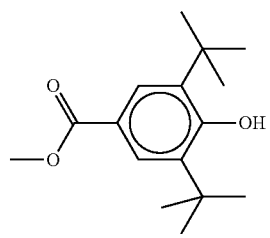
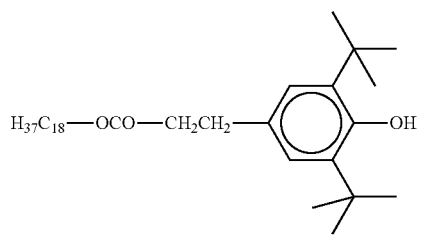
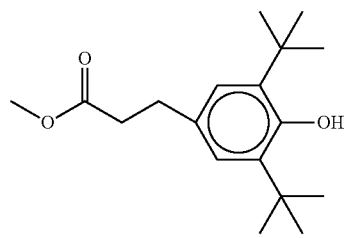
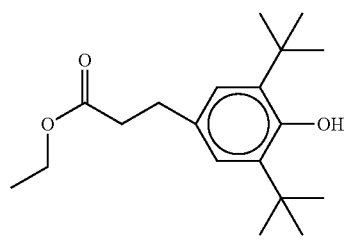
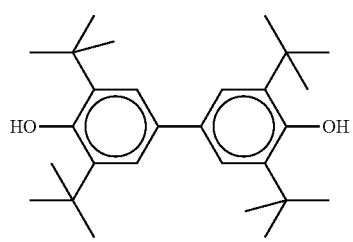

TABLE C-continued
Table C shows possible stabilisers which can be added to the LC media according to the invention.
(n here denotes an integer from 1 to 12, preferably 1, 2, 3, 4, 5, 6, 7 or 8, terminal methyl groups are not shown).
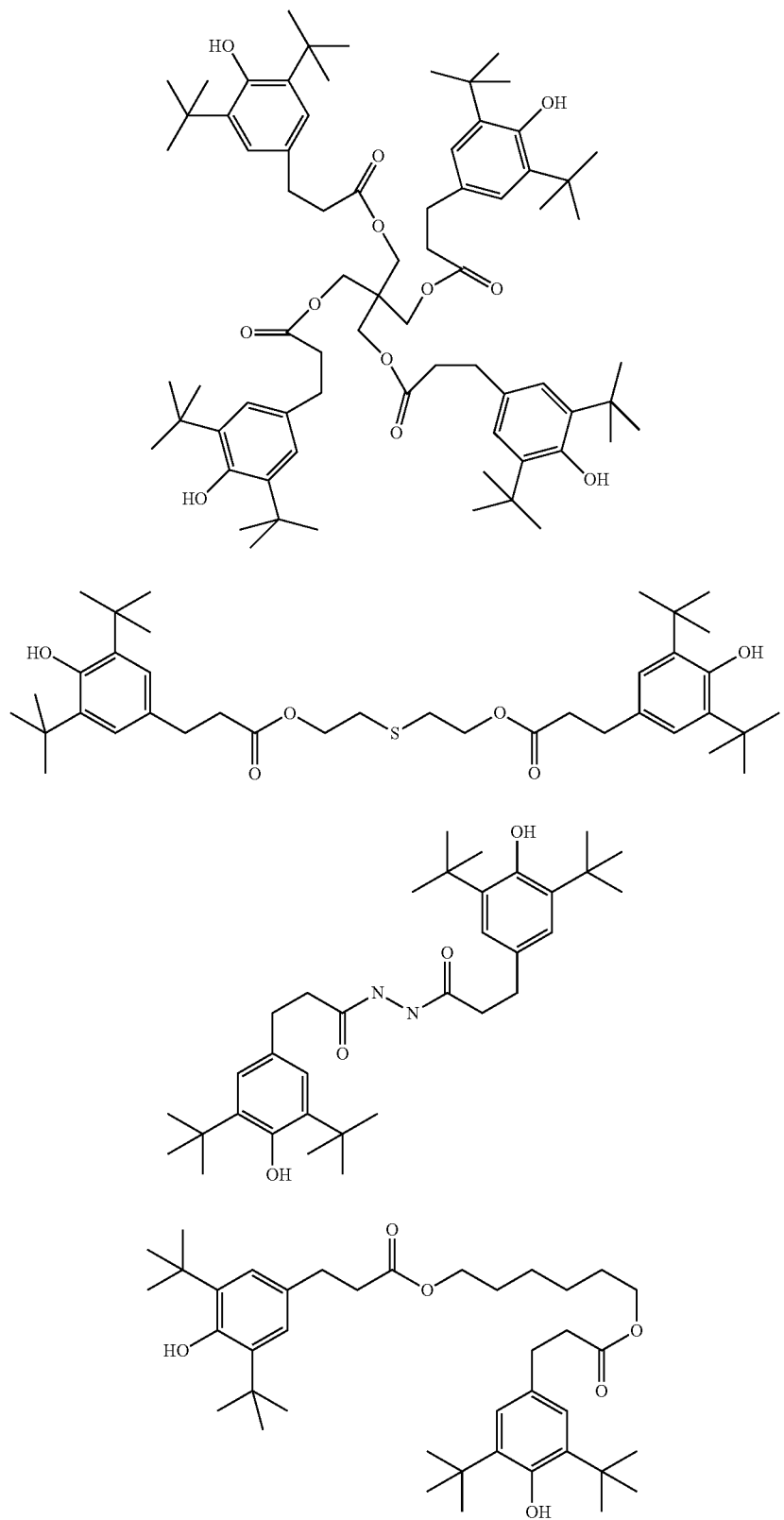

TABLE C-continued
Table C shows possible stabilisers which can be added to the LC media according to the invention.
(n here denotes an integer from 1 to 12, preferably 1, 2, 3, 4, 5, 6, 7 or 8, terminal methyl groups are not shown).
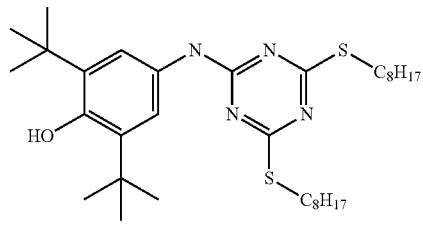
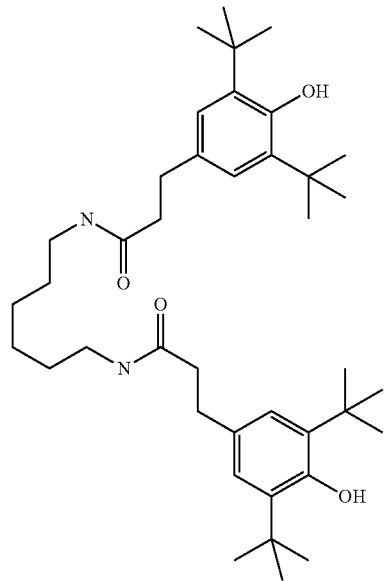 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
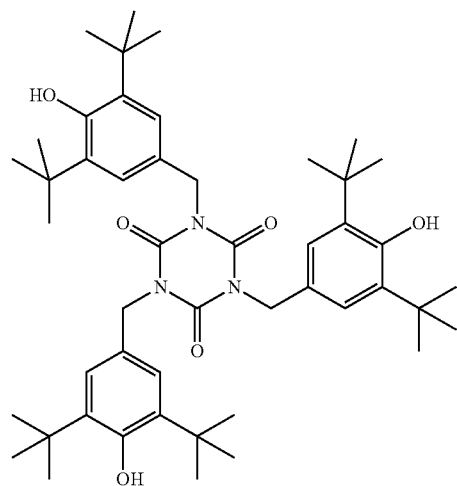 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE C-continued
Table C shows possible stabilisers which can be added to the LC media according to the invention.
(n here denotes an integer from 1 to 12, preferably 1, 2, 3, 4, 5, 6, 7 or 8, terminal methyl groups are not shown).
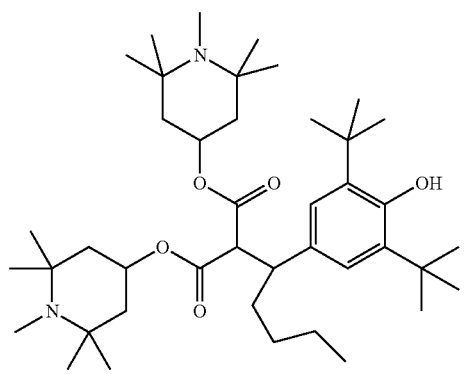 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
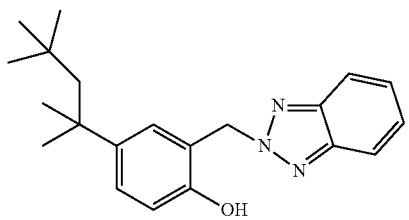 [SMILES: CC(C)(C)CC(C)(C)c1ccc(O)c(Cn2nc3ccccc3n2)c1]
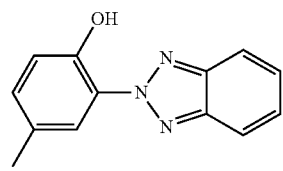 [SMILES: Cc1ccc(O)c(-n2nc3ccccc3n2)c1]
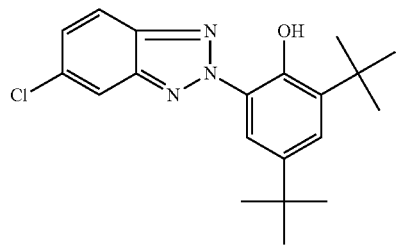 [SMILES: CC(C)(C)c1cc(-n2nc3ccc(Cl)cc3n2)c(O)c(C(C)(C)C)c1]
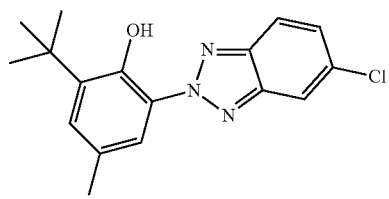 [SMILES: Cc1cc(-n2nc3ccc(Cl)cc3n2)c(O)c(C(C)(C)C)c1]

TABLE C-continued
Table C shows possible stabilisers which can be added to the LC media according to the invention.
(n here denotes an integer from 1 to 12, preferably 1, 2, 3, 4, 5, 6, 7 or 8, terminal methyl groups are not shown).
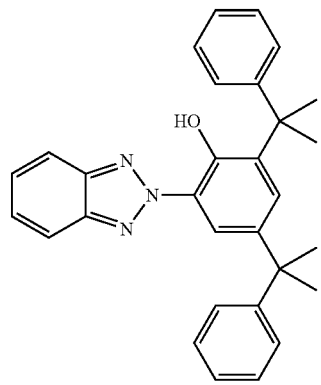 [SMILES: CC(C)(c1ccccc1)c1cc(-n2nc3ccccc3n2)c(O)c(C(C)(C)c2ccccc2)c1]
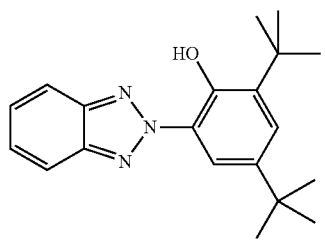 [SMILES: CC(C)(C)c1cc(-n2nc3ccccc3n2)c(O)c(C(C)(C)C)c1]
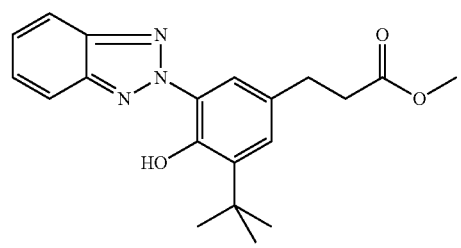 [SMILES: COC(=O)CCc1cc(-n2nc3ccccc3n2)c(O)c(C(C)(C)C)c1]
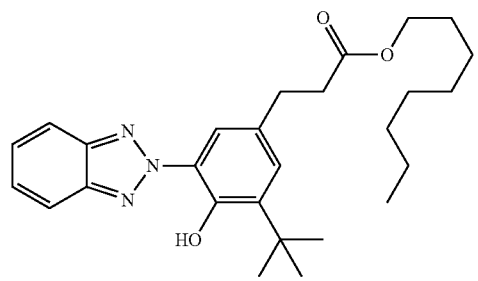 [SMILES: CCCCCCCCOC(=O)CCc1cc(-n2nc3ccccc3n2)c(O)c(C(C)(C)C)c1]

TABLE C-continued
Table C shows possible stabilisers which can be added to the LC media according to the invention.
(n here denotes an integer from 1 to 12, preferably 1, 2, 3, 4, 5, 6, 7 or 8, terminal methyl groups are not shown).
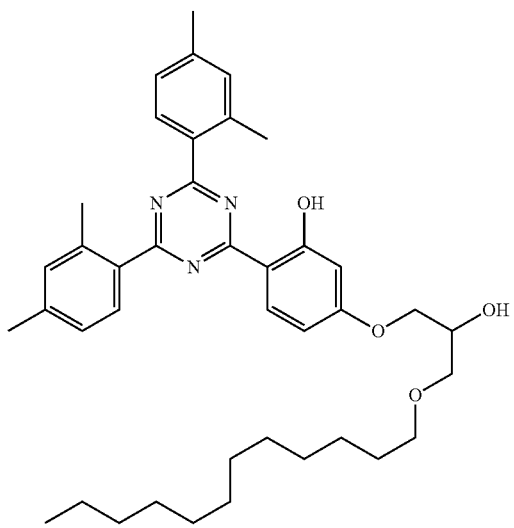 [SMILES: CCCCCCCCCCCCOCC(O)COc1ccc(-c2nc(-c3ccc(C)cc3C)nc(-c3ccc(C)cc3C)n2)c(O)c1]
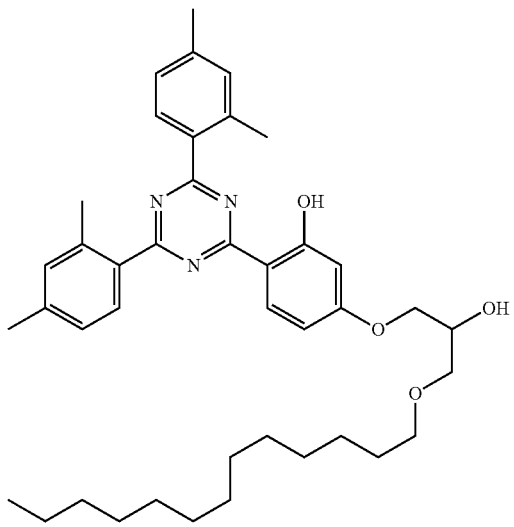 [SMILES: CCCCCCCCCCCCCOCC(O)COc1ccc(-c2nc(-c3ccc(C)cc3C)nc(-c3ccc(C)cc3C)n2)c(O)c1]
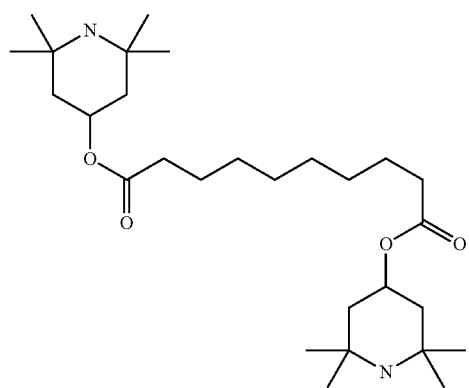

TABLE C-continued

Table C shows possible stabilisers which can be added to the LC media according to the invention.
(n here denotes an integer from 1 to 12, preferably 1, 2, 3, 4, 5, 6, 7 or 8, terminal methyl groups are not shown).

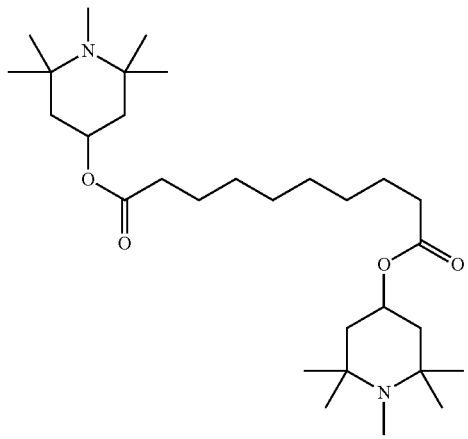

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C.

TABLE D

Table D shows illustrative compounds which can be used in the LC media in accordance with the present invention, preferably as reactive mesogenic compounds.

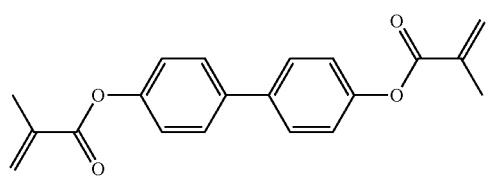 [SMILES: C=C(C)C(=O)Oc1ccc(-c2ccc(OC(=O)C(=C)C)cc2)cc1]

RM-1

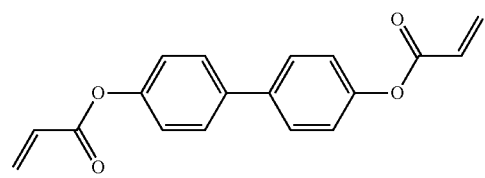 [SMILES: C=CC(=O)Oc1ccc(-c2ccc(OC(=O)C=C)cc2)cc1]

RM-2

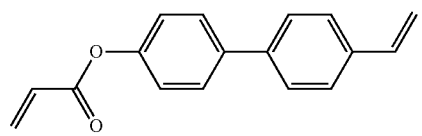 [SMILES: C=CC(=O)Oc1ccc(-c2ccc(C=C)cc2)cc1]

RM-3

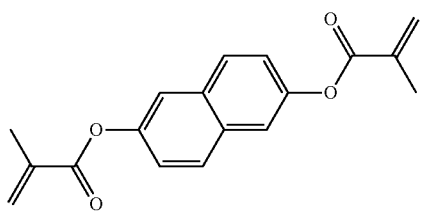 [SMILES: C=C(C)C(=O)Oc1ccc2cc(OC(=O)C(=C)C)ccc2c1]

RM-4

TABLE D-continued
Table D shows illustrative compounds which can be used in the LC media
in accordance with the present invention, preferably as reactive mesogenic compounds.
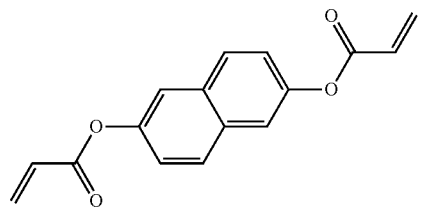 [SMILES: C=CC(=O)Oc1ccc2cc(OC(=O)C=C)ccc2c1]
RM-5
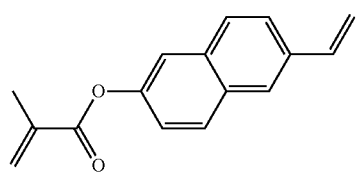 [SMILES: C=Cc1ccc2cc(OC(=O)C(=C)C)ccc2c1]
RM-6
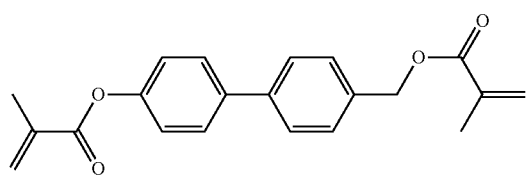 [SMILES: C=C(C)C(=O)OCc1ccc(-c2ccc(OC(=O)C(=C)C)cc2)cc1]
RM-7
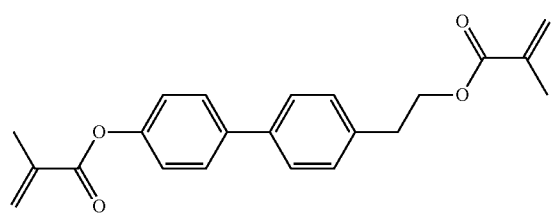 [SMILES: C=C(C)C(=O)OCCc1ccc(-c2ccc(OC(=O)C(=C)C)cc2)cc1]
RM-8
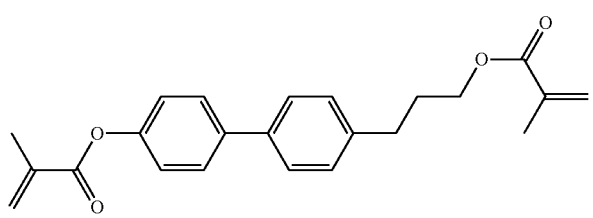 [SMILES: C=C(C)C(=O)OCCCc1ccc(-c2ccc(OC(=O)C(=C)C)cc2)cc1]
RM-9
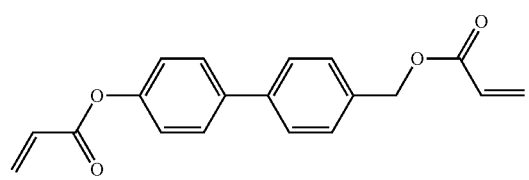 [SMILES: C=CC(=O)OCc1ccc(-c2ccc(OC(=O)C=C)cc2)cc1]
RM-10
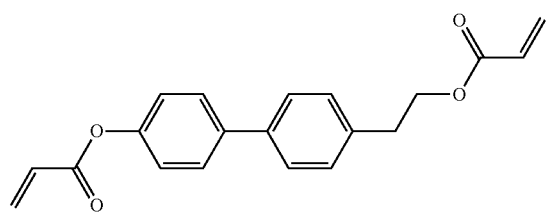 [SMILES: C=CC(=O)OCCc1ccc(-c2ccc(OC(=O)C=C)cc2)cc1]
RM-11

TABLE D-continued
Table D shows illustrative compounds which can be used in the LC media
in accordance with the present invention, preferably as reactive mesogenic compounds.
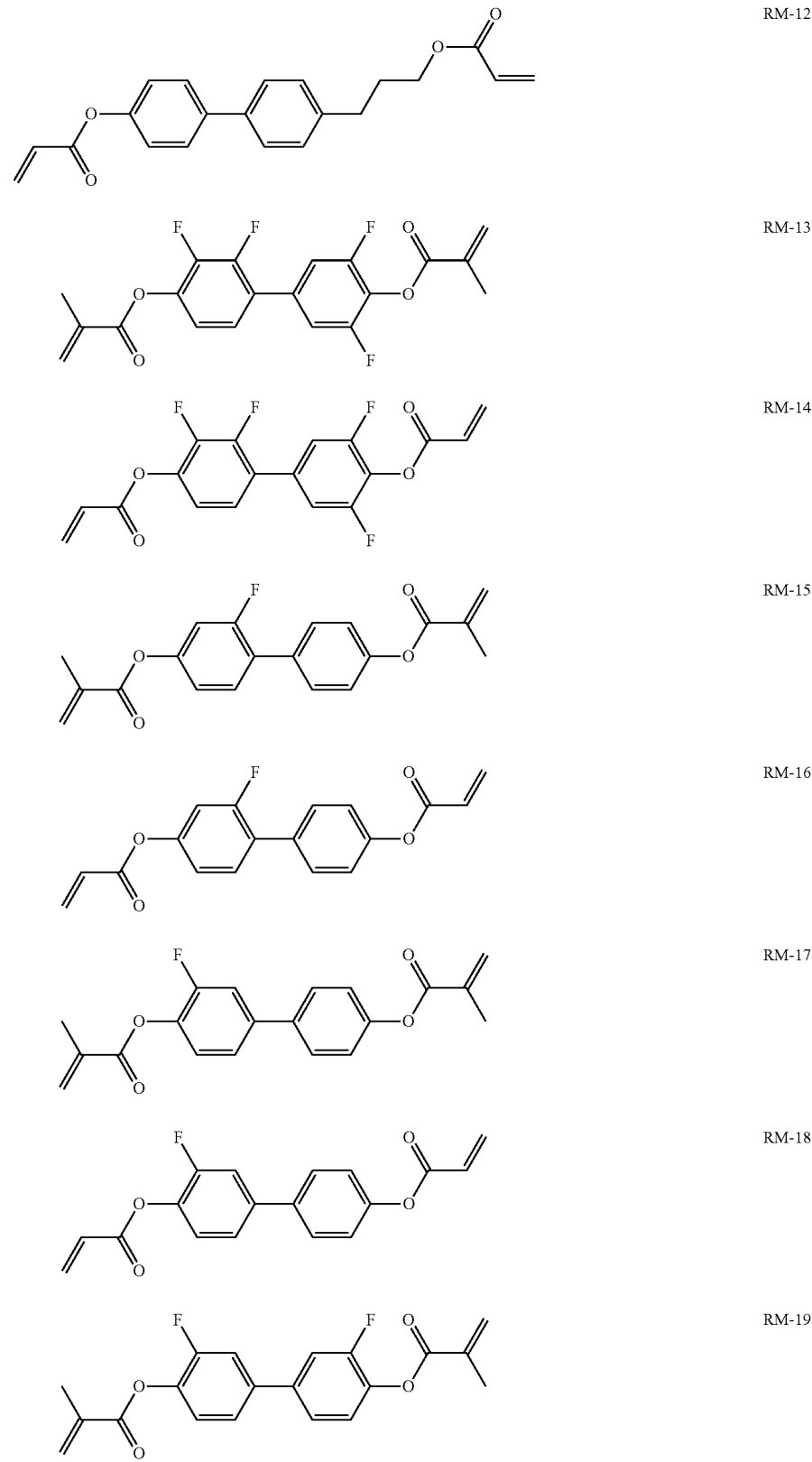
RM-12
RM-13
RM-14
RM-15
RM-16
RM-17
RM-18
RM-19

TABLE D-continued
Table D shows illustrative compounds which can be used in the LC media
in accordance with the present invention, preferably as reactive mesogenic compounds.
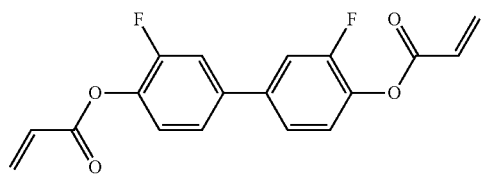 [SMILES: C=CC(=O)Oc1ccc(-c2ccc(OC(=O)C=C)c(F)c2)cc1F] RM-20
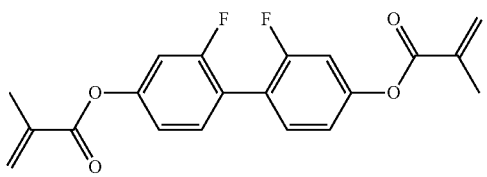 [SMILES: C=C(C)C(=O)Oc1ccc(-c2ccc(OC(=O)C(=C)C)cc2F)c(F)c1] RM-21
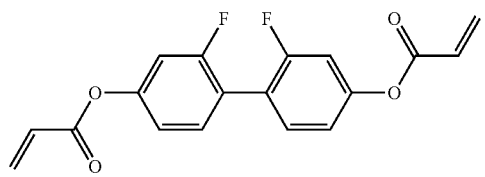 RM-22
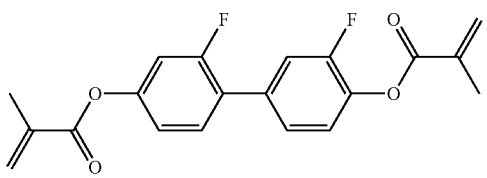 [SMILES: C=C(C)C(=O)Oc1ccc(-c2ccc(OC(=O)C(=C)C)c(F)c2)c(F)c1] RM-23
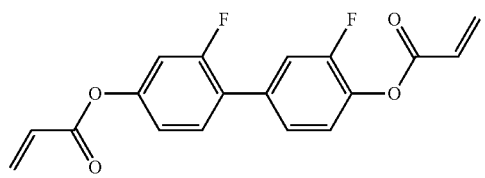 RM-24
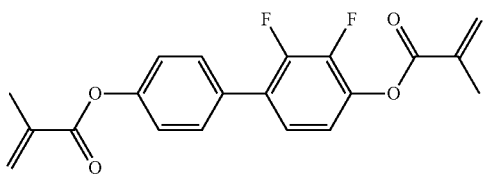 [SMILES: C=C(C)C(=O)Oc1ccc(-c2ccc(OC(=O)C(=C)C)c(F)c2F)cc1] RM-25
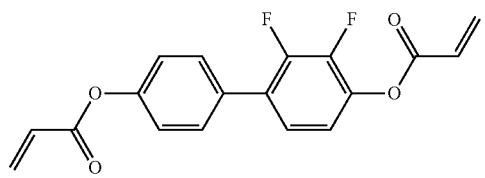 [SMILES: C=CC(=O)Oc1ccc(-c2ccc(OC(=O)C=C)c(F)c2F)cc1] RM-26
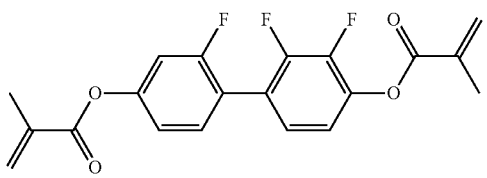 [SMILES: C=C(C)C(=O)Oc1ccc(-c2ccc(OC(=O)C(=C)C)c(F)c2F)c(F)c1] RM-27

TABLE D-continued
Table D shows illustrative compounds which can be used in the LC media
in accordance with the present invention, preferably as reactive mesogenic compounds.
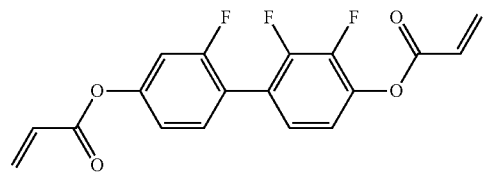 [SMILES: C=CC(=O)Oc1ccc(-c2ccc(OC(=O)C=C)c(F)c2F)c(F)c1] RM-28
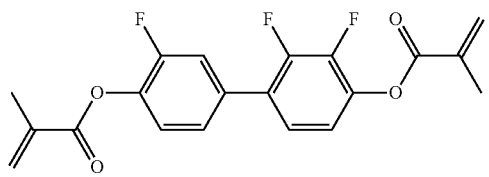 [SMILES: C=C(C)C(=O)Oc1ccc(-c2ccc(OC(=O)C(=C)C)c(F)c2F)cc1F] RM-29
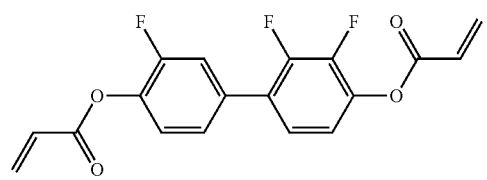 RM-30
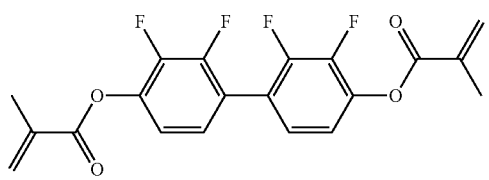 [SMILES: C=C(C)C(=O)Oc1ccc(-c2ccc(OC(=O)C(=C)C)c(F)c2F)c(F)c1F] RM-31
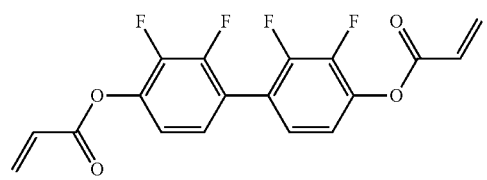 RM-32
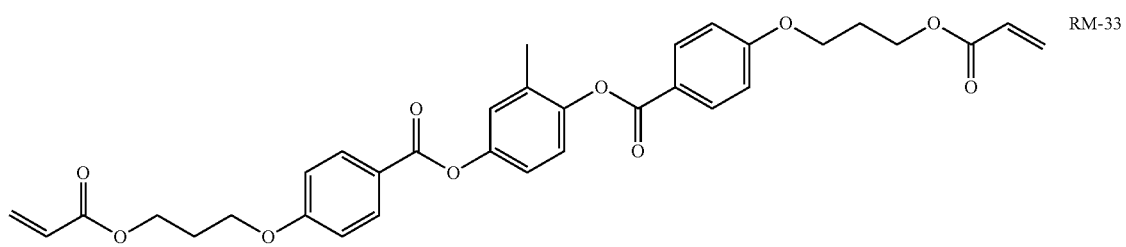 RM-33
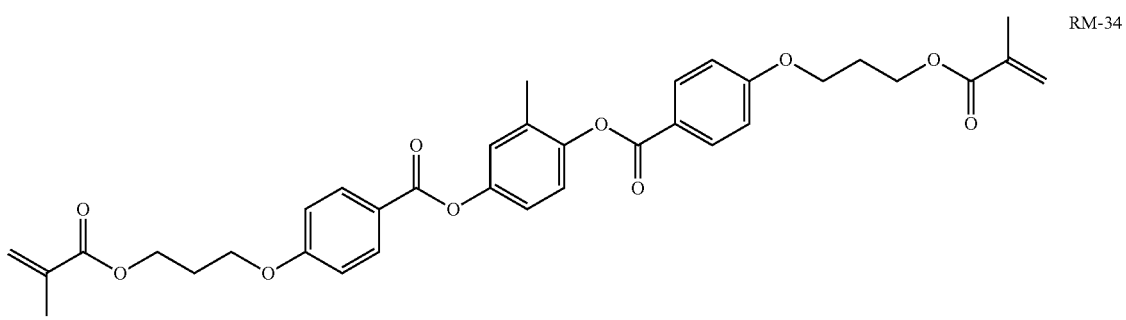 RM-34

TABLE D-continued
Table D shows illustrative compounds which can be used in the LC media
in accordance with the present invention, preferably as reactive mesogenic compounds.
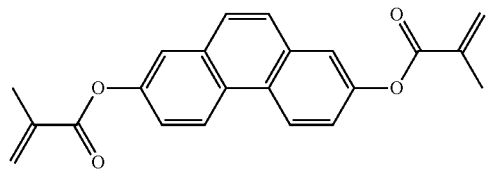 [SMILES: C=C(C)C(=O)Oc1ccc2c(ccc3cc(OC(=O)C(=C)C)ccc32)c1]
RM-35
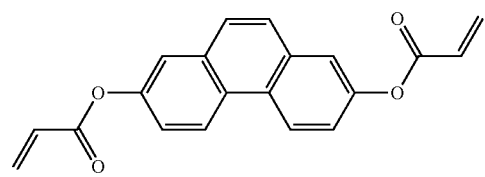 [SMILES: C=CC(=O)Oc1ccc2c(ccc3cc(OC(=O)C=C)ccc32)c1]
RM-36
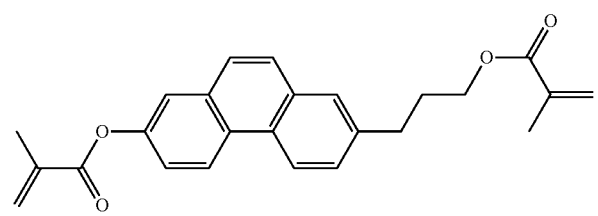 [SMILES: C=C(C)C(=O)OCCCc1ccc2c(ccc3cc(OC(=O)C(=C)C)ccc32)c1]
RM-37
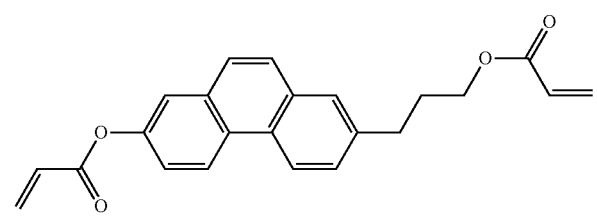 [SMILES: C=CC(=O)OCCCc1ccc2c(ccc3cc(OC(=O)C=C)ccc32)c1]
RM-38
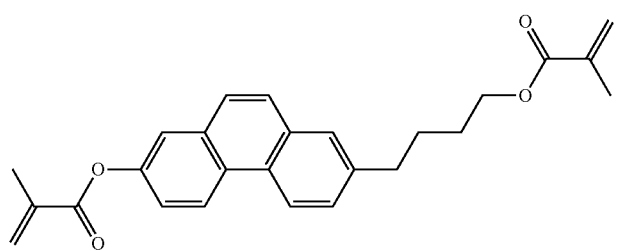 [SMILES: C=C(C)C(=O)OCCCCc1ccc2c(ccc3cc(OC(=O)C(=C)C)ccc32)c1]
RM-39
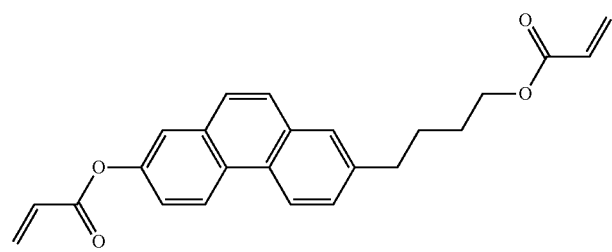 [SMILES: C=CC(=O)OCCCCc1ccc2c(ccc3cc(OC(=O)C=C)ccc32)c1]
RM-40
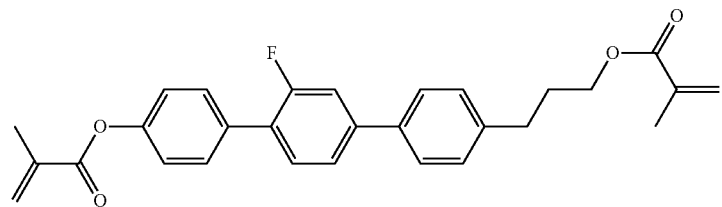 [SMILES: C=C(C)C(=O)OCCCc1ccc(-c2ccc(-c3ccc(OC(=O)C(=C)C)cc3)c(F)c2)cc1]
RM-41

TABLE D-continued
Table D shows illustrative compounds which can be used in the LC media in accordance with the present invention, preferably as reactive mesogenic compounds.
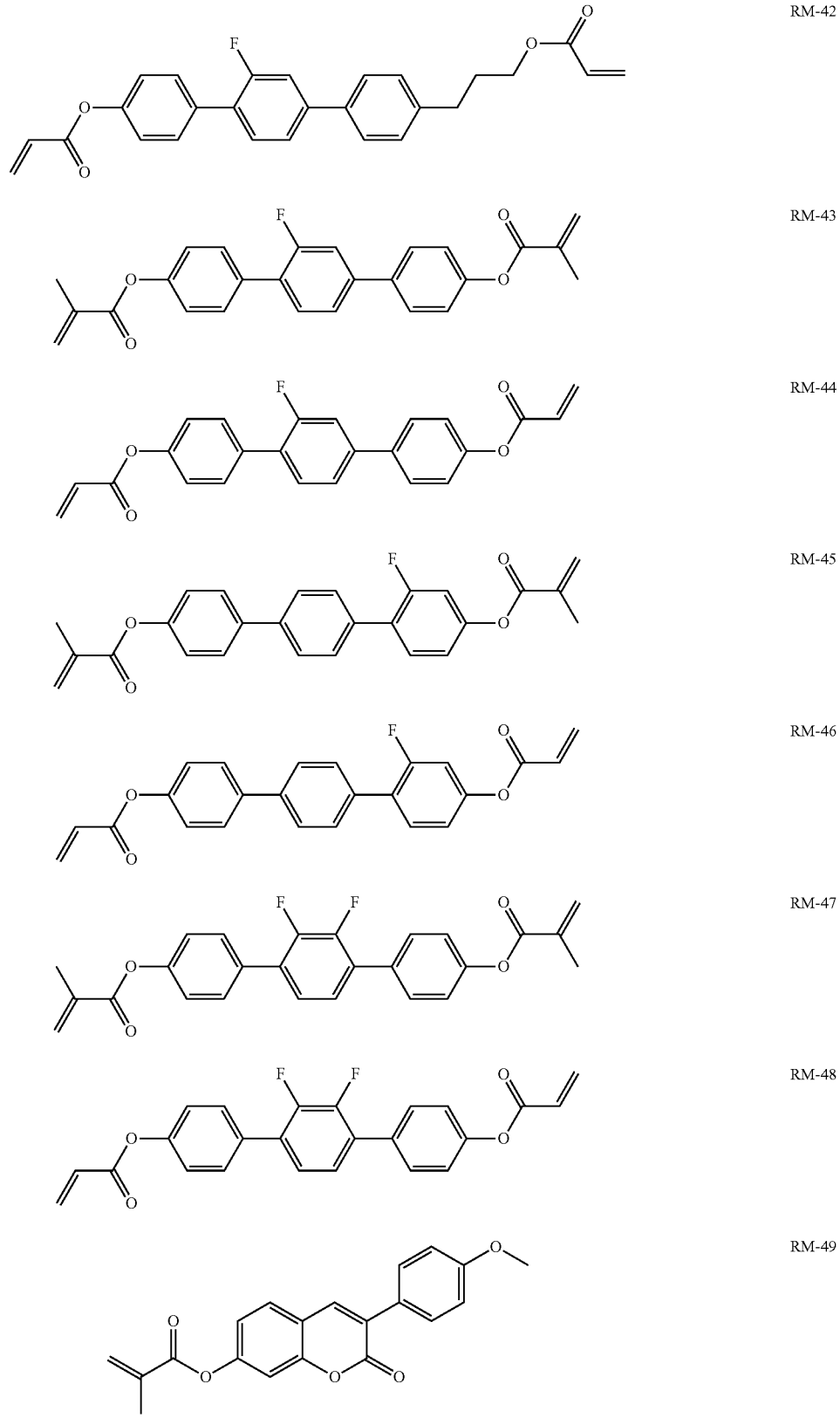

TABLE D-continued
Table D shows illustrative compounds which can be used in the LC media
in accordance with the present invention, preferably as reactive mesogenic compounds.
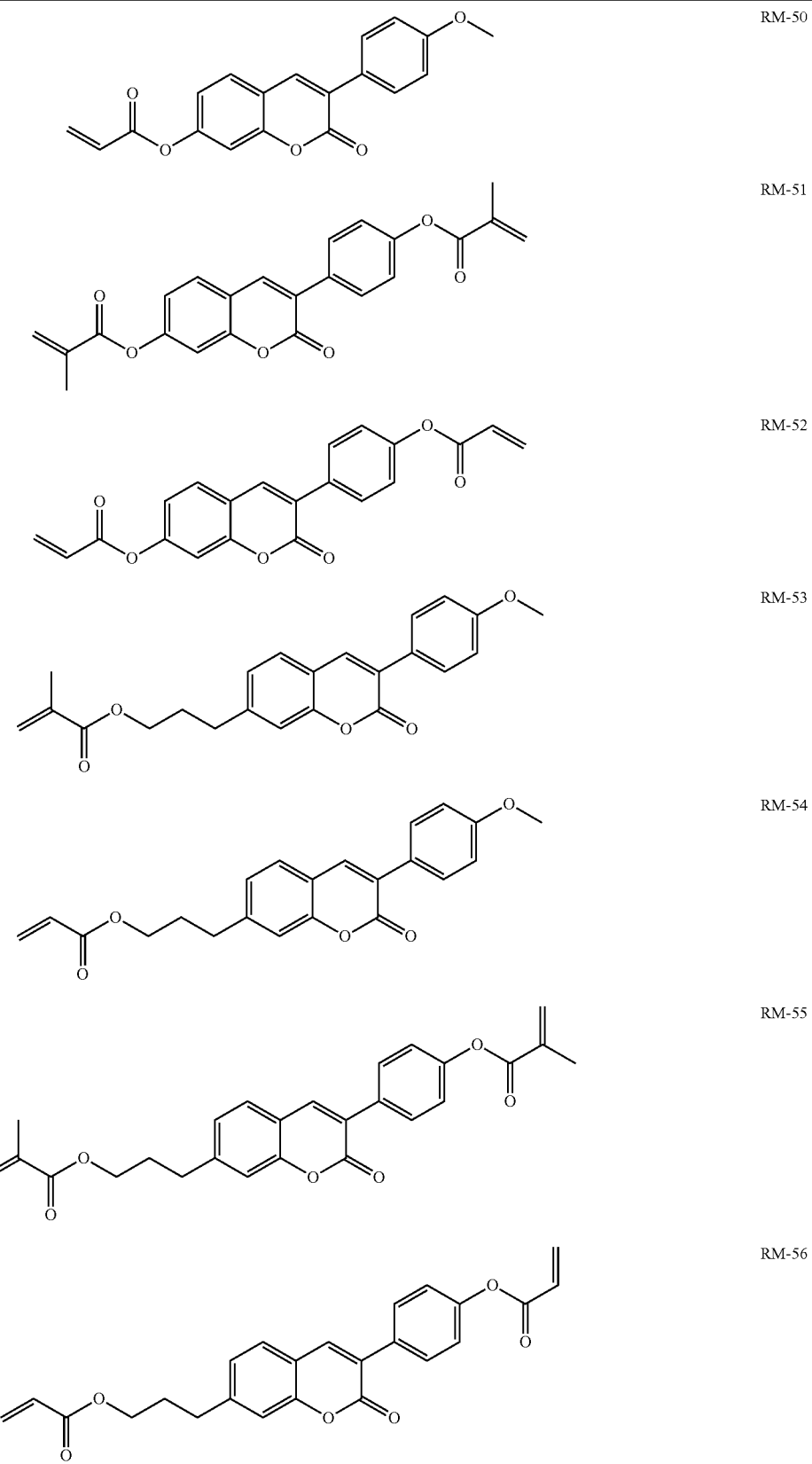
RM-50
RM-51
RM-52
RM-53
RM-54
RM-55
RM-56

TABLE D-continued
Table D shows illustrative compounds which can be used in the LC media in accordance with the present invention, preferably as reactive mesogenic compounds.
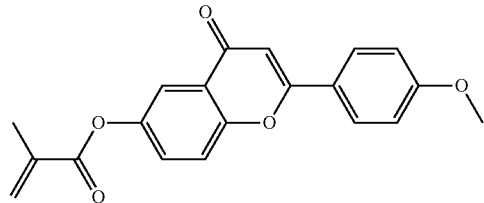 [SMILES: C=C(C)C(=O)Oc1ccc2oc(-c3ccc(OC)cc3)cc(=O)c2c1]
RM-57
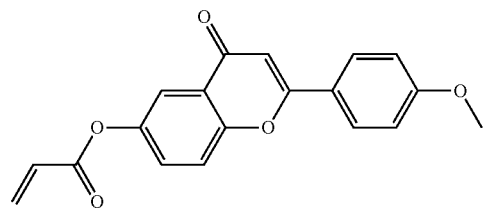 [SMILES: C=CC(=O)Oc1ccc2oc(-c3ccc(OC)cc3)cc(=O)c2c1]
RM-58
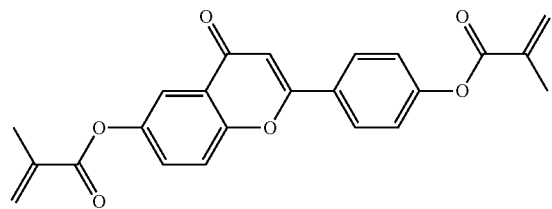 [SMILES: C=C(C)C(=O)Oc1ccc(-c2cc(=O)c3cc(OC(=O)C(=C)C)ccc3o2)cc1]
RM-59
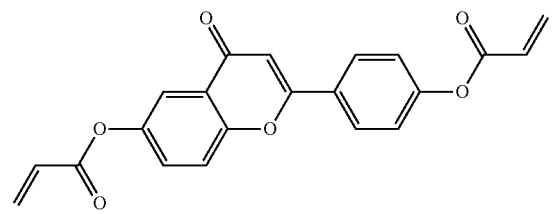 [SMILES: C=CC(=O)Oc1ccc(-c2cc(=O)c3cc(OC(=O)C=C)ccc3o2)cc1]
RM-60
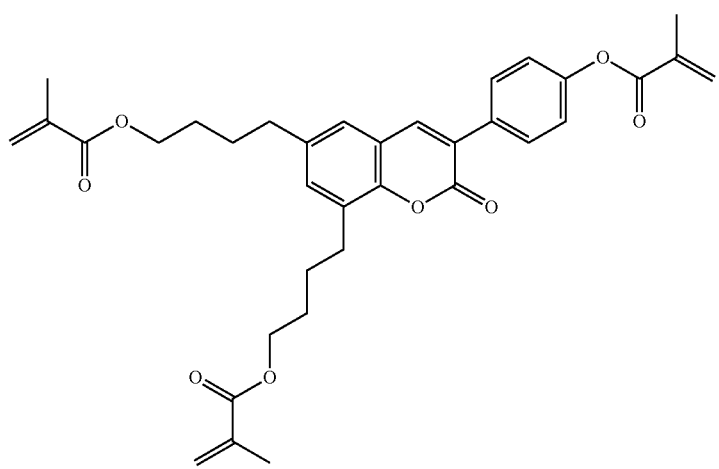 [SMILES: C=C(C)C(=O)OCCCCc1cc(CCCCOC(=O)C(=C)C)c2oc(=O)c(-c3ccc(OC(=O)C(=C)C)cc3)cc2c1]
RM-61

TABLE D-continued
Table D shows illustrative compounds which can be used in the LC media
in accordance with the present invention, preferably as reactive mesogenic compounds.
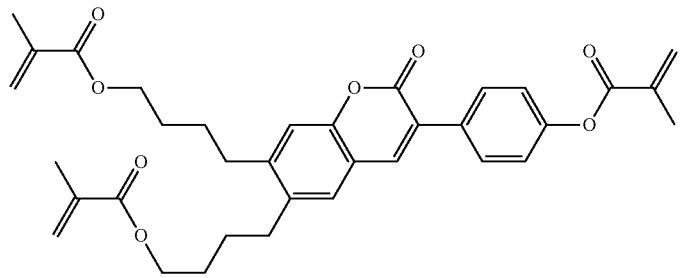 [SMILES: C=C(C)C(=O)OCCCCc1cc2cc(-c3ccc(OC(=O)C(=C)C)cc3)c(=O)oc2cc1CCCCOC(=O)C(=C)C]
RM-62
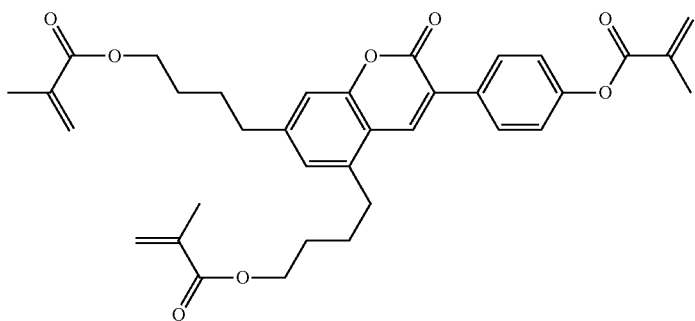 [SMILES: C=C(C)C(=O)OCCCCc1cc(CCCCOC(=O)C(=C)C)c2cc(-c3ccc(OC(=O)C(=C)C)cc3)c(=O)oc2c1]
RM-63
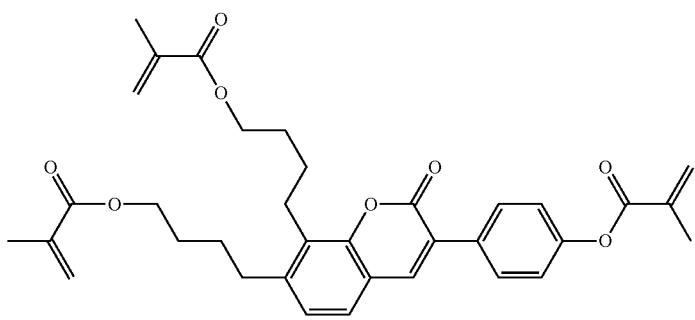 [SMILES: C=C(C)C(=O)OCCCCc1ccc2cc(-c3ccc(OC(=O)C(=C)C)cc3)c(=O)oc2c1CCCCOC(=O)C(=C)C]
RM-64
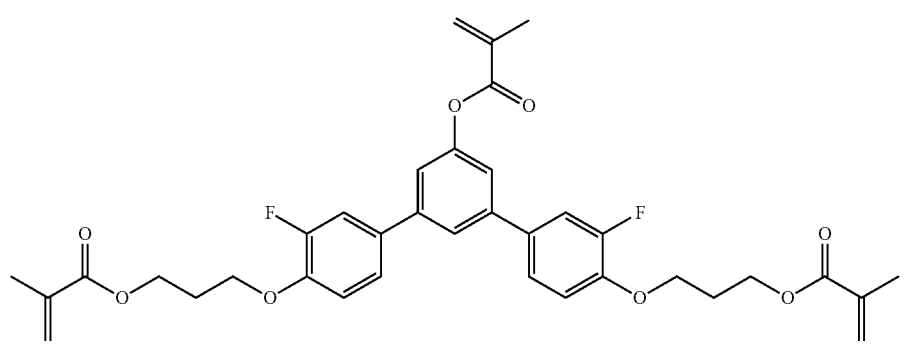 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-65
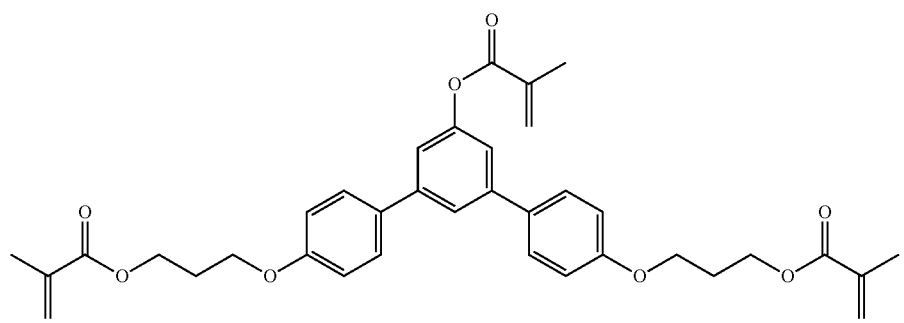 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-66

TABLE D-continued
Table D shows illustrative compounds which can be used in the LC media
in accordance with the present invention, preferably as reactive mesogenic compounds.
RM-67
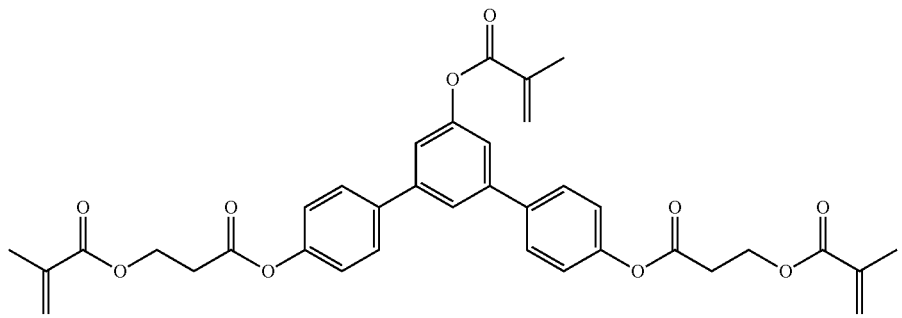 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-68
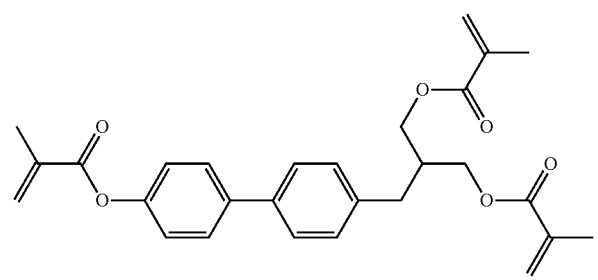 [SMILES: C=C(C)C(=O)OCC(COC(=O)C(=C)C)Cc1ccc(-c2ccc(OC(=O)C(=C)C)cc2)cc1]
RM-69
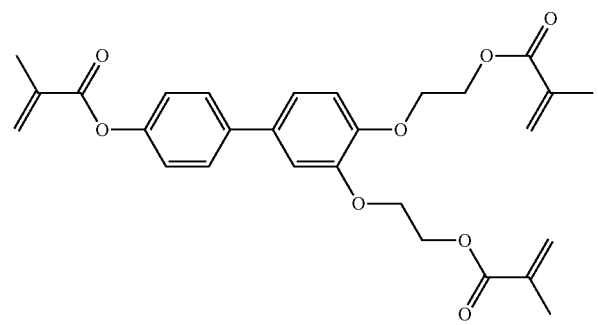 [SMILES: C=C(C)C(=O)OCCOc1ccc(-c2ccc(OC(=O)C(=C)C)cc2)cc1OCCOC(=O)C(=C)C]
RM-70
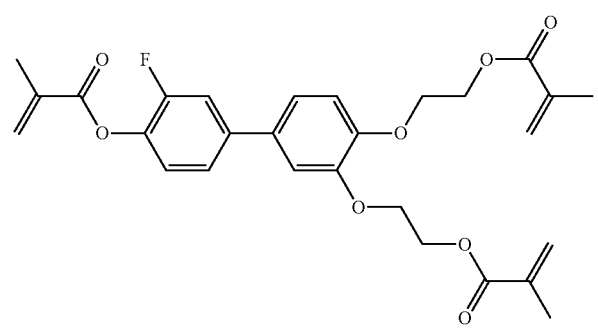 [SMILES: C=C(C)C(=O)OCCOc1ccc(-c2ccc(OC(=O)C(=C)C)c(F)c2)cc1OCCOC(=O)C(=C)C]
RM-71
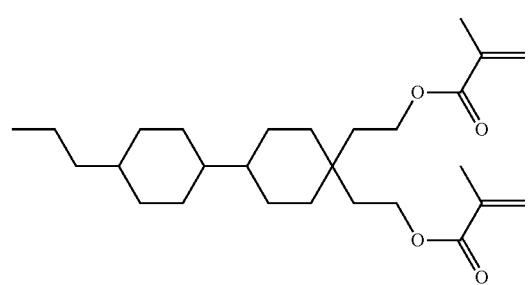 [SMILES: C=C(C)C(=O)OCCC1(CCOC(=O)C(=C)C)CCC(C2CCC(CCC)CC2)CC1]

TABLE D-continued
Table D shows illustrative compounds which can be used in the LC media
in accordance with the present invention, preferably as reactive mesogenic compounds.
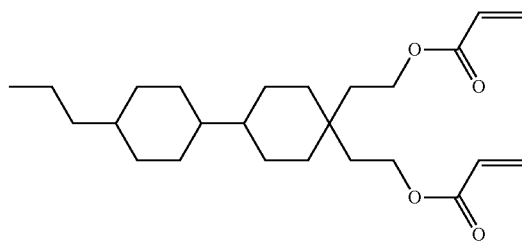 [SMILES: C=CC(=O)OCCC1(CCOC(=O)C=C)CCC(C2CCC(CCC)CC2)CC1]
RM-72
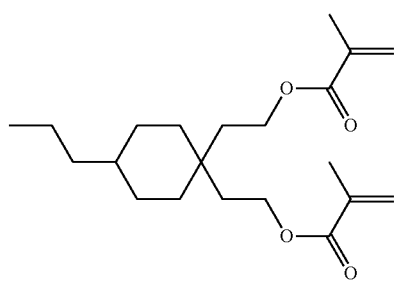 [SMILES: C=C(C)C(=O)OCCC1(CCOC(=O)C(=C)C)CCC(CCC)CC1]
RM-73
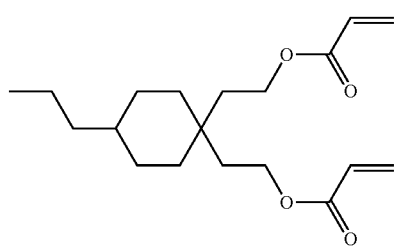 [SMILES: C=CC(=O)OCCC1(CCOC(=O)C=C)CCC(CCC)CC1]
RM-74
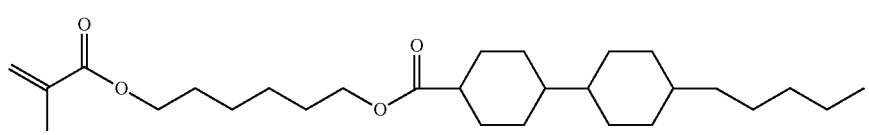 [SMILES: C=C(C)C(=O)OCCCCCCOC(=O)C1CCC(C2CCC(CCCCC)CC2)CC1]
RM-75
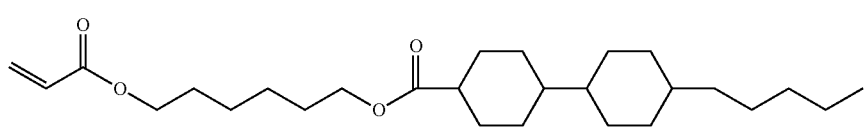
RM-76
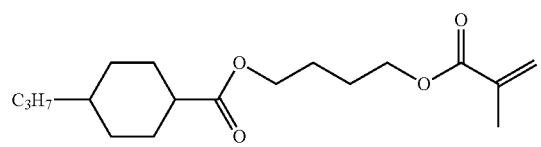
RM-77
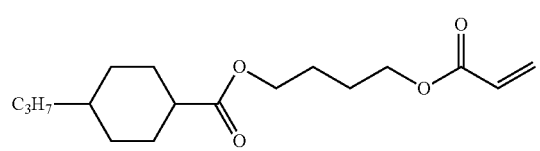
RM-78

TABLE D-continued
Table D shows illustrative compounds which can be used in the LC media
in accordance with the present invention, preferably as reactive mesogenic compounds.
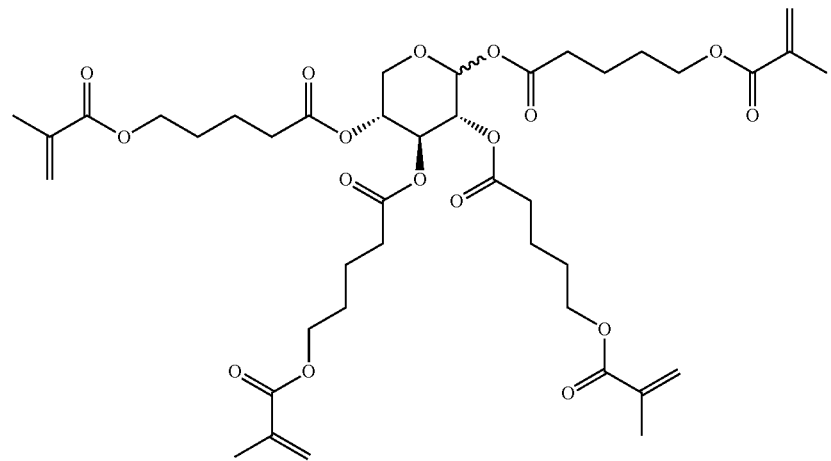 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-79
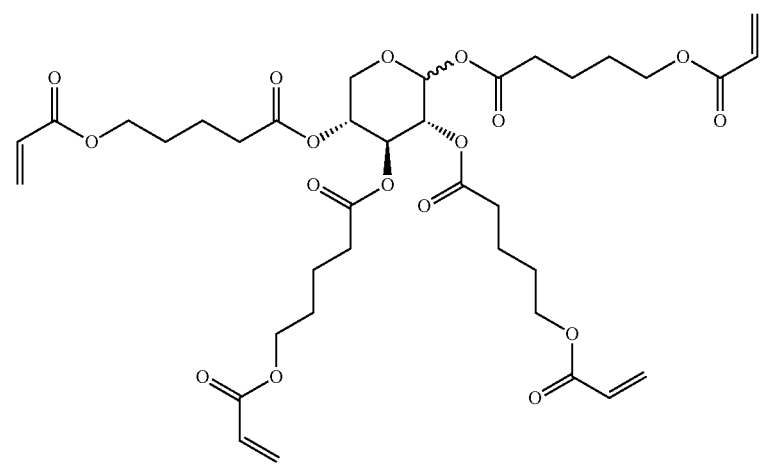 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-80
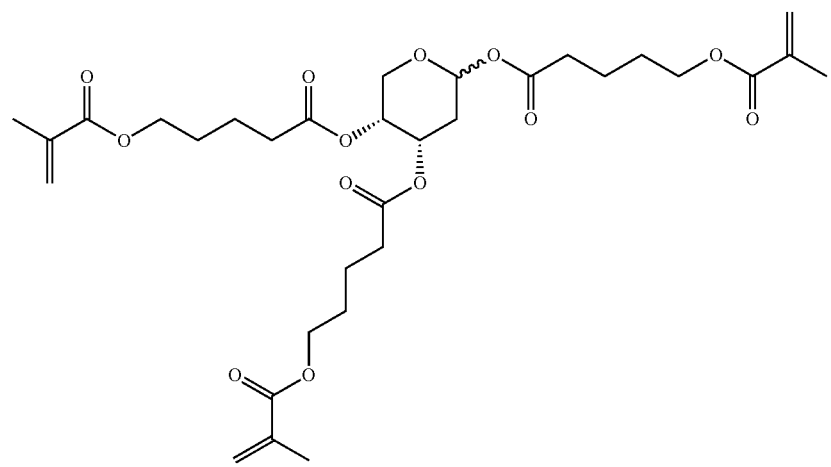 [SMILES: C=C(C)C(=O)OCCCCC(=O)OC1C[C@H](OC(=O)CCCCOC(=O)C(=C)C)[C@H](OC(=O)CCCCOC(=O)C(=C)C)CO1]
RM-81

TABLE D-continued

Table D shows illustrative compounds which can be used in the LC media
in accordance with the present invention, preferably as reactive mesogenic compounds.

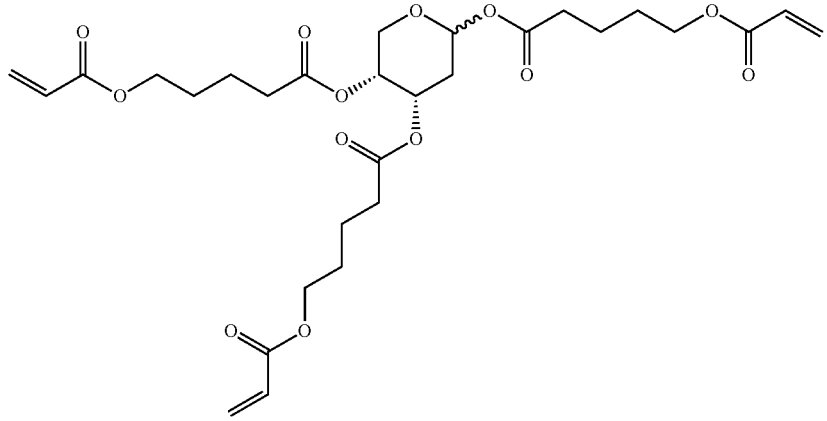 [SMILES: C=CC(=O)OCCCCC(=O)OC1C[C@H](OC(=O)CCCCOC(=O)C=C)[C@H](OC(=O)CCCCOC(=O)C=C)CO1]
RM-82

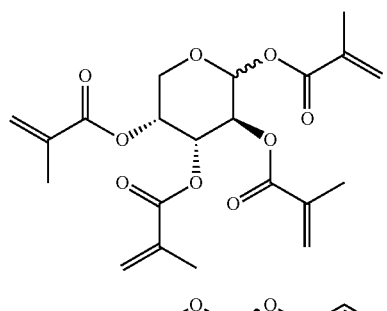
RM-83

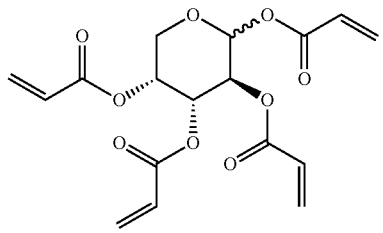 [SMILES: C=CC(=O)OC1OC[C@@H](OC(=O)C=C)[C@@H](OC(=O)C=C)[C@@H]1OC(=O)C=C]
RM-84

In a preferred embodiment of the present invention, the mesogenic media comprise one or more compounds selected from the group of the compounds from Table D.

In addition, the following abbreviations and symbols are used:
$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\epsilon_\perp$ dielectric permittivity perpendicular to the director at 20° C. and 1 kHz,
$\epsilon_\parallel$ dielectric permittivity parallel to the director at 20° C. and 1 kHz,
$\Delta\epsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\epsilon$ at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerising the polymerizable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display used for measurement of the capacitive threshold voltage consists of two plane-parallel glass outer plates at a separation of 25 µm, each of which has on the inside an electrode layer and an unrubbed polyimide alignment layer on top, which effect a homeotropic edge alignment of the liquid-crystal molecules.

The display or test cell used for measurement of the tilt angles consists of two plane-parallel glass outer plates at a separation of 4 µm, each of which has on the inside an electrode layer and a polyimide alignment layer on top, where the two polyimide layers are rubbed antiparallel to one another and effect a homeotropic edge alignment of the liquid-crystal molecules.

The polymerizable compounds are polymerized in the display or test cell by irradiation with UVA light of defined intensity for a prespecified time, with a voltage simultaneously being applied to the display (usually 10 V to 30 V alternating current, 1 kHz). In the examples, unless indicated otherwise, a metal halide lamp and an intensity of 100 mW/cm$^2$ is used for polymerization. The intensity is measured using a standard UVA meter (Hoenle UV-meter high end with UVA sensor).

The tilt angle is determined by crystal rotation experiment (Autronic-Melchers TBA-105). A low value (i.e. a large deviation from the 90° angle) corresponds to a large tilt here.

The VHR value is measured as follows: 0.3% of a polymerizable monomeric compound is added to the LC host mixture, and the resultant mixture is introduced into VA-VHR test cells (not rubbed, VA-polyimide alignment layer, LC-layer thickness d=6 µm). The HR value is determined after 5 min at 100° C. before and after UV exposure at 1 V, 60 Hz, 64 µs pulse (measuring instrument: Autronic-Melchers VHRM-105).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding EP application No. 12004991.1, filed Jul. 5, 2012, and is incorporated by reference herein.

Example 1

2-Methylacrylic acid-4,4"-bis-[2-(2-methyl-acryloyloxy)-ethoxy]-[1,1';3',1"]terphenyl-5'-ylester 1.1 4,4"-Bis-(2-hydroxy-ethoxy)-[1,1';3',1"]terphenyl-5'-ol

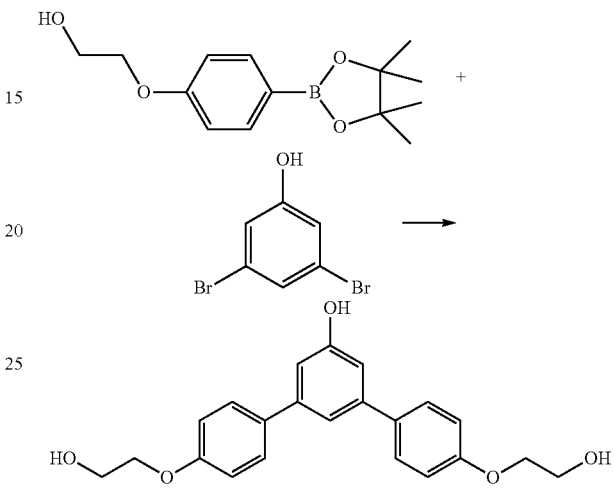

11.0 g (41.6 mmol) 2-[4-(4,4,5,5-Tetramethyl-[1,3,2]dioxaborolane-2-yl)phenoxy]-ethanol, 5.25 g (20.8 mmol) 3,5-Dibromophenol and 34.4 g (125 mmol) sodium metaborate-tetrahydrate are suspended in 60 ml THF and 60 ml water and 1.36 g (2 mmol) palladium(dppf) are added. The mixture is heated overnight at reflux. After addition of 100 ml water and 100 ml MTB ether the mixture is acidified with 2M hydrochloric acid. The organic layer is separated and the aqueous layer is extracted three times with MTB ether. The combined organic layers are dried over sodium sulfate and the solvent is removed in vacuo. The crude product is filtered through silica gel with toluene/ethyl acetate (1:1 to 0:1) to yield a yellow oil, which crystallizes from dichloromethane.

$^1$H-NMR (500 MHz, DMSO-d$_6$):

δ=3.72 ppm (t, J=5.0 Hz, 4H, —CH$_2$OH), 4.00 (t, J=5.0 Hz, 4H, —OCH$_2$CH$_2$OH), 6.92 (d, J=1.6 Hz, 2H, Ar—H), 6.97 (AB-m$_c$, darin: J=8.8 Hz, 4H, Ar—H), 7.19 (t, J=1.6 Hz, 1H, Ar—H), 7.56 (AB-m$_c$, darin: J=8.8 Hz, 4H, Ar—H).

1.2 2-Methylacrylic acid-4,4"-bis-[2-(2-methyl-acryloyloxy)-ethoxy]-[1,1';3',1"]terphenyl-5'-ylester

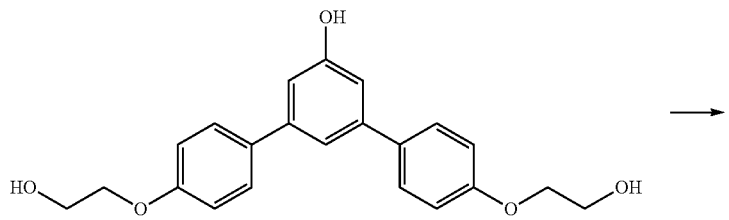

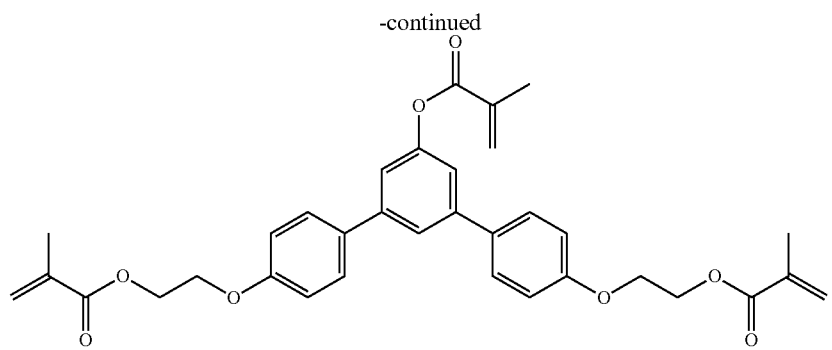

4.00 g (10.9 mmol) 4,4"-bis-(3-hydroxy-propoxy)-[1,1';3',1"]terphenyl-5'-ol are suspended in 140 ml dichloromethane with 3.48 g (40.4 mmol) methacrylic acid and 130 mg DMAP, and a solution of 6.27 g (40.4 mmol) EDC in 10 ml dichloromethane is added dropwise under ice-cooling. After 1 h the cooling is removed and the mixture is stirred overnight at RT. The solvent is removed in vacuo and the residue is filtered through silica gel. Crystallization from acetonitrile yields 2-methylacrylic acid-4,4"-bis-[2-(2-methyl-acryloyloxy)-ethoxy]-[1,1';3',1"]terphenyl-5'-yl ester as colourless solid with a m.p. 99° C.

Example 2

2-Methyl-acrylic acid-4,4"-bis-[3-(2-methyl-acryloyloxy)-propoxy]-[1,1';3',1"]terphenyl-5'-ylester 2.1 3,3'-[5'-(2-Methoxy-ethoxymethoxy)-[1,1':3',1"-terphenyl]-4,4"-diylbis(oxy-3,1-propanediyloxy)]bis(tetrahydro-2H-pyrane)

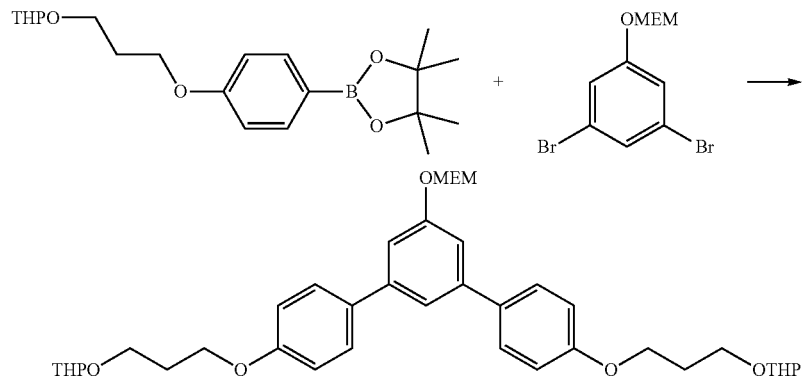

12.2 g (32.9 mmol) 2-{3-[4-(4,4,5,5-tetramethyl-[1,3,2]dioxaborolane-2-yl)phenoxy]-propoxy}-tetrahydro-2H-pyrane, 5.66 g (16.5 mmol) 1,3-dibromo-5-(2-methoxy-ethoxymethoxy)-benzene and 27.2 g (98.7 mmol) sodium metaborate-tetrahydrate are suspended in 60 ml THF and 60 ml water and 1.07 g (1 mmol) palladium(dppf) are added. The mixture is heated overnight at reflux. After addition of 100 ml water and 100 ml MTB ether the mixture is acidified with 2M hydrochloric acid. The organic layer is separated and the aqueous layer is extracted three times with MTB ether. The combined organic layers are dried over sodium sulfate and the solvent is removed in vacuo. The crude product is filtered through silica gel with toluene/ethylacetate (7:3) to yield 3,3'-[5'-(2-methoxy-ethoxymethoxy)-[1,1':3',1''-terphenyl]-4,4''-diylbis(oxy-3,1-propanediyloxy)]bis(tetrahydro-2H-pyrane) as a yellow oil, which is used for the next step without further purification.

2.2 4,4''-Bis-(3-hydroxy-propoxy)-[1,1';3',1'']terphenyl-5'-ol

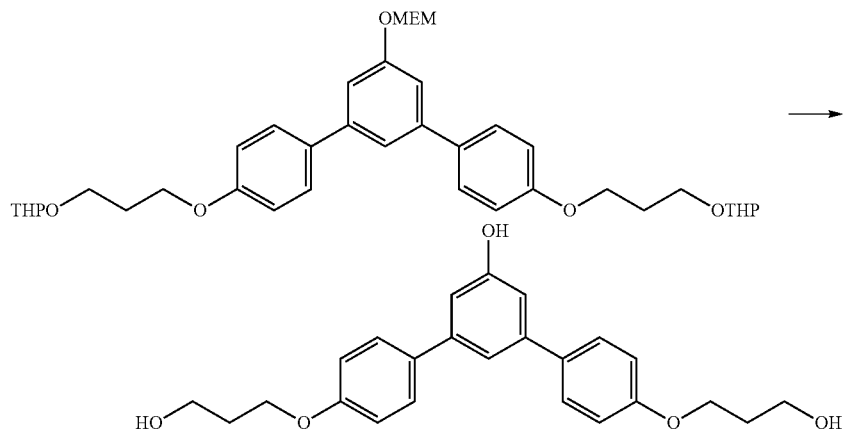

7.90 g (12.1 mmol) 3'-[5'-(2-methoxy-ethoxymethoxy)-[1,1':3',1''-terphenyl]-4,4''-diylbis(oxy-3,1-propanediyloxy)]bis(tetrahydro-2H-pyrane) are dissolved in 60 ml methanol, and, after addition of 9 ml conc. hydrochloric acid, stirred overnight at RT. The mixture is diluted with water and extracted three times with MTB ether. The combined organic layers are washed with sat. aq. sodium chloride solution and dried over sodium sulfate. 4,4''-Bis-(3-hydroxy-propoxy)-[1,1';3',1'']terphenyl-5'-ol is obtained as a yellow oil.

2.3 2-Methyl-acrylic acid-4,4''-bis-[3-(2-methyl-acryloyloxy)-propoxy]-[1,1';3',1'']terphenyl-5'-yl ester

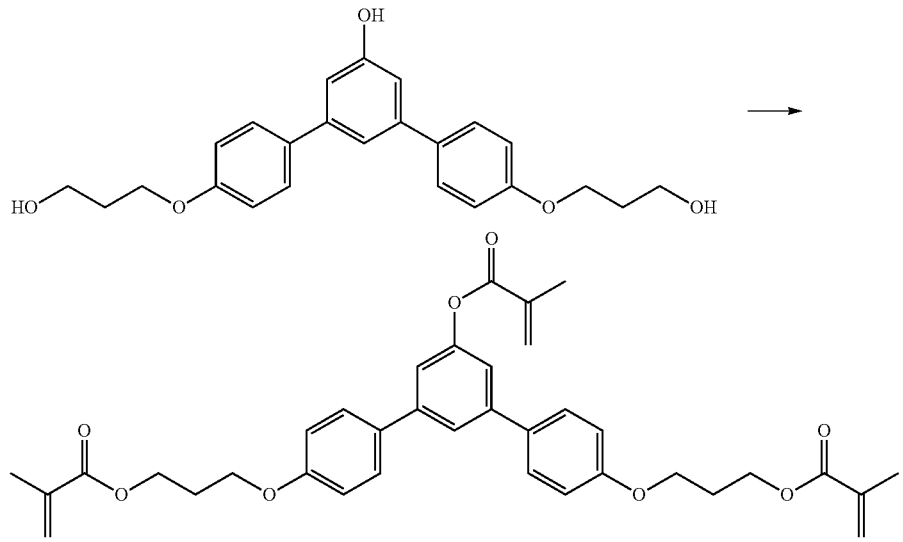

2.00 g (5.07 mmol) 4,4"-bis-(3-hydroxy-propoxy)-[1,1';3',1"]terphenyl-5'-ol are dissolved in 100 ml dichloromethane with 2.18 ml (25.4 mmol) methacrylic acid and 60 mg DMAP, and a solution of 3.94 g (25.4 mmol) EDC in 30 ml dichloromethane is added dropwise under ice-cooling. After 1 h the cooling is removed and the mixture is stirred overnight at RT. The solvent is removed in vacuo and the residue is purified by chromatography. Crystallization from ethanol yields 2-methyl-acrylic acid-4,4"-bis-[3-(2-methyl-acryloyloxy)-propoxy]-[1,1';3',1"]terphenyl-5'-ylester as colourless crystals with a m.p. 49° C.

The compounds of Examples 3, 4, 5 and 6 were prepared in analogy to Example 1 and 2.

Example 3

2-Methyl-acrylic acid-2-{3,3"-difluor-5'-(2-methyl-acryloyloxy)-4"-[2-(2-ethyl-acryloyloxy)-ethoxy]-[1,1';3',1"]terphenyl-4-yloxy}-ethyl ester

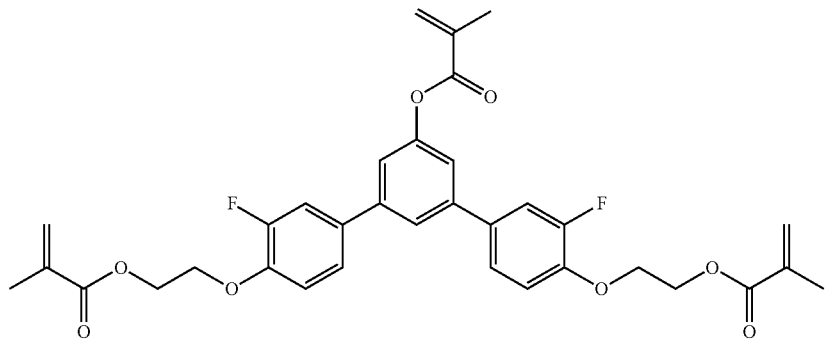 [SMILES: C=C(C)C(=O)OCCOc1ccc(-c2cc(OC(=O)C(=C)C)cc(-c3ccc(OCCOC(=O)C(=C)C)c(F)c3)c2)cc1F]

Colourless crystals with a m.p. 74° C.

Example 4

2-Methyl-acrylic acid-3,3"-difluor-4,4"-bis-[3-(2-methyl-acryloyloxy)propoxy]-[1,1';3',1"]terphenyl-5'-yl ester

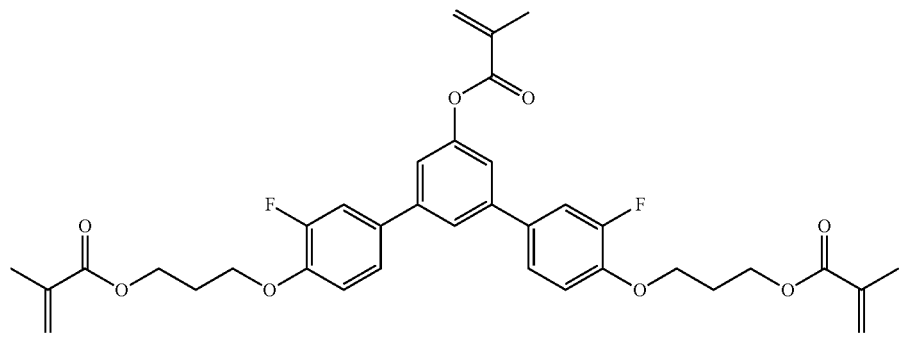 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]

Colourless crystals with a m.p. 66° C.

Example 5

2-Methyl-acrylic acid-2-{3,3"-diethyl-5'-(2-methyl-acryloyloxy)-4-[2-(2-methyl-acryloyloxy)-ethoxy]-[1,1';3',1"]terphenyl-4"-yloxy}-ethyl ester

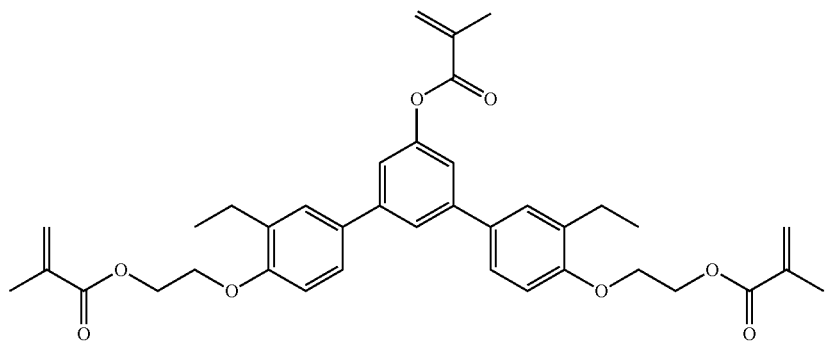 [SMILES: C=C(C)C(=O)OCCOc1ccc(-c2cc(OC(=O)C(=C)C)cc(-c3ccc(OCCOC(=O)C(=C)C)c(CC)c3)c2)cc1CC]

Colourless crystals with a m.p. 77° C.

Example 6

2-Methyl-acrylic acid-3-{3,3"-diethyl-5'-(2-methyl-acrloloxy)-4-[3-(2-ethyl-acryloyloxy)-propoxy]-[1,1';3',1"]terphenyl-4"-yloxy}-propyl ester

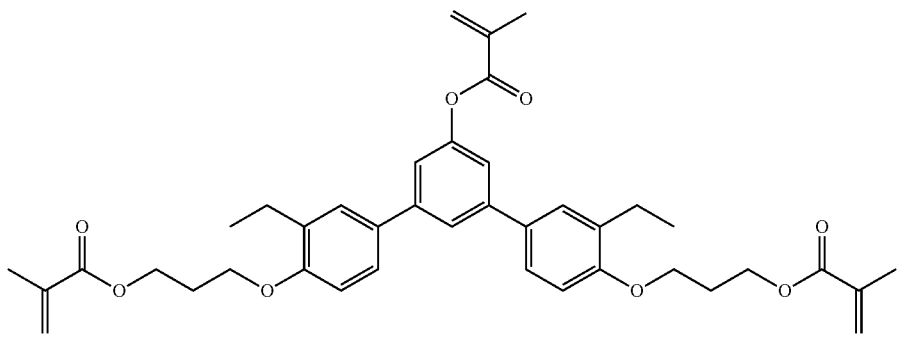 [SMILES: C=C(C)C(=O)OCCCOc1ccc(-c2cc(OC(=O)C(=C)C)cc(-c3ccc(OCCCOC(=O)C(=C)C)c(CC)c3)c2)cc1CC]

Colourless crystals with a m.p. 144° C. (decomp.).

Example 7

2-Methyl-acrylic acid-3-{3"-fluoro-5'-(2-methyl-acryloyloxy)-4-[2-(2-methyl acryloyloxy)-ethoxy]-[1,1';3',1"]terphenyl-4"-yloxy}-propyl ester

7.1 4-(3-Benzyloxy-propoxy)-3'-bromo-3-fluoro-5'-(2-methoxyethoxymethoxy)-biphenyl

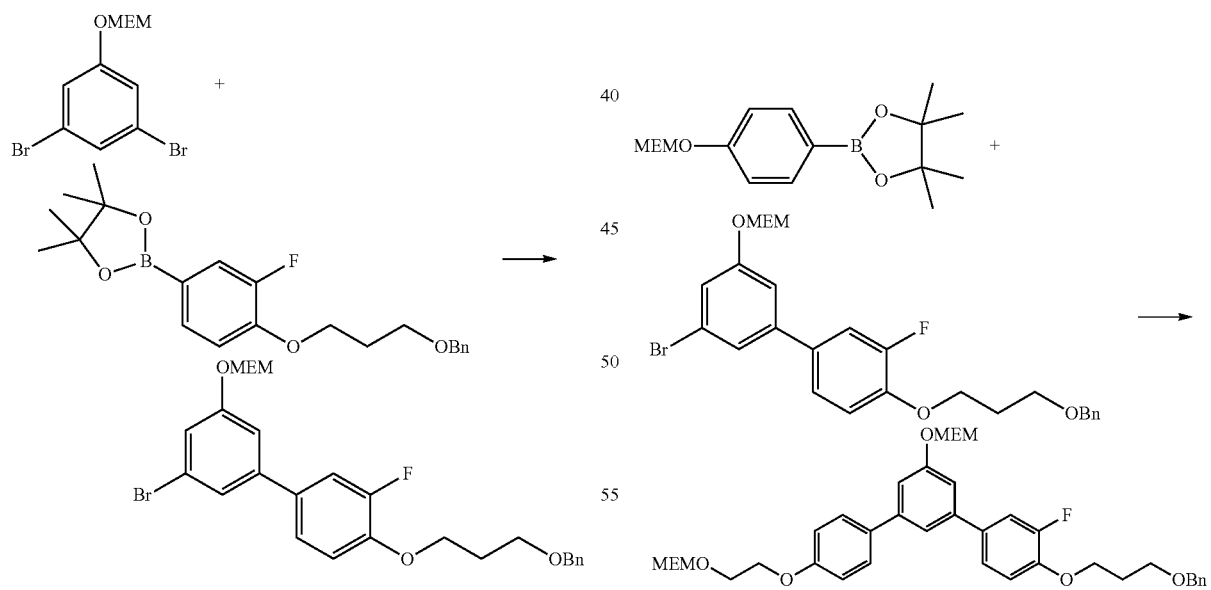

17.0 g (50.0 mmol) 1,3-dibromo-5-(2-methoxy-ethoxymethoxy)-benzene, 19.3 g (50.0 mmol) 2-[4-(3-benzyloxy-propoxy)-3-fluoro-phenyl]-4,4,5,5-tetramethyl-[1,3,2]dioxaborolane and 41.3 g (150 mmol) sodium metaborate-tetrahydrate are suspended in 200 ml THF and 200 ml water and 1.6 g (2 mmol) palladium(dppf) are added. The mixture is heated overnight at reflux. After partial removal of the solvent and addition of 100 ml MTB ether, the mixture is acidified with 2M hydrochloric acid. The organic layer is separated and the aqueous layer is extracted three times with MTB ether. The combined organic layers are washed with sat. aq. sodium chloride solution, dried over sodium sulfate and the solvent is removed in vacuo. The crude product is filtered through silica gel with toluene/ethylacetate (7:3 to 1:1) to yield 4-(3-benzyloxy-propoxy)-3'-bromo-3-fluoro-5'-(2-methoxy-ethoxymethoxy)-biphenyl as a yellow oil.

$^1$H-NMR (500 MHz, DMSO-$d_6$)

δ=2.04 (quint., J=6.3 Hz, 2H, —OCH$_2$CH$_2$O—), 3.23 (s, 3H, MeO—), 3.48 (m$_c$, 2H, —CH$_2$OCH$_3$), 3.61 (t, J=6.3 Hz, 2H, BnOCH$_2$—), 3.75 (m$_c$, 2H, —CH$_2$CH$_2$OCH$_3$), 4.18 (t, J=6.3 Hz, 2H, —CH$_2$OAr), 4.49 (s, —OCH$_2$Ph), 5.34 (s, 2H, —OCH$_2$O—), 7.19-7.35 (m, 11H, Ar—H).

7.2 4"-(3-Benzyloxy-propoxy)-3"-fluoro-5'-(2-methoxy-ethoxymethoxy)-4-(2-ethoxymethoxy-ethoxy)-[1,1';3',1"]terphenyl In analogy to step 1, 2-[4-(2-Methoxymethoxy-ethoxy)-phenyl]-4,4,5,5-tetramethyl-[1,3,2]dioxaborolane and 4-(3-benzyloxy-propoxy)-3'-bromo-3-fluoro-5'-(2-methoxy-ethoxymethoxy)-biphenyl are reacted to give 4"-(3-Benzyloxy-propoxy)-3"-fluoro-5'-(2-methoxy-ethoxymethoxy)-4-(2-ethoxymethoxy-ethoxy)-[1,1';3',1"]terphenyl as a yellow oil.

7.3 3-{3''-Fluoro-5'-(2-methoxy-ethoxymethoxy)-4-[2-(2-methoxyethoxymethoxy)-ethoxy]-[1,1';3',1'']terphenyl-4''-yloxy}-propane-1-ol

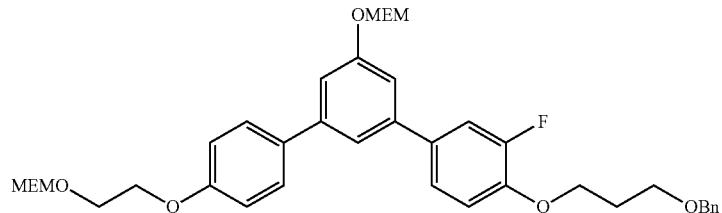

2.60 g (4.20 mmol) 4''-(3-benzyloxy-propoxy)-3''-fluoro-5'-(2-methoxy-ethoxymethoxy)-4-(2-ethoxymethoxy-ethoxy)-[1,1';3',1'']terphenyl are hydrogenated in 50 ml THF on 1.0 g Pd/activated charcoal until the reaction is completed. The catalyst is filtered off and the solvent is removed in vacuo. 3-{3''-fluoro-5'-(2-methoxy-ethoxymethoxy)-4-[2-(2-methoxy-ethoxymethoxy)-ethoxy]-[1 1';3',1'']terphenyl-4''-yloxy}-propane-1-ol is obtained as colourless oil, which is used for the next step without further purification.

2.20 g (4.15 mmol) 3-{3''-fluoro-5'-(2-methoxy-ethoxymethoxy)-4-[2-(2-methoxy-ethoxymethoxy)-ethoxy]-[1,1';3',1'']terphenyl-4''-yloxy}-propane-1-ol are dissolved in 25 ml methanol and after addition of 3 ml conc. hydrochloric acid heated overnight at 50° C. The solvent is removed in vacuo, the crude product is dissolved in MTB ether, washed with water and sat. aq. sodium chloride solution, and dried over sodium sulfate. The solvent is removed in vacuo and the crude product is crystallized from dichloromethane. 3''-Fluoro-4-(2-hydroxy-ethoxy)-4''-(3-hydroxy-propoxy)-[1,1';3',1'']terphenyl-5'-ol is obtained as colourless crystals.

$^1$H-NMR (500 MHz, DMSO-$d_6$):
δ=1.90 (quint., J=6.3 Hz, 2H, —OCH$_2$CH$_2$CH$_2$O—), 3.58 (dt, J=5.6 Hz, J=6.2 Hz, 2H, —CH$_2$OH), 3.73 (q, J=5.1 Hz, 2H, —CH$_2$OH), 4.03 (t, J=5.0 Hz, 2H, —CH$_2$OAr), 4.16 (t, J=6.4 Hz, 2H, —CH$_2$OAr), 4.56 (t, J=5.1 Hz, 1H, —OH), 4.86 (t, J=5.6 Hz, 1H, —OH), 6.93 (m$_c$, 2H, Ar—H), 7.01

7.4 3''-Fluoro-4-(2-hydroxy-ethoxy)-4''-(3-hydroxy-propoxy)-[1,1';3',1'']terphenyl-5'-ol

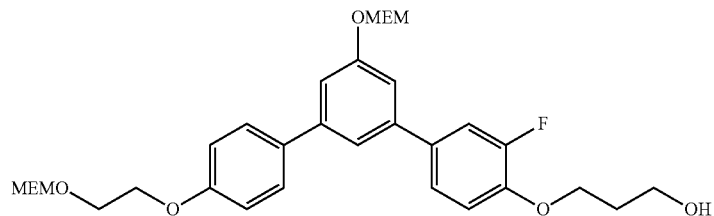

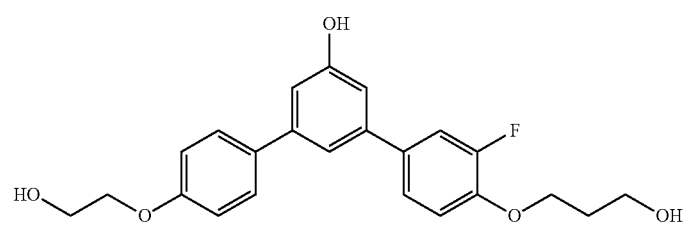

(AB-d, J=8.8 Hz, 2H, Ar—H), 7.22 (t, J=8.9 Hz, 1H, Ar—H), 7.25 (m$_c$, 1H, Ar—H), 7.44 (m$_c$, darin: J=8.5 Hz, 1H, Ar—H) 7.56 (dd, J=2.2 Hz, J=12.9 Hz, 1H, Ar—H), 7.62 (AB-d, J=8.8 Hz, 2H, Ar—H), 9.60 (s, 1H, Ar—OH).

7.5 2-Methyl-acrylic acid-3-{3"-fluoro-5'-(2-methyl-acryloyloxy)-4-[2-(2-methyl-acryloyloxy)-ethoxy]-[1,1';3',1"]terphenyl-4"-yloxy}-propyl ester

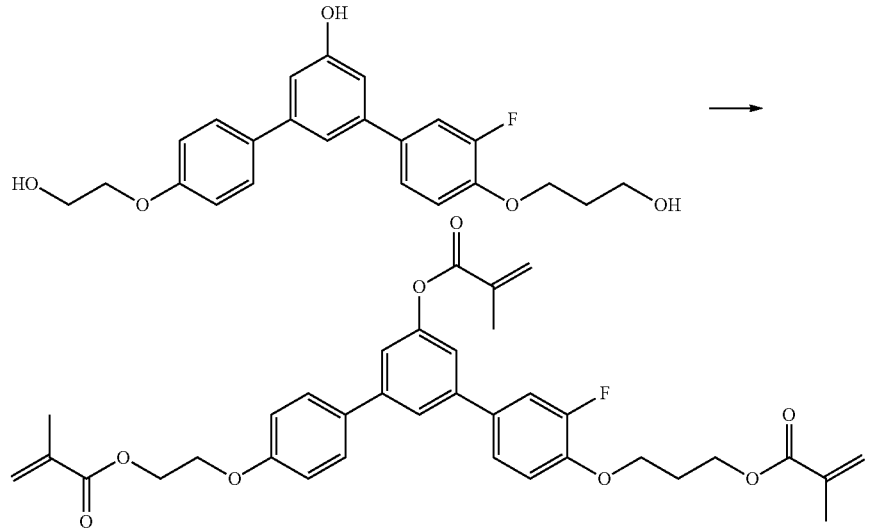

In analogy to step 2 of Example 1, 3"-fluoro-4-(2-hydroxy-ethoxy)-4"-(3-hydroxy-propoxy)-[1,1';3',1"]terphenyl-5'-ol and methacrylic acid are reacted to give 2-methyl-acrylic acid-3-{3"-fluoro-5'-(2-methyl-acryloyloxy)-4-[2-(2-methyl-acryloyloxy)-ethoxy]-[1,1';3',1"]terphenyl-4"-yloxy}-propyl ester as colourless crystals with a m.p. 70° C.

Example 8

2-Methyl-acrylic acid-4,4"-bis-[3-(2-methyl-acryloyloxy)-propyl]-[1,1';3',1"]terphenyl-5'-yl ester 8.1 4,4"-Bis-(3-hydroxy-propyl)-[1,1';3',1"]terphenyl-5'-ol

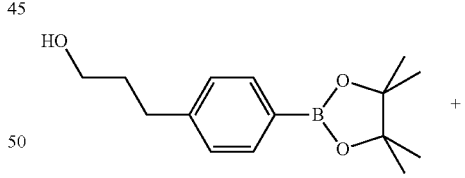

+

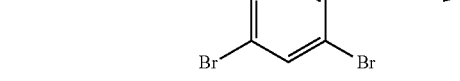

→

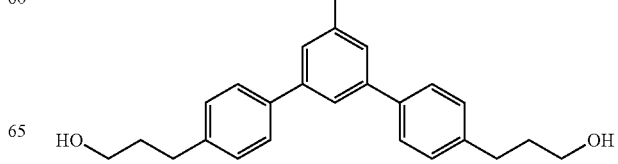

2.63 g (10.0 mmol) 3-[4-(4,4,5,5-Tetramethyl-[1,3,2]dioxaborolane-2-yl)phenyl]-propane-1-ol, 1.26 g (5.00 mmol) 3,5-dibromophenol and 3.49 g (60.0 mmol) potassium fluoride are dissolved in 30 ml THF in an argon atmosphere, and, after addition of 92 mg (0.100 mmol) tris(dibenzylideneacetone)di-palladium(0) and 58 mg (0.20 mmol) tri-tert.-butylphosphonium tetrafluoroborate, stirred overnight at RT. The mixture is diluted with MTB ether, washed with water and dried over sodium sulphate. The solvent is removed in vacuo, the crude product is filtered through silica gel with MTB ether and the resulting oil is crystallized from dichloromethane. 4,4''-Bis-(3-hydroxy-propyl)-[1,1';3',1'']terphenyl-5'-ol is obtained as colourless crystals.

$^{1}$H-NMR (500 MHz, DMSO-d$_{6}$):

δ=1.75 (m$_c$, 4H, CH$_2$CH$_2$CH$_2$), 2.65 (t, J=7.5 Hz, 4H, Ar—CH$_2$—), 3.44 (t, J=5.7 Hz, 4H, —CH$_2$OH), 4.45 (s, br. 2H, —OH), 6.98 (d, J=1.3 Hz, 2H, Ar—H), 7.28 (d, J=8.1 Hz, 4H, Ar—H), 7.27 (s, 1H, Ar—H) 7.28 (d, J=8.1 Hz, 4H, Ar—H), 7.58 (d, J=8.1 Hz, 4H, Ar—H), 9.60 (s, br. 1H, Ar—OH).

8.2 2-Methyl-acrylic acid-4,4''-bis-[3-(2-methyl-acryloyloxy)-propyl]-[1,1';3',1'']terphenyl-5'-yl ester

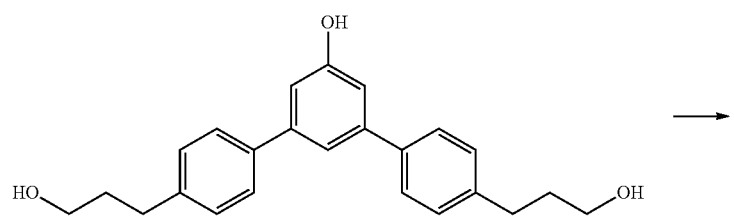

In analogy to step 2 of example 1, 4,4''-bis-(3-hydroxy-propyl)-[1,1';3',1'']terphenyl-5'-ol and methacrylic acid are reacted to give 2-methyl-acrylic acid-4,4''-bis-[3-(2-methyl-acryloyloxy)-propyl]-[1,1';3',1'']terphenyl-5'-yl ester as colourless oil.

DSC: T$_g$ −26 l

Example 9

5'-(4-(2-Methylacryloyl)oxyyphenyl)-[1,1':3',1''-terphenyl]-4,4''-diylbis(methacrylate)

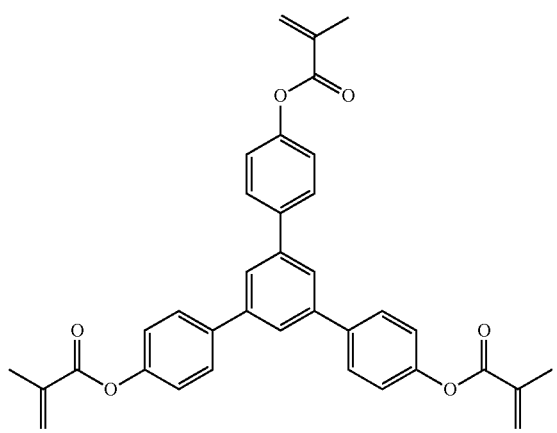 [SMILES: C=C(C)C(=O)Oc1ccc(-c2cc(-c3ccc(OC(=O)C(=C)C)cc3)cc(-c3ccc(OC(=O)C(=C)C)cc3)c2)cc1]

In analogy to example 1, step 2,5'-(4-hydroxyphenyl)-[1,1':3',1''-terphenyl]-4,4''-diol (CAS 15797-52-1) and methacrylic acid are reacted to give 5'-(4-(2-methylacryloyl)oxyphenyl)-[1,1':3',1''-terphenyl]-4,4''-diylbis(methacrylat) as colourless, viscous oil.

DSC: T$_g$ 38 l.

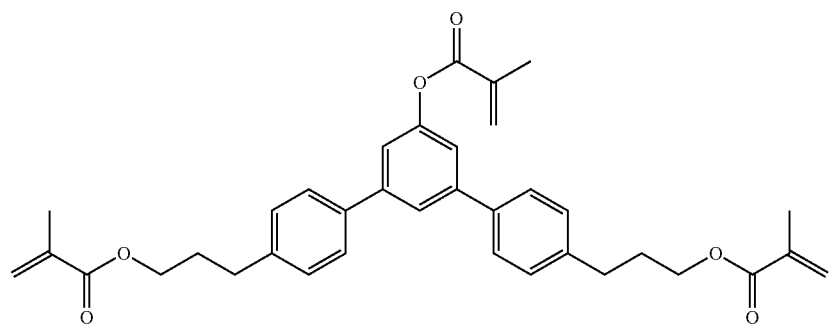

Example 10

2-Methyl-acrylic acid 3-[4,4''-bis-(2-methyl-acryloyloxy)-[1,1';3',1'']terphenyl-5'-yl]-propyl ester

10.1 (E)-3-(4,4''-Bis-benzyloxy-[1,1';3',1'']terphenyl-5'-yl)-acrylic acid methyl ester

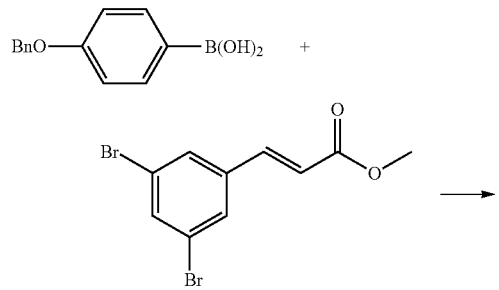

4.00 g (14.4 mmol) sodium metaborate-octahydrate and 250 mg (0.349 mmol) bis(triphenylphosphine)palladium(II) chloride are stirred for 15 min in 50 ml THF and 50 ml water, and 5.00 g (21.3 mmol) 4-benzyloxybenzene boronic acid, 3.00 g (9.37 mmol) 3,5-dibromo cinnamic acid methyl ester are added and the mixture is stirred overnight at reflux. The mixture is acidified with 2 M hydrochloric acid, the precipitated product is filtered off, suspended in hot ethanol, filtered off and used in the next step without further purification.

10.2 3-(4,4''-Dihydroxy-[1,1';3',1'']terphenyl-5'-yl)-propionic acid methyl ester

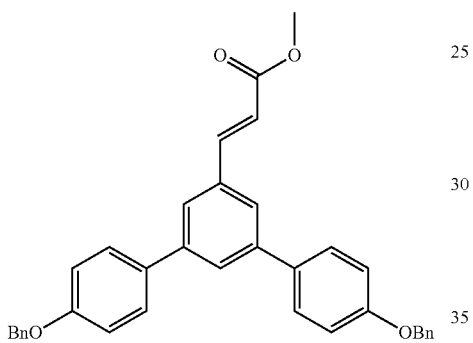

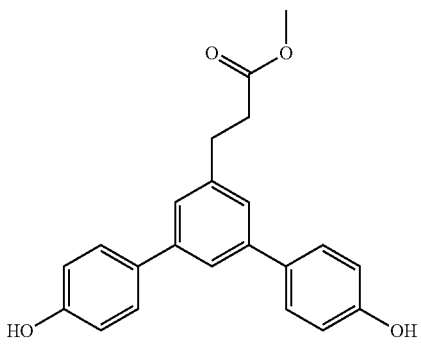

The crude product from step 1 is dissolved in THF and hydrogenated in THF on Pd/activated charcoal until the reaction is completed. The catalyst is filtered off, the solvent is removed in vacuo, and the crude product is used for the next step without further purification.

10.3 5'-(3-Hydroxy-propyl)-[1,1';3',1'']terphenyl-4,4''-diol

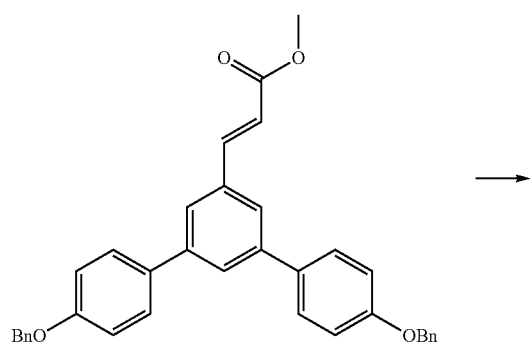

2.90 g (8.32 mmol) 3-(4,4''-dihydroxy-[1,1';3',1'']terphenyl-5'-yl)-propionic acid methyl ester are dissolved in THF, and 55 ml (55 mmol) of a 1 M solution of DIBAL-H in toluene are added dropwise under cooling. The cooling is removed and the mixture is stirred overnight at RT. After addition of 3 ml isopropanol the mixture is poured onto ice/water, acidified with 2 M hydrochloric acid and extracted three times with MTB ether. The combined organic layers are washed with sat. aq. sodium chloride solution and dried over sodium sulfate. The solvent is removed in vacuo and the residue is filtered through silica gel with toluene/ethylacetate (2:1). 5'-(3-hydroxy-propyl)-[1,1';3',1'']terphenyl-4,4''-diol is obtained as colourless solid.

¹H-NMR (400 MHz, CDCl₃)

δ=1.98 ppm (m_c, 2H, —CH₂CH₂CH₂—), 2.82 (t, J=7.6 Hz, 2H, Ar—CH₂—), 3.75 (dt, J=5.1 Hz, J=6.1 Hz, 2H, —CH₂OH), 4.93 (s, 2H, Ar—OH), 6.91 (AB-d, J=8.7 Hz, 4H, Ar—H), 7.32 (d, J=1.6 Hz, 2H, Ar—H), 7.52 (AB-d, J=8.7 Hz, 4H, Ar—H, darin: 7.53, 1H, Ar—H).

10.4 2-Methyl-acrylic acid-3-[4,4"-bis-(2-methyl-acryloyloxy)-[1,1';3',1"]terphenyl-5'-yl]-propyl ester

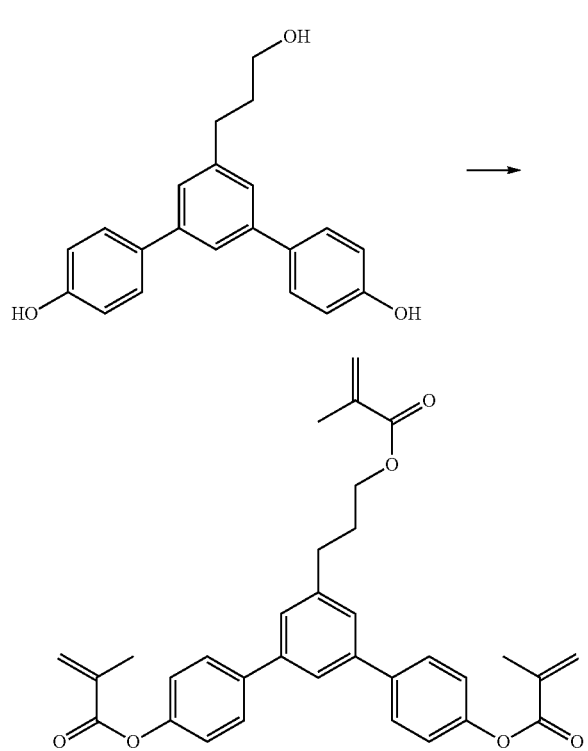

In analogy to step 2 of example 1, 5'-(3-hydroxy-propyl)-[1,1';3',1"]terphenyl-4,4"-diol and methacrylic acid are reacted to give 2-methyl-acrylic acid-3-[4,4"-bis-(2-methyl-acryloyloxy)-[1,1';3',1"]terphenyl-5'-yl]-propyl ester as colourless, viscous oil.

DSC: $T_g$ −11 1

Example 11

2-Methyl-acrylic acid-4,4"-bis-[3-(4-(2-methyl-acryloyloxyphenyl))-propyl]-[1,1';3',1"]terphenyl-5'-yl ester 11.1 4,4"-Bis-[3-(2-methoxy-ethoxymethoxy)-propyl]-5'-hydroxy-[1,1';3',1"]terphenyl

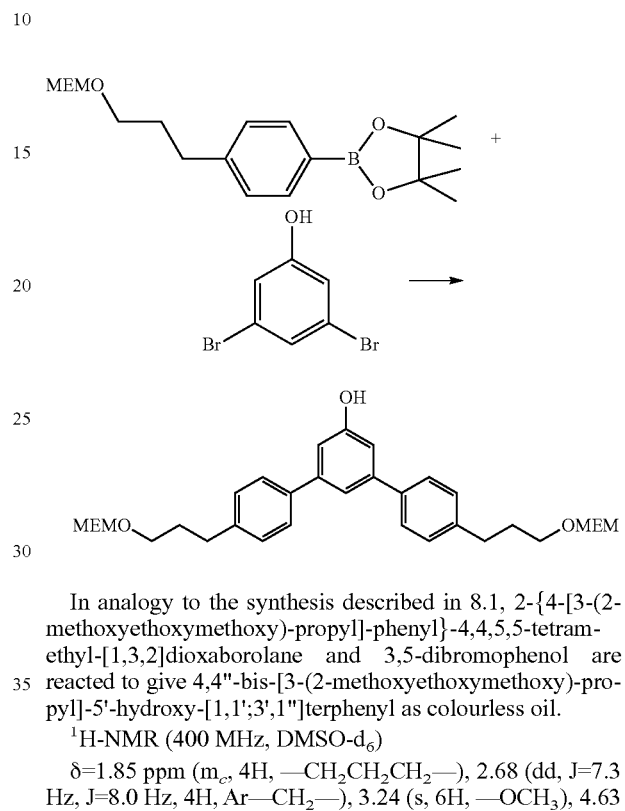

In analogy to the synthesis described in 8.1, 2-{4-[3-(2-methoxyethoxymethoxy)-propyl]-phenyl}-4,4,5,5-tetramethyl-[1,3,2]dioxaborolane and 3,5-dibromophenol are reacted to give 4,4"-bis-[3-(2-methoxyethoxymethoxy)-propyl]-5'-hydroxy-[1,1';3',1"]terphenyl as colourless oil.

¹H-NMR (400 MHz, DMSO-d₆)

δ=1.85 ppm (m_c, 4H, —CH₂CH₂CH₂—), 2.68 (dd, J=7.3 Hz, J=8.0 Hz, 4H, Ar—CH₂—), 3.24 (s, 6H, —OCH₃), 4.63 (s, 4H, —OCH₂O—), 6.98 (d, J=1.6 Hz, 2H, Ar—H), 7.28 (t, J=1.6 Hz, 1H, Ar—H), 7.30 (AB-d, J=8.2 Hz, 4H, Ar—H), 7.59 (AB-d, J=8.2 Hz, 4H, Ar—H).

11.2 Trifluoromethanesulfonic acid-4,4"-bis-[3-(2-methoxyethoxymethoxy)-propyl]-[1,1';3',1"]terphenyl-5'-yl ester

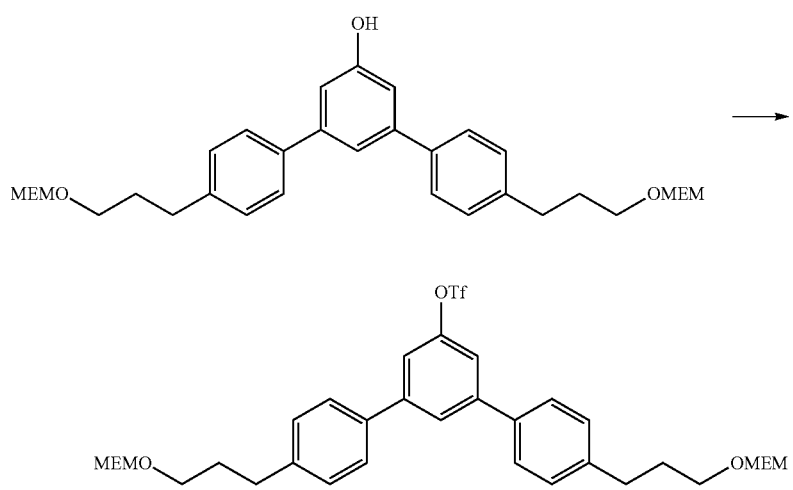

3.40 g (6.31 mmol) 4,4"-bis-[3-(2-methoxy-ethoxymethoxy)-propyl]-5'-hydroxy-[1,1';3',1"]terphenyl are dissolved in 30 ml dichloromethane, and 16 mg DMAP, 1.1 ml (8.0 mmol) triethylamine and 1.4 ml (8.0 mmol) trifluoromethane sulfonic acid anhydride are added under ice-cooling. The cooling is removed and the mixture is stirred for 4 h at RT. The mixture is poured onto ice/water, the aqueous layer is separated and washed three times with dichloromethane. The combined organic layers are washed with water, dried over sodium sulfate, and the solvent is removed in vacuo. The crude product is filtered through silica gel with heptane/ethylacetate (7:3 to 1:1) to give trifluoromethane sulfonic acid-4,4"-bis-[3-(2-methoxyethoxymethoxy)-propyl]-[1,1';3',1"]terphenyl-5'-yl ester as colourless oil.

11.3 4,4"-Bis-[3-(2-methoxy-ethoxymethoxy)-propyl]-5'-(4-benzyloxyphenyl)-[1,1';3',1"]terphenyl

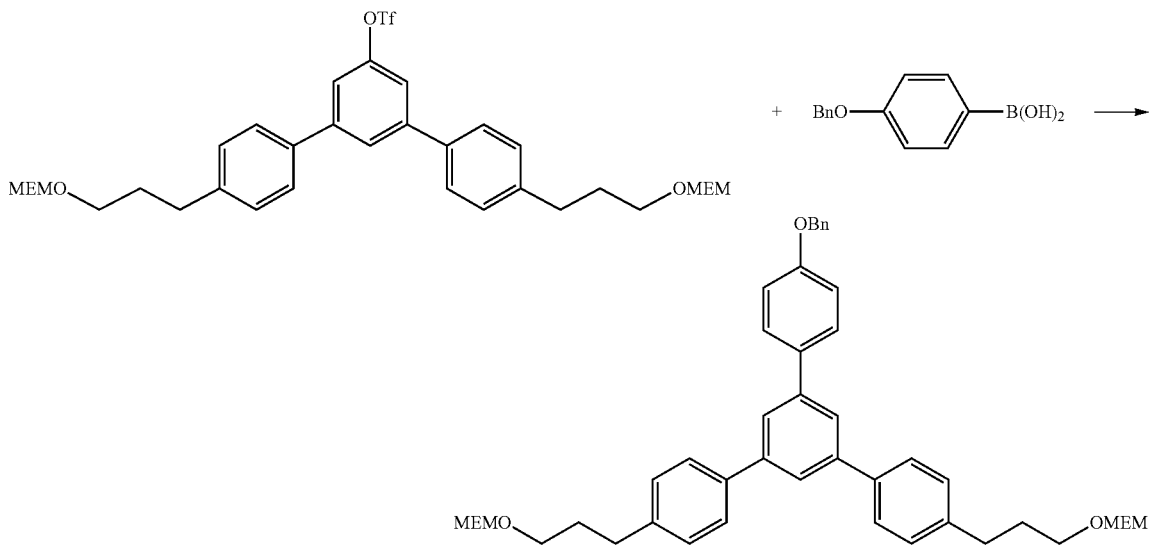

3.30 g (4.29 mmol) trifluoromethane sulfonic acid-4,4"-bis-[3-(2-methoxyethoxymethoxy)-propyl]-[1,1';3',1"]terphenyl-5'-ylester, 1.16 g (5.10 mmol) 4-benzyloxybenzolboronic acid, 2.1 g (7 mmol) sodium metaborate-octahydrate, 70 mg (0.098 mmol) bis(triphenylphosphine)palladium(II) chloride and 5 µl hydraziniumhydroxide are dissolved in 15 ml THF and 6 ml water and heated 6 h at reflux. The mixture is diluted with MTB ether, the organic layer is separated and the aqueous layer is extracted three times with MTB ether. The combined organic layers are washed with sat. aq. sodium chloride solution and dried over sodium sulfate. The solvent is removed in vacuo and the residue is filtered through silica gel with dichloromethane/MTB ether (0-10%) to give 4,4"-bis-[3-(2-methoxy-ethoxymethoxy)-propyl]-5'-(4-benzyloxyphenyl)-[1,1';3',1"]terphenyl as colourless oil.

11.4 3-[4"-(3-Hydroxy-propyl)-5'-(4-hydroxyphenyl)-[1,1';3',1"]terphenyl-4-yl]-propane-1-ol

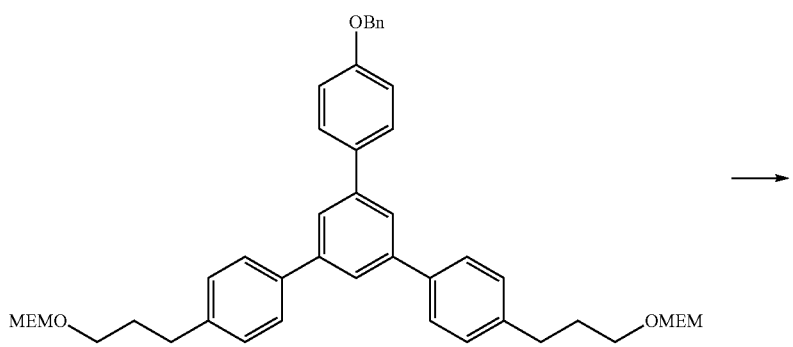

-continued

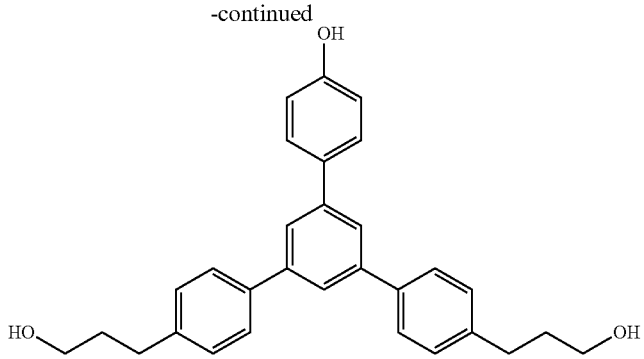

2.50 g (3.55 mmol) 4,4"-bis-[3-(2-methoxy-ethoxymethoxy)-propyl]-5'-(4-benzyloxyphenyl)-[1,1';3',1"]terphenyl are hydrogenated in 70 ml THF on Pd/activated charcoal until the reaction is completed. The catalyst is filtered off, the solvent is removed in vacuo, the residue is dissolved in 20 ml THF, 5 ml 25% hydrochloric acid are added dropwise under cooling and the mixture is stirred overnight at RT. After addition of 100 ml MTB ether the solution is washed with water and sat. aq. sodium chloride solution and dried over sodium sulfate. The solvent is removed in vacuo and the residue is filtered through silica gel with dichloromethane/MTB ether (9:1), to give 3-[4"-(3-hydroxy-propyl)-5'-(4-hydroxyphenyl)-[1,1';3',1"]terphenyl-4-yl]-propane-1-ol as colourless oil.

11.5 2-Methyl-acrylic acid-4,4"-bis-[3-(4-(2-methyl-acryloyloxyphenyl))propyl]-[1,1';3',1"]terphenyl-5'-yl ester

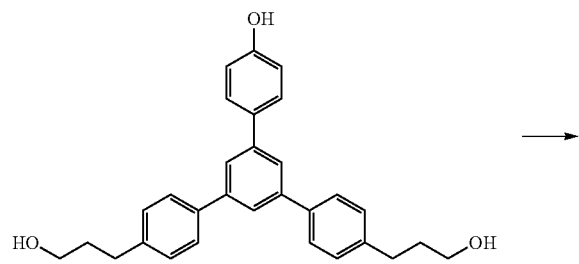

→

-continued

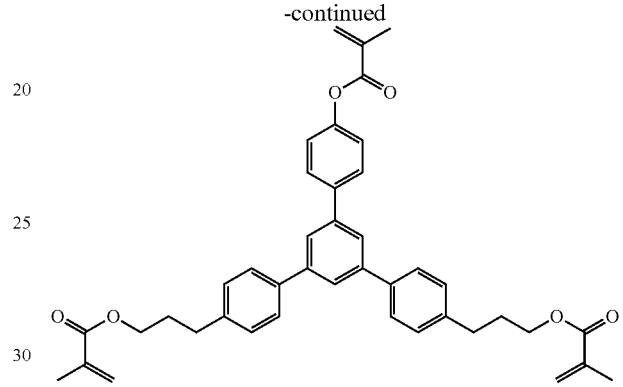

In analogy to step 2 of example 1, 3-[4"-(3-Hydroxy-propyl)-5'-(4-hydroxyphenyl)-[1,1';3',1"]terphenyl-4-yl]-propane-1-ol and methacrylic acid are reacted to give 2-methyl-acrylic acid-4,4"-bis-[3-(4-(2-methyl-acryloyloxyphenyl))-propyl]-[1,1';3',1"]terphenyl-5'-yl ester as colourless, viscous oil.

DSC: $T_g$ −10 l

Example 12

2-Methyl-acrylic acid-2-{3,3"-diethyl-5'-(4-(2-methylacryloyloxy)phenyl)-4"-[2-(2-methyl-acryloyloxy)-ethoxy]-[1,1';3',1"]terphenyl-4-yloxy}-ethyl ester

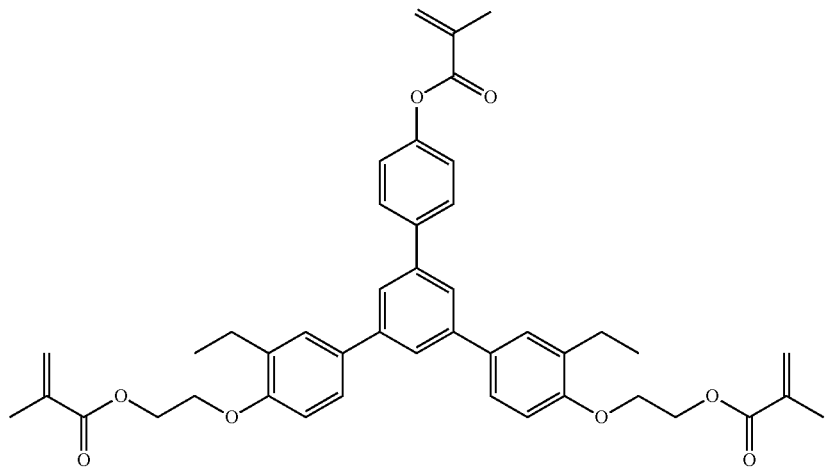 [SMILES: C=C(C)C(=O)OCCOc1ccc(-c2cc(-c3ccc(OC(=O)C(=C)C)cc3)cc(-c3ccc(OCCOC(=O)C(=C)C)c(CC)c3)c2)cc1CC]

In analogy to the syntheses described above 2-methyl-acrylic acid-2-{3,3"-diethyl-5'-(4-(2-methylacryloyloxy)phenyl)-4"-[2-(2-methyl-acryloyloxy)ethoxy]-[1,1';3',1"]terphenyl-4-yloxy}-ethyl ester is obtained as colourless solid with a m.p. 158° C. (decomp.).

Example 13

13.1 4,4"-Bis-benzyloxy-[1,1';3',1"]terphenyl-5'-ol

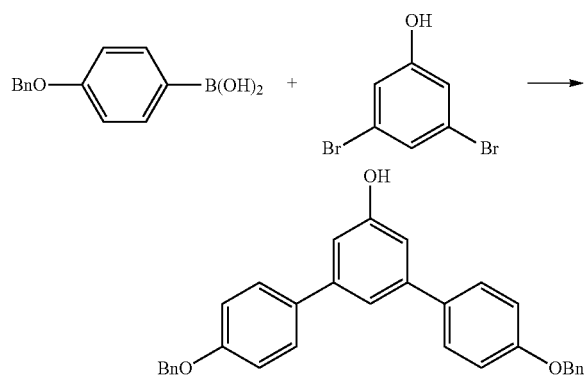

8.85 (64 mmol) sodium metaborate-tetrahydrate are dissolved in 100 ml water, 570 mg (0.794 mmol) bis(triphenylphosphine)palladium(II)chloride, 0.2 ml hydrazinium-hydroxide and 10.0 g (39.7 mmol) 3,5-dibromophenol in 100 ml THF are added, and after 5 min a solution of 24.0 g (105 mmol) 4-benzyloxybenzeneboronic acid in 200 ml THF are added. The mixture is heated overnight at reflux, MTB ether is added, the aqueous layer is separated and extracted three times with MTB ether. The combined organic layers are washed with sat. aq. sodium chloride solution and dried over sodium sulfate. The solvent is removed in vacuo and the residue is filtered through silica gel with heptane/toluene (8:2) and recrystallized from ethanol, to give 4,4"-bis-benzyloxy-[1,1';3',1"]terphenyl-5'-ol as colourless crystals.

$^1$H-NMR (500 MHz, CDCl$_3$)

δ=4.98 ppm (s, 4H, PhCH$_2$—), 6.87 (d, J=1.4 Hz, 2H, Ar—H), 6.91 (AB-d, J=8.7 Hz, 4H, Ar—H), 7.08 (t, J=1.3 Hz, 1H, Ar—H), 7.20 (t, J=7.3 Hz, 2H, Ar—H), 7.27 (t, J=7.3 Hz, 4H, Ar—H), 7.33 (d, J=7.3 Hz, 4H, Ar—H), 7.42 (AB-d, J=8.7 Hz, 4H, Ar—H), 8.77 (s, 1H, OH).

13.2 Trifluormethanesulfonic acid-4,4"-bis-benzyloxy-[1,1';3',1"]terphenyl-5'-yl ester

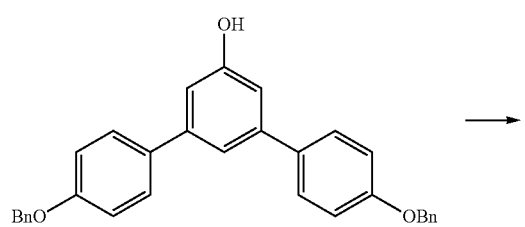

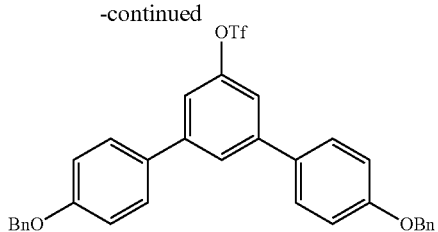

3.80 g (8.29 mmol) 4,4"-bis-benzyloxy-[1,1';3',1"]terphenyl-5'-ol are dissolved in 50 ml dichloromethane and 16 mg DMAP, 1.5 ml (11 mmol) triethylamine and 1.8 ml (11 mmol) trifluoromethane sulfonic acid anhydride are added under ice-cooling. The cooling is removed and the mixture is stirred for 4 h at RT. The mixture is poured onto ice/water, the aqueous layer is separated and extracted three times with dichloromethane. The combined organic layers are washed with water, dried over sodium sulfate, and the solvent is removed in vacuo. The crude product is filtered through silica gel with heptane/ethylacetate (7:3 to 1:1) to give trifluoromethane sulfonic acid-4,4"-bis-benzyloxy-[1,1';3',1"]terphenyl-5'-yl ester as colourless solid.

13.3 4,4"-Bis-benzyloxy-5'-(4-[3-(2-Methoxy-ethoxymethoxy)-propyl]-phenyl)-[1,1';3',1"]terphenyl

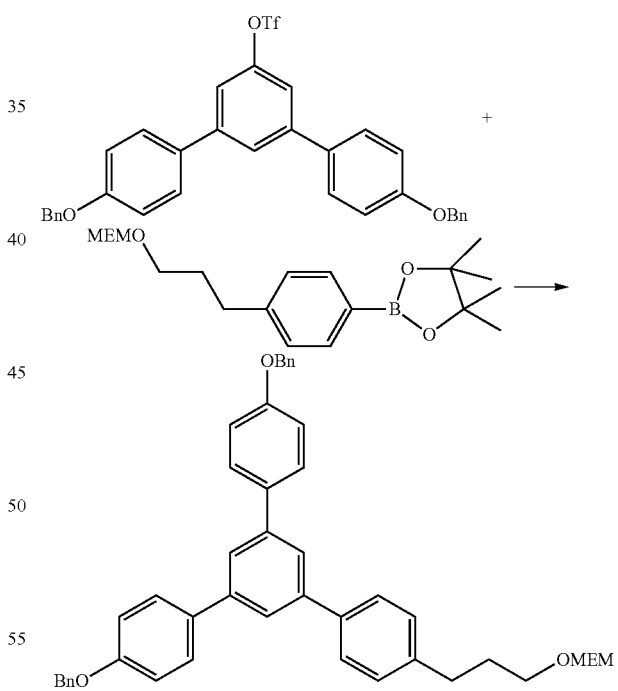

4.00 g (6.78 mmol) trifluoromethanesulfonic acid-4,4"-bis-benzyloxy-[1,1';3',1"]terphenyl-5'-yl ester, 2.37 g (6.78 mmol) 2-{4-[3-(2-methoxyethoxymethoxy)-propyl]-phenyl}-4,4,5,5-tetramethyl-[1,3,2]dioxaborolane and 2.85 g (20 mmol) sodium metaborate-tetrahydrate are dissolved in 8 ml water and 20 ml THF. 97 mg (0.135 mmol) bis(triphenylphosphine)palladium(II)chlorid and 0.01 ml hydrazini-umhydroxide are added and the mixture is heated at reflux for 5 h. MTB ether is added, the aqueous layer is separated and extracted three times with MTB ether. The combined organic layers are washed with sat. aq. sodium chloride solution and dried over sodium sulfate. The solvent is removed in vacuo and the residue is filtered through silica gel with dichloromethane/MTB ether (95:5), to give 4,4"-bis-benzyloxy-5'-(4-[3-(2-methoxy-ethoxymethoxy)-propyl]-phenyl)-[1,1';3',1"]terphenyl as a brown oil which is reacted in the next step without further purification.

13.4 5'-(4-[3-hydroxypropyl]-phenyl)-[1,1';3',1"]terphenyl-4,4"-diol

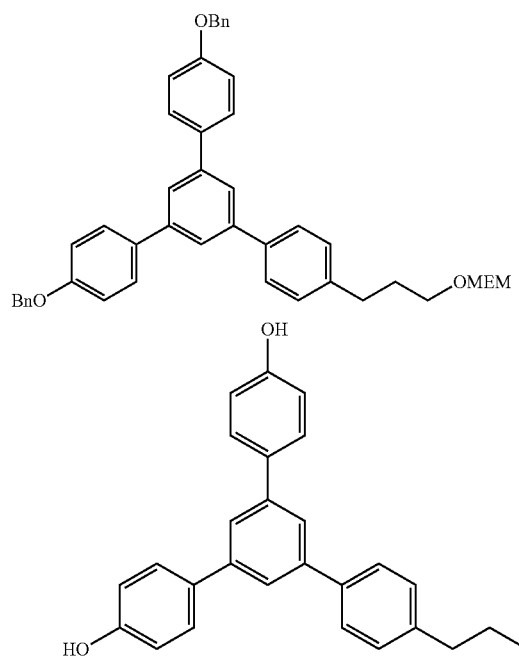

The crude product from step 3 is hydrogenated in analogy to Example 11, step 4, and hydrolysed, to give 5'-(4-[3-hydroxypropyl]-phenyl)-[1,1';3',1"]terphenyl-4,4"-diol as colourless solid.

13.5 2-Methyl-acrylic acid-3-(4-[4,4"-bis-(2-methyl-acryloyloxy)-[1,1';3',1"]terphenyl-5'-yl]-phenyl)propyl ester

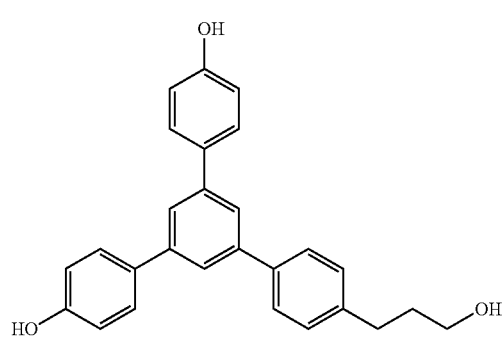

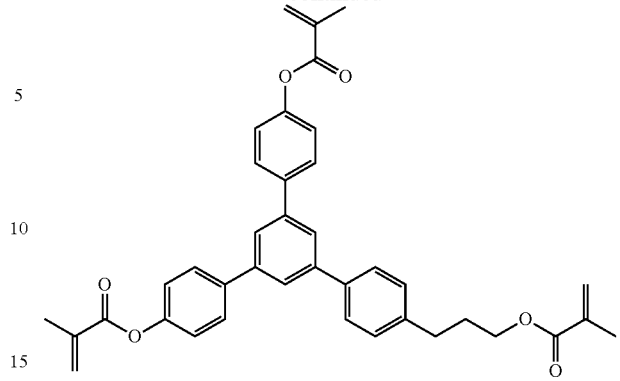

In analogy to step 2 of Example 1, 5'-(4-[3-hydroxypropyl]-phenyl)-[1,1';3',1"]terphenyl-4,4"-diol is reacted to give 2-methyl-acrylic acid-3-(4-[4,4"-bis-(2-methyl-acryloyloxy)-[1,1';3',1"]terphenyl-5'-yl]-phenyl)propyl ester as colourless crystals m.p.—(decomp. upon heating)

Example 14

2-Methyl-acrylic acid-4,4"-bis-[3-(2-methyl-acryloyloxy)-propionyloxy]-[1,1';3',1"]terphenyl-5'-ylester

14.1 3-Benzyloxy-propionic acid-4"-(3-benzyloxy-propionyloxy)-5'-(2-methoxy-ethoxymethoxy)-[1,1';3',1"]terphenyl-4-yl ester

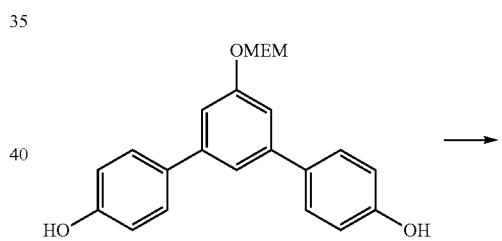

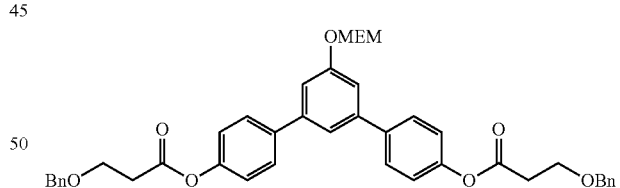

4.00 g (10.9 mmol) 5'-(2-methoxy-ethoxymethoxy)-[1,1';3',1"]terphenyl-4,4"-diol (prepared from 1,3-dibromo-5-(2-methoxy-ethoxymethoxy)benzene and 4-hydroxybenzeneboronic acid in analogy to example 2.1) are dissolved in 100 ml dichloromethane, 5.11 g (28.4 mmol) 3-benzyloxypropionic acid and 267 mg DMAP are added, and 5.86 g (30.6 mmol) EDC hydrochloride is added portionwise. The mixture is stirred overnight at RT, water is added and the organic layer is separated. The aqueous phase is extracted three times with dichloromethane, the combined organic phases are dried over sodium sulfate and the solvent is removed in vacuo. The crude product is filtered through silica gel with heptane/ethylacetate (1:1) to give 3-benzyloxy-propionic acid-4"-(3-benzyloxy-propionyloxy)-5'-(2-methoxy-ethoxymethoxy)-[1,1';3',1"]terphenyl-4-yl ester as colourless oil.

$^1$H-NMR (500 MHz, DMSO-$d_6$)

δ=2.91 (t, J=6.1 Hz, 4H, —CH$_2$C(O)O—), 3.23 (s, 3H, MeO—), 3.50 (m$_c$, 2 H, MeO-CH$_2$CH$_2$—O—), 3.77-3.82 (m, darin: t, J=6.1 Hz, 6H, MeO—CH$_2$CH$_2$—O— und BnOCH$_2$—), 4.55 (s, 4H, PhCH$_2$O—), 5.40 (s, 2H, —OCH$_2$O), 7.20 (AB-d, J=8.6 Hz, 4H, Ar—H), 7.28-7.39 (m, 12H, Ar—H), 7.56 (m, 1H, Ar—H), 7.81 (AB-d, J=8.6 Hz, 4H, Ar—H).

14.2 3-Hydroxy-propionic acid-5'-hydroxy-4"-(3-hydroxy-propionyloxy)-[1,1';3',1"]terphenyl-4-yl ester

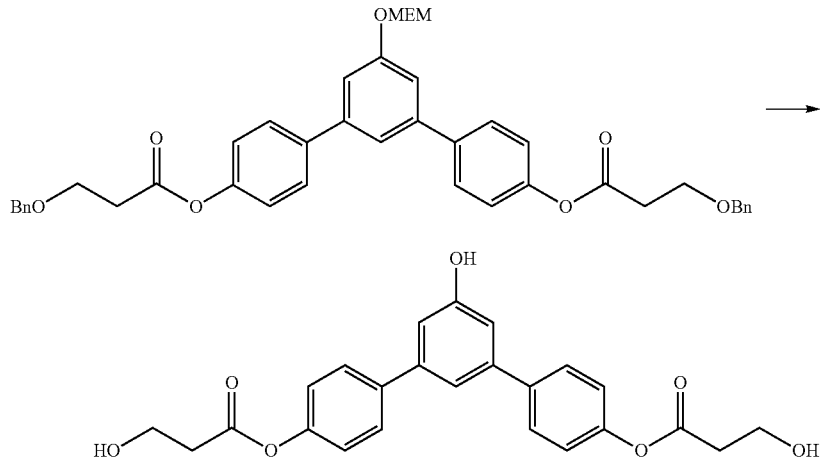

5.40 g (7.82 mmol) 3-benzyloxy-propionic acid-4"-(3-benzyloxy-propionyloxy)-5'-(2-methoxy-ethoxymethoxy)-[1,1';3',1"]terphenyl-4-yl ester are dissolved in 40 ml isopropanol and 10 ml THF and after addition of 1.97 g (7.82 mmol) pyridiniumtosylate are stirred for 60 h at 70° C. After cooling to RT the mixture is diluted with MTB ether, washed with sat. aq. sodium chloride solution and dried over sodium sulfate. The solvent is removed in vacuo and the residue is hydrogenated in 40 ml THF on Pd/activated charcoal until the reaction is completed. The solvent is removed in vacuo and the crude product is recrystallized from dichloromethane, to give 3-hydroxy-propionic acid-5'-hydroxy-4"-(3-hydroxy-propionyloxy)-[1,1';3',1"]terphenyl-4-yl ester as colourless crystals.

$^1$H-NMR (500 MHz, DMSO-$d_6$) δ=2.74 (t, J=6.1 Hz, 4H, —CH$_2$C(O)O—), 3.80 (dt, J=5.3 Hz, J=6.1 Hz, 4H, —CH$_2$CH$_2$OH), 4.94 (t, J=5.3 Hz, 2H, —OH), 7.05 (d, J=1.5 Hz, 2H, Ar—H), 7.23 (AB-d, J=8.7 Hz, 4H, Ar—H), 7.35 (m, 1H, Ar—H), 7.76 (AB-d, J=8.6 Hz, 4H, Ar—H), 9.84 (s, br. 1H, Ar—OH).

14.3 2-Methyl-acrylic acid-4,4"-bis-[3-(2-methyl-acryloyloxy)propionyloxy]-[1,1';3',1"]terphenyl-5'-yl ester

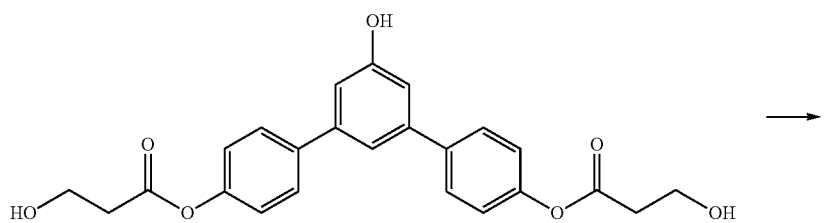

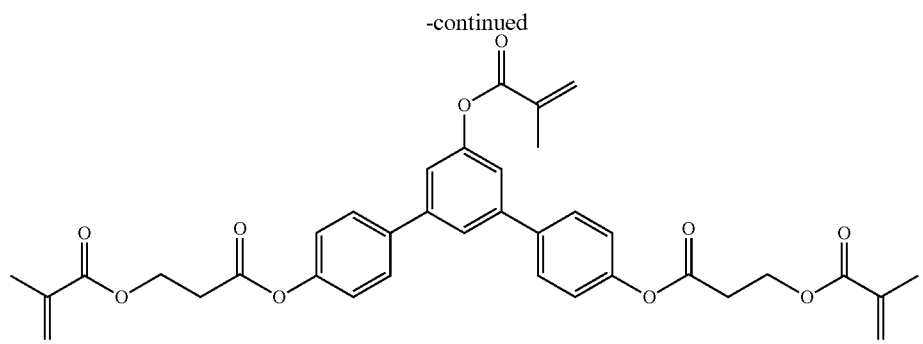

In analogy to step 2 of Example 1, 3-hydroxy-propionic acid-5'-hydroxy-4"-(3-hydroxy-propionyloxy)-[1,1';3',1"]terphenyl-4-yl ester and methacrylic acid are reacted to give 2-methyl-acrylic acid-4,4"-bis-[3-(2-methylacryloyloxy)-propionyloxy]-[1,1';3',1"]terphenyl-5'-yl ester as colourless crystals, m.p. 88° C.

Mixture Example A

The nematic LC mixture N1 is formulated as follows.

| | | | |
|---|---|---|---|
| CY-3-O2 | 18.00% | cl.p. | +74.5 |
| CPY-2-O2 | 10.00% | Δn | 0.1021 |
| CPY-3-O2 | 10.00% | Δε | −3.1 |
| CCY-3-O2 | 9.00% | $\epsilon_\parallel$ | 3.5 |
| CCY-4-O2 | 4.00% | $K_3/K_1$ | 1.16 |
| CC-3-V | 40.00% | $\gamma_1$ | 86 |
| PYP-2-3 | 9.00% | $V_0$ | 2.29 |

For each measured sample, the polymerizable monomeric compound from Example 4, 2 or 13, respectively, is added to the LC mixture N1 at a concentration of 0.3% by weight, to form the polymerizable mixtures M1, M2 and M3, respectively. Each resultant polymerizable mixture is inserted into a VA e/o test cell (rubbed antiparallel, VA-polyimide alignment layer, LC-layer thickness d≈4 μm). For comparative purposes, VA e/o test cells are prepared with the comparison mixture C1 comprising LC mixture N1 and 0.3% of the polymerizable compound A of prior art.

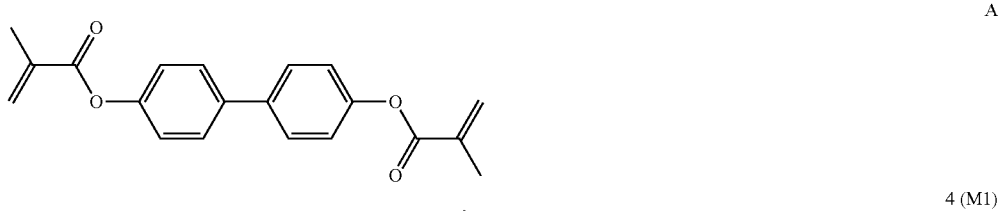

A

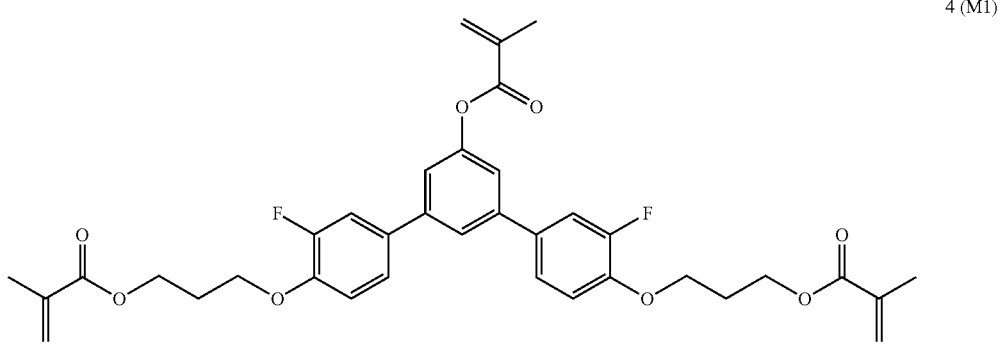

4 (M1)

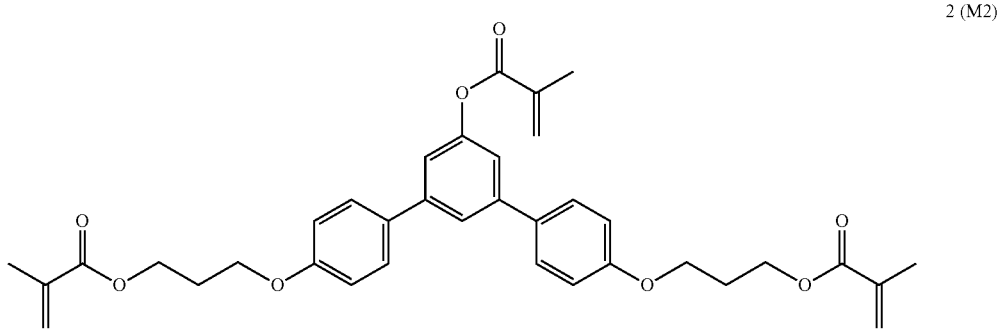

2 (M2)

13 (M3)

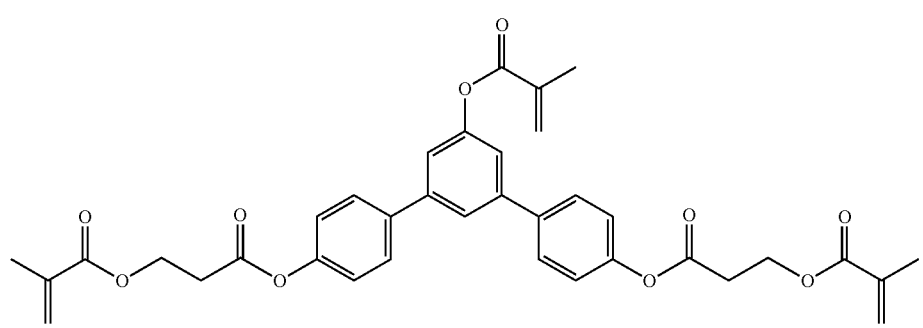

The cells are irradiated with UV light having an intensity of 100 mW/cm² for the time indicated with application of a voltage of 24 V (alternating current), causing polymerization of the monomeric compound.

The tilt angle is determined before and after UV irradiation by a crystal rotation experiment (Autronic-Melchers TBA-105).

In order to determine the polymerization rate, the residual content of unpolymerized RM (in % by weight) in the test cells is measured by HPLC after various exposure times. For this purpose each mixture is polymerized in the test cell under the stated conditions. The mixture is then rinsed out of the test cell using MEK (methyl ethyl ketone) and measured.

In addition, the VHR values of the polymerizable LC mixtures M1-M3 and C1 before and after UV exposure are measured as described above.

The tilt angle results are shown in Table 1. The residual concentrations of the respective monomer in each mixture after different exposure times are shown in Table 2. The VHR values of the mixtures are shown in Table 3.

TABLE 1

| | (t = exposure time) | | | |
|---|---|---|---|---|
| t/s | C1 | M1 | M2 | M3 |
| | Tilt angle/° | | | |
| 0 | 88.8 | 88.7 | 88.0 | 88.9 |
| 30 | — | 84.9 | 84.5 | — |
| 60 | — | 78.7 | 81.0 | — |
| 120 | 77.2 | 73.6 | 75.8 | 77.8 |
| 240 | 72.1 | 69.5 | 70.5 | — |
| 360 | 70.3 | 68.5 | 69.7 | 72.2 |

TABLE 2

| | (t = UV exposure time) | | | |
|---|---|---|---|---|
| t/s | C1 | M1 | M2 | M3 |
| | RM concentration/% | | | |
| 0 | 0.300 | 0.300 | 0.300 | 0.300 |
| 30 | — | 0.255 | 0.250 | — |
| 60 | — | 0.159 | 0.184 | — |
| 120 | 0.111 | 0.086 | 0.109 | 0.185 |
| 180 | — | 0.047 | — | — |
| 360 | 0.067 | 0.025 | 0.040 | 0.072 |

TABLE 3

| | (t = exposure time) | | | |
|---|---|---|---|---|
| t/s | C1 | M1 | M2 | M3 |
| | VHR/% | | | |
| 0 | 97.4 | 97.0 | 97.3 | 97.2 |
| 120 | 92.8 | 95.0 | 94.4 | — |
| 600 | 79.7 | 92.6 | 92.7 | 95.1 |
| 900 | 74.5 | 90.9 | 91.0 | 93.9 |

As can be seen from Table 1, a small tilt angle after polymerization is achieved more quickly in PSA displays containing mixtures M1-M3 according to the invention, compared to PSA displays containing mixture C1 from prior art.

As can be seen from Table 2, significantly more rapid and complete polymerization is achieved in PSA displays containing mixtures M1-M3 according to the invention, compared to PSA displays containing mixture C1 from prior art.

As can be seen from Table 3, the VHR values of mixtures M1-M3 according to the invention after UV exposure are significantly higher than the VHR values of mixture C1.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A liquid crystalline medium comprising at least one compound of formula I

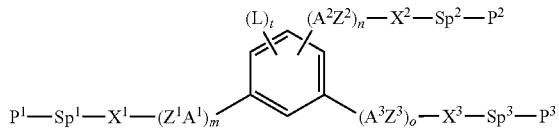

I wherein
$A^1$, $A^3$ independently of each other denote 1,4-phenylene, naphthalene-1,4-diyl or naphthalene-2,6-diyl, wherein in all of these groups one or more CH groups may optionally be replaced by N,
$A^2$ denotes 1,4-phenylene, naphthalene-1,4-diyl or naphthalene-2,6-diyl, wherein in all of these groups one or more CH groups may optionally be replaced by N, cyclohexane-1,4-diyl, wherein one or more non-adjacent CH$_2$-groups may optionally be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methano-indane-2,5-diyl, wherein all of these groups are unsubstituted or mono- or polysubstituted by L, L denotes P—, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl or heteroaryl having 5 to 20 ring atoms, or straight-chain or branched alkyl having 1 to 25 C atoms, in which alkyl moities, in addition, one or more non-adjacent CH$_2$ groups may optionally each be replaced, independently of one another, by —C(R$^{oo}$)=C(R$^{ooo}$)—, —C≡C—, —N(R$^{oo}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN, P— or P-Sp-, R$^{oo}$ and R$^{ooo}$ each, independently of one another, denote H or alkyl having 1 to 12 C atoms, P$^1$, P$^2$ and P$^3$ independently of each other denote a polymerizable group, Sp$^1$, Sp$^2$, Sp$^3$ independently of each other denote a spacer group or a single bond, Y$^1$ is halogen, R$^x$ denotes P—, P-Sp-, H, halogen, straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are optionally replaced by F, Cl, P— or P-Sp-; or R$^x$ denotes optionally substituted aryl, aryloxy, heteroaryl or heteroaryloxy having 5 to 20 ring atoms, X$^1$, X$^2$, X$^3$ independently of each other denote O, S, —C(O)—, —OC(O)—, —C(O)O—, —CF$_2$O—, or a single bond, n is 0, 1 or 2, m and o are independently of each other 1 or 2, and t is 0, 1, 2 or 3.

2. The medium according to claim 1, wherein the compound of formula I is:

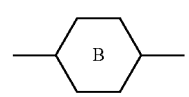

I1

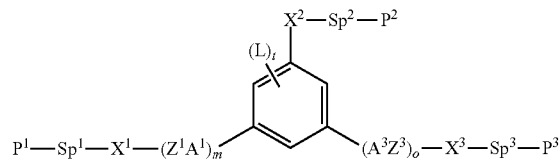

I2 wherein n1 is 1 or 2.

3. The medium according to claim 1, wherein the compound of formula I is:

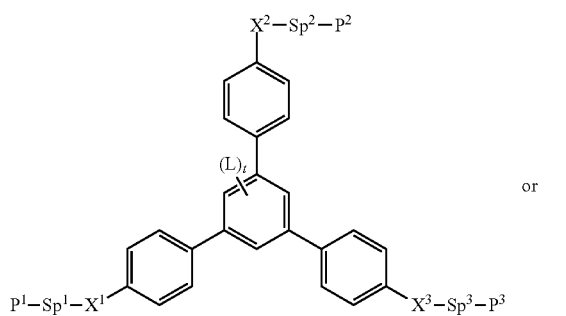

I1a or

I2a

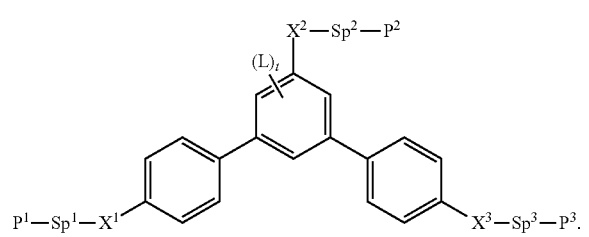

4. The medium according to claim 1, further comprising one or more compounds of the formulae CY and/or PY:

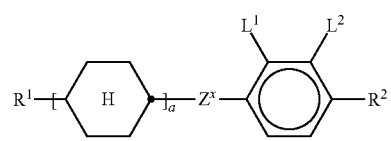

CY

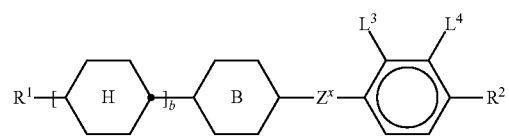

PY in which
a denotes 1 or 2,
b denotes 0 or 1,

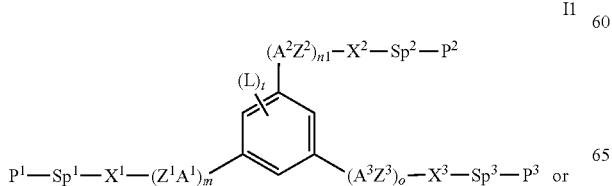

denotes

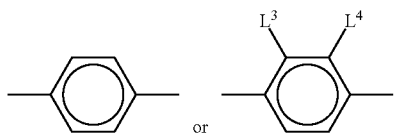

$R^1$ and $R^2$ each, independently of one another, denote alkyl having 1 to 12 C atoms, where, in addition, one or two non-adjacent $CH_2$ groups may be replaced by —O—, —CH=CH—, —CO—, —O—CO— or —CO—O— in such a way that O atoms are not linked directly to one another, $Z^x$ denotes —CH=CH—, —$CH_2$O—, —O$CH_2$—, —$CF_2$O—, —O$CF_2$—, —O—, —$CH_2$—, —$CH_2CH_2$— or a single bond, and $L^{1-4}$ each, independently of one another, denote F, Cl, $OCF_3$, $CF_3$, $CH_3$, $CH_2F$, $CHF_2$.

5. The medium according to claim 1, further comprising one or more compounds of the formula ZK:

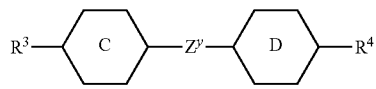    ZK in which

denotes

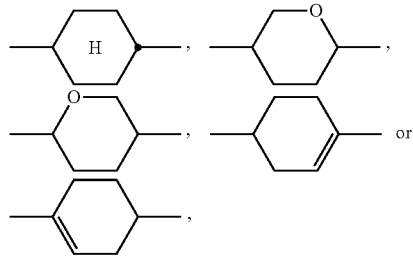

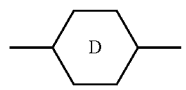

denotes

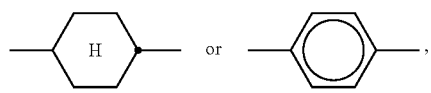

$R^3$ and $R^4$ each, independently of one another, denote alkyl having 1 to 12 C atoms, in which, in addition, one or two non-adjacent $CH_2$ groups may be replaced by —O—, —CH=CH—, —CO—, —O—CO— or —CO—O— in such a way that O atoms are not linked directly to one another, $Z^y$ denotes —$CH_2CH_2$—, —CH=CH—, —$CF_2$O—, —O$CF_2$—, —$CH_2$O—, —O$CH_2$—, —COO—, —OCO—, —$C_2F_4$—, —CF=CF— or a single bond.

6. The medium according to claim 1, comprising a polymerizable component A) comprising one or more polymerizable compounds of formula I, and a liquid-crystalline component B) comprising one or more low-molecular-weight compounds.

7. The medium according to claim 1, wherein component B) comprises one or more compounds of the formulae CY, PY and ZK

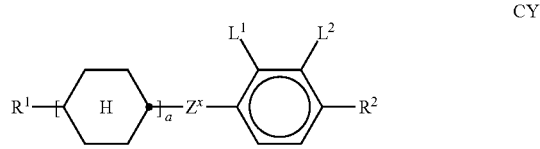    CY

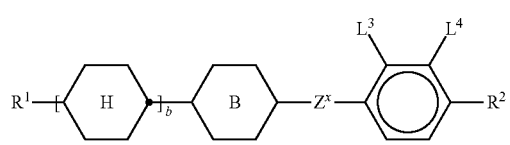    PY in which a denotes 1 or 2, b denotes 0 or 1,

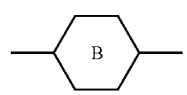

denotes

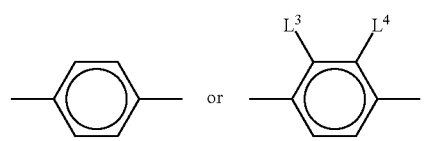

$R^1$ and $R^2$ each, independently of one another, denote alkyl having 1 to 12 C atoms, where, in addition, one or two non-adjacent $CH_2$ groups may be replaced by —O—, —CH=CH—, —CO—, —O—CO— or —CO—O— in such a way that O atoms are not linked directly to one another, $Z^x$ denotes —CH=CH—, —$CH_2$O—, —O$CH_2$—, —$CF_2$O—, —O$CF_2$—, —O—, —$CH_2$—, —$CH_2CH_2$— or a single bond, and $L^{1-4}$ each, independently of one another, denote F, Cl, $OCF_3$, $CF_3$, $CH_3$, $CH_2F$, $CHF_2$

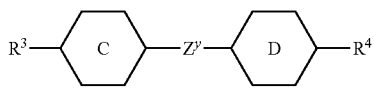

in which

denotes

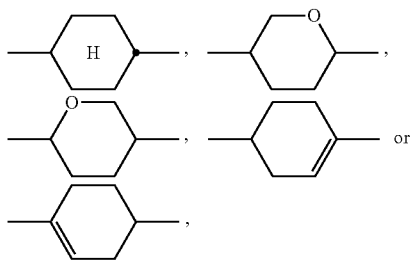

denotes

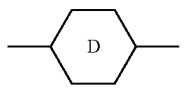

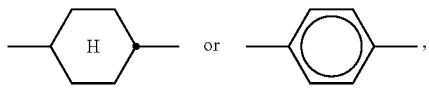

R³ and R⁴ each, independently of one another, denote alkyl having 1 to 12 C atoms, in which, in addition, one or two non-adjacent CH₂ groups may be replaced by —O—, —CH=CH—, —CO—, —O—CO— or —CO—O— in such a way that O atoms are not linked directly to one another, Z^y
  denotes —CH₂CH₂—, —CH=CH—, —CF₂O—, —OCF₂—, —CH₂O—, —OCH₂—, —COO—, —OCO—, —C₂F₄—, —CF=CF— or a single bond.

8. The medium according to claim 1, wherein the compounds of formula I is polymerized.

9. The medium according to claim 1, wherein the compounds of component A is polymerized.

10. A liquid crystalline display comprising a medium according to claim 1.

11. The display according to claim 10, that is a PS or PSA type display.

12. The display according to claim 11, that is a PSA-VA, PSA-OCB, PSA-IPS, PS-FFS, PSA-posi-VA or PSA-TN display.

13. The display according to claim 10, containing an LC cell having two substrates and two electrodes, where at least one substrate is transparent to light and at least one substrate has one or two electrodes, and a layer, located between the substrates, of an LC medium comprising a polymerized component and a low-molecular-weight component, where the polymerized component is obtained by polymerization of one or more polymerizable compounds between the substrates of the LC cell in the LC medium, optionally while applying an electrical voltage to the electrodes, where at least one of the polymerizable compounds is a polymerizable compound of formula I in an LC medium.

14. A process for the production of a liquid crystalline display, comprising filling a liquid crystalline medium according claim 1 into a cell having two substrates and two electrodes, and polymerizing the polymerizable compounds, optionally while applying an electrical voltage to the electrodes.

15. A compound of formula I

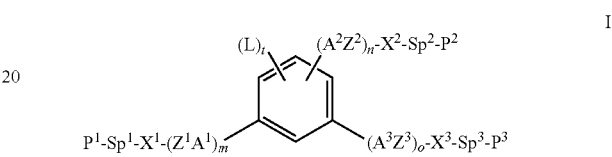

wherein
A¹, A³ independently of each other denote 1,4-phenylene, naphthalene-1,4-diyl or naphthalene-2,6-diyl, wherein in all of these groups one or more CH groups may optionally be replaced by N,
A² denotes 1,4-phenylene, naphthalene-1,4-diyl or naphthalene-2,6-diyl, wherein in all of these groups one or more CH groups may optionally be replaced by N, cyclohexane-1,4-diyl, wherein one or more non-adjacent CH₂-groups may optionally be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methano-indane-2,5-diyl, wherein all of these groups are unsubstituted or mono- or polysubstituted by L,
L denotes P—, P-Sp-, OH, CH₂OH, F, Cl, Br, I, —CN, —NO₂, —NCO, —NCS, —OCN, —SCN, —C(=O)N(R^x)₂, —C(=O)Y¹, —C(=O)R^x, —N(R^x)₂, optionally substituted silyl, optionally substituted aryl or heteroaryl having 5 to 20 ring atoms, or straight-chain or branched alkyl having 1 to 25 C atoms, in which alkyl moities, in addition, one or more non-adjacent CH₂ groups may optionally each be replaced, independently of one another, by —C(R^{00})=C(R^{000})—, —C≡C—, —N(R^{00})—, —O—, —S—, —CO—, —CO—O—, —O—CO—, —O—CO—O— in such a way that O and/or S atoms are not linked directly to one another, and in which, in addition, one or more H atoms may be replaced by F, Cl, CN, P— or P-Sp-,
R^{00} and R^{000} each, independently of one another, denote H or alkyl having 1 to 12 C atoms,
P¹, P² and P³ independently of each other denote a polymerizable group,
Sp¹, Sp², Sp³ independently of each other denote a spacer group or a single bond,
Y¹ is halogen,
R^x denotes P—, P-Sp-, H, halogen, straight chain, branched or cyclic alkyl having 1 to 25 C atoms, wherein one or more non-adjacent CH₂-groups are optionally replaced by —O—, —S—, —CO—, —CO—O—, —O—CO—, —O—CO—O— in such a manner that O- and/or S-atoms are not directly connected with each other, and wherein one or more H atoms are optionally replaced by F, Cl, P— or P-Sp-; or $R^x$ denotes optionally substituted aryl, aryloxy, heteroaryl or heteroaryloxy having 5 to 20 ring atoms, $X^1$, $X^2$, $X^3$ independently of each other denote O, S, —C(O)—, —OC(O)—, —C(O)O—, —CF$_2$O—, or a single bond, n is 0, 1 or 2, m and o are independently of each other 1 or 2, and t is 0, 1, 2 or 3 wherein at least one of $X^1$, $X^2$ or $X^3$ is not O or S.

16. A compound of formula II

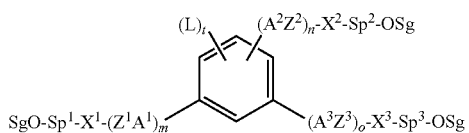

wherein $A^1$, $A^3$ independently of each other denote 1,4-phenylene, naphthalene-1,4-diyl or naphthalene-2,6-diyl, wherein in all of these groups one or more CH groups may optionally be replaced by N, $A^2$ denotes 1,4-phenylene, naphthalene-1,4-diyl or naphthalene-2,6-diyl, wherein in all of these groups one or more CH groups may optionally be replaced by N, cyclohexane-1,4-diyl, wherein one or more non-adjacent CH$_2$-groups may optionally be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methano-indane-2,5-diyl, wherein all of these groups are unsubstituted or mono- or polysubstituted by L, L denotes P—, P-Sp-, OH, CH$_2$OH, F, Cl, Br, I, —CN, —NO$_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl or heteroaryl having 5 to 20 ring atoms, or straight-chain or branched alkyl having 1 to 25 C atoms, in which alkyl moieties, in addition, one or more non-adjacent CH$_2$ groups may optionally each be replaced, independently of one another, by —C($R^{00}$)=C($R^{000}$)—, —C≡C—, —N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN, P— or P-Sp-, $R^{00}$ and $R^{000}$ each, independently of one another, denote H or alkyl having 1 to 12 C atoms, $Sp^1$, $Sp^2$, $Sp^3$ independently of each other denote a spacer group or a single bond, $Y^1$ is halogen, $R^x$ denotes P—, P-Sp-, H, halogen, straight chain, branched or cyclic alkyl having 1 to 25 C atoms, wherein one or more non-adjacent CH$_2$-groups are optionally replaced by —O—, S—, —CO—, —CO—O—, —O—CO—, —O—CO—O— in such a manner that O- and/or S-atoms are not directly connected with each other, and wherein one or more H atoms are optionally replaced by F, Cl, P— or P-Sp-; or $R^x$ denotes optionally substituted aryl, aryloxy, heteroaryl or heteroaryloxy having 5 to 20 ring atoms, $X^1$, $X^2$, $X^3$ independently of each other denote O, S, —C(O)—, —OC(O)—, —C(O)O—, —CF$_2$O—, or a single bond, n is 0, 1 or 2, m and o are independently of each other 1 or 2, and t is 0, 1, 2 or 3

Sg denotes H or a protecting group.

17. The compound according to claim 16, wherein at least one group $X^1$, $X^2$ and/or $X^3$ is not O or S.

18. The compound of claim 16, that is

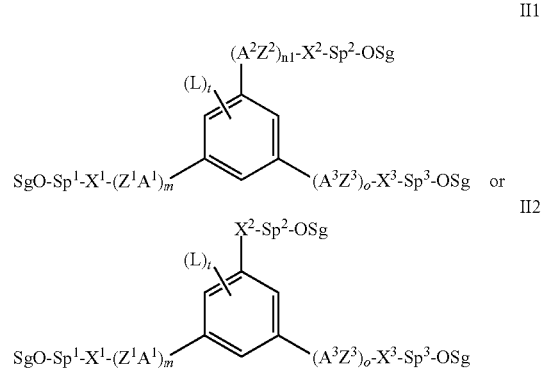

wherein n1 is 1 or 2.

19. The compound according to claim 16, that is

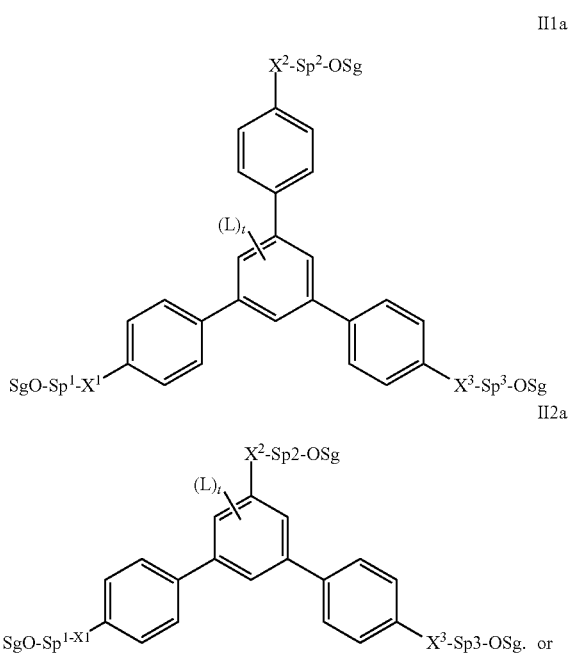

20. A process for preparing a compound according to claim 15, comprising esterification or etherification of a compound according to of formula II

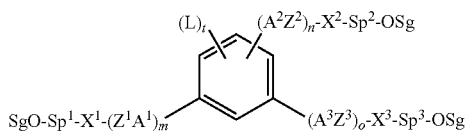

II wherein

A$^1$, A$^3$ independently of each other denote 1,4-phenylene, naphthalene-1,4-diyl or naphthalene-2,6-diyl, wherein in all of these groups one or more CH groups may optionally be replaced by N, A$^2$ denotes 1,4-phenylene, naphthalene-1,4-diyl or naphthalene-2,6-diyl, wherein in all of these groups one or more CH groups may optionally be replaced by N, cyclohexane-1,4-diyl, wherein one or more non-adjacent CH$_2$-groups may optionally be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methano-indane-2,5-diyl, wherein all of these groups are unsubstituted or mono- or polysubstituted by L, L denotes P—, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl or heteroaryl having 5 to 20 ring atoms, or straight-chain or branched alkyl having 1 to 25 C atoms, in which alkyl moities, in addition, one or more non-adjacent CH$_2$ groups may optionally each be replaced, independently of one another, by —C(R$^{00}$)=C(R$^{000}$)—, —C≡C, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN, P— or P-Sp-, R$^{00}$ and R$^{000}$ each, independently of one another, denote H or alkyl having 1 to 12 C atoms, Sp$^1$, Sp$^2$, Sp$^3$ independently of each other denote a spacer group or a single bond, Y$^1$ is halogen, R$^x$ denotes P—, P-Sp-, H, halogen, straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are optionally replaced by F, Cl, P— or P-Sp-; or R$^x$ denotes optionally substituted aryl, aryloxy, heteroaryl or heteroaryloxy having 5 to 20 ring atoms, X$^1$, X$^2$, X$^3$ independently of each other denote O, S, —C(O)—, —OC(O)—, —C(O)O—, —CF$_2$O—, or a single bond, n is 0, 1 or 2, m and o are independently of each other 1 or 2, and t is 0, 1, 2 or 3

Sg denotes H or a protecting group using corresponding acids, acid derivatives, or halogenated compounds containing a group P, in the presence of a dehydrating reagent, wherein P is a polymerizable group.

21. A process of preparing a liquid crystalline medium according to claim 6, comprising mixing one or more low-molecular-weight liquid-crystalline compounds, with one or more polymerizable compounds of formula I, and optionally with further liquid-crystalline compounds and/or additives.

* * * * *